(12) United States Patent
Miyasaka et al.

(10) Patent No.: US 7,587,299 B2
(45) Date of Patent: Sep. 8, 2009

(54) ANOMALY DIAGNOSIS APPARATUS AND METHOD OF MACHINE INSTALLATION

(75) Inventors: Takanori Miyasaka, Kanagawa (JP); Hirotoshi Aramaki, Kanagawa (JP); Yasushi Mutoh, Kanagawa (JP); Shinichiro Asaeda, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/896,020

(22) Filed: Aug. 29, 2007

(65) Prior Publication Data

US 2008/0027659 A1    Jan. 31, 2008

Related U.S. Application Data

(62) Division of application No. 10/415,931, filed on May 5, 2003, now abandoned.

(30) Foreign Application Priority Data

| Nov. 6, 2000 | (JP) | ............................ | 2000-337675 |
| Dec. 6, 2000 | (JP) | ............................ | 2000-371747 |
| Oct. 23, 2001 | (JP) | ............................ | 2001-324980 |
| Oct. 23, 2001 | (JP) | ............................ | 2001-325003 |
| Oct. 23, 2001 | (JP) | ............................ | 2001-325004 |
| Oct. 25, 2001 | (JP) | ............................ | 2001-327742 |

(51) Int. Cl.
*G06F 11/30* (2006.01)

(52) U.S. Cl. ........................... 702/183; 702/39; 702/56; 340/682; 340/683; 73/587; 73/593

(58) Field of Classification Search ............ 702/33–36, 702/39, 41–44, 56, 66, 70, 71, 75–78, 113, 702/141; 700/174, 175; 340/679, 682, 683; 73/587, 593

See application file for complete search history.

(56) References Cited

U.S. PATENT DOCUMENTS 4,814,603 A * 3/1989 Philips .................. 250/227.21

(Continued)

FOREIGN PATENT DOCUMENTS

JP    54-097466 A    8/1979

(Continued)

OTHER PUBLICATIONS

Japanese Office Action for JP 2006-188404 dated Jun. 3, 2009.

(Continued)

*Primary Examiner*—Manuel L Barbee
(74) *Attorney, Agent, or Firm*—Sughrue Mion, PLLC

(57) ABSTRACT

An anomaly diagnosis apparatus for analyzing sound or vibration data produced by a machine installation and diagnosing the presence or absence of an anomaly in a sliding member in the machine installation which is made up of a diagnosis processing server (1) and a user information processing terminal (3) which are connected through a network (2). The diagnosis processing server (1) receives the sound or vibration data produced by the machine installation and information for identifying the sliding member used with the machine installation through the network (2) from the user information processing terminal 3, makes an anomaly diagnosis of the machine installation based on the received data, and transmits the diagnosis result through the network (2) to the user information processing terminal (3), thereby lightening the burden of the user and executing anomaly diagnosis processing promptly.

3 Claims, 40 Drawing Sheets

U.S. PATENT DOCUMENTS

| | | | |
|---|---|---|---|
| 5,258,923 A * | 11/1993 | Imam et al. | 702/36 |
| 5,442,553 A | 8/1995 | Parrillo | |
| 5,854,994 A | 12/1998 | Canada et al. | |
| 6,138,078 A * | 10/2000 | Canada et al. | 702/44 |
| 6,857,013 B2 | 2/2005 | Rambert et al. | |
| 2002/0123865 A1 | 9/2002 | Whitney et al. | |

FOREIGN PATENT DOCUMENTS

| | | |
|---|---|---|
| JP | 60-088121 U | 6/1985 |
| JP | 7-103788 A | 4/1995 |
| JP | 08-015095 A | 1/1996 |
| JP | 9-210860 A | 8/1997 |
| JP | 9-257651 A | 10/1997 |
| JP | 10-221160 A | 8/1998 |
| JP | 10-221161 A | 8/1998 |
| JP | 10-267742 A | 10/1998 |
| JP | 11-134529 A | 5/1999 |
| JP | 11-173909 A | 7/1999 |
| JP | 11-271183 A | 10/1999 |
| JP | 2000-146762 A | 5/2000 |
| JP | 2000-234987 A | 8/2000 |

OTHER PUBLICATIONS

Japanese Office Action for JP 2006-188403 dated Jun. 3, 2009.

* cited by examiner

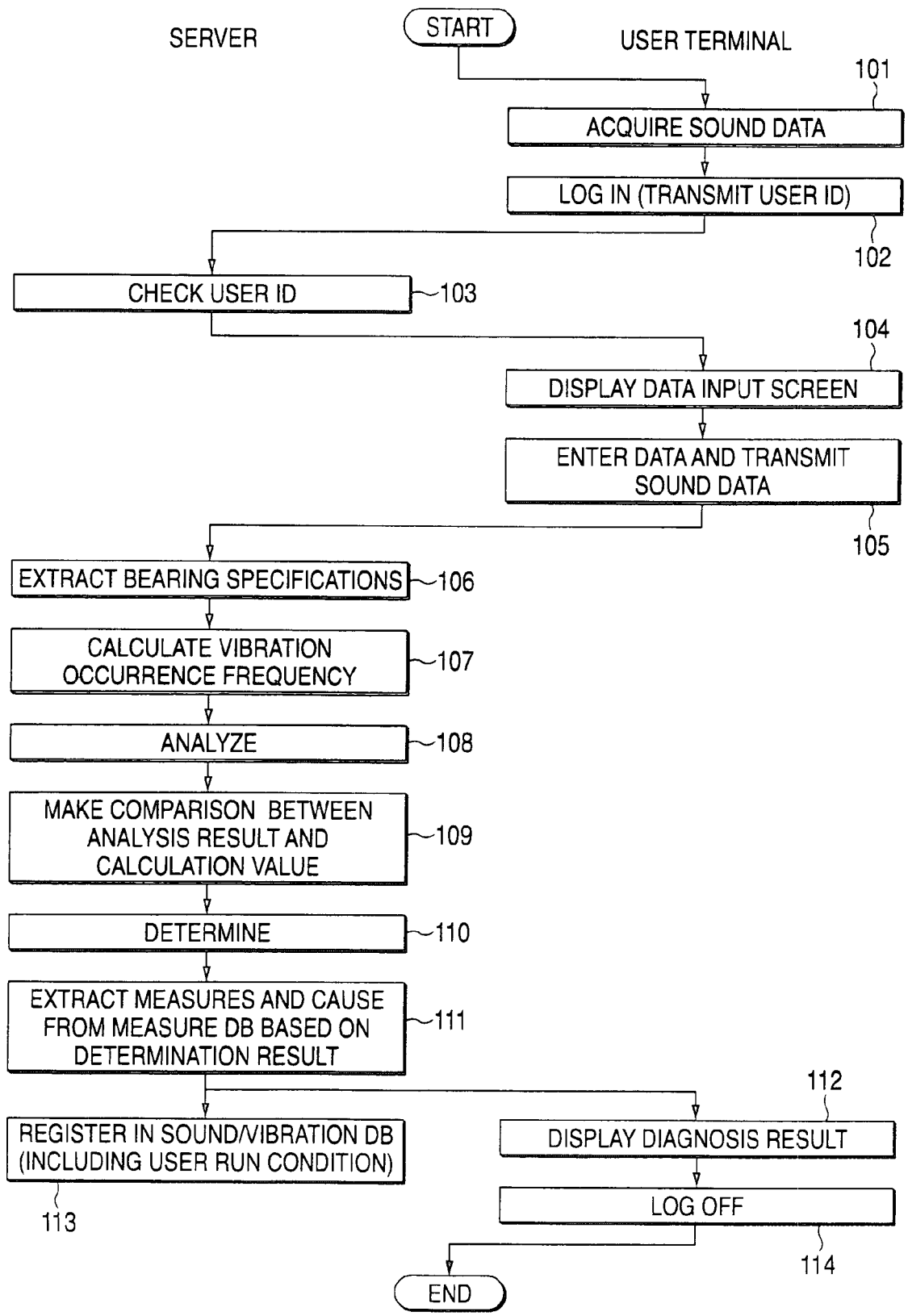

FIG. 3

BEARING SPECIFICATION INPUT

TYPE OF BEARING ▽

BEARING PART NUMBER

DIAMETER OF ROLLING ELEMENT ☐ mm

NUMBER OF ROLLING ELEMENT ☐

PCD ☐ mm

NUMBER OF REVOLUTIONS
⊙ INNER RING ROTATION    ○ OUTER RING ROTATION
☐ 1/mm

READ OF BEARING SPECIFICATION

SETTING OF CLEARANCE
⊙ CONTACT ANGLE   ○ RADIAL CLEARANCE

INITIAL CONTACT ANGLE ☐ DEG
RADIAL CLEARANCE ☐ mm
INNER RING GROOVE RADIUS ☐ mm
OUTER RING GROOVE RADIUS ☐ mm

OK

EXIT

FIG. 5

| | | OCCURRENCE FREQUENCY OF ORIGINAL WAVE FORM | OCCURRENCE FREQUENCY AFTER ENVELOPE PROCESSING | PEAK FACTOR |
|---|---|---|---|---|
| CHATTER SOUND | CHATTER OF INNER RING | nZfi, nZfi ± fr | - | SMALL |
| | CHATTER OF OUTER RING | nZfc | - | |
| | CHATTER OF ROLLING ELEMENT | 2nfb, 2nfb ± fc | - | |
| FLAW SOUND | INNER RING FLAW | - | Zfi | LARGE |
| | OUTER RING FLAW | - | Zfc | |
| | ROLLING ELEMENT FLAW | - | 2fb | |
| CAGE SOUND | | - | fc | - |
| SEAL SOUND | | - | fr | - |
| ROLLING ELEMENT DROP SOUND (LOW-SPEED ROTATION) | | - | Zfc | - |
| CONTAMINANT SOUND | | - | - | LARGE | fr: INNER RING ROTATION FREQUENCY [Hz], Z: NUMBER OF ROLLING ELEMENTS, fc: CAGE ROTATION FREQUENCY [Hz]
fi: fr-fc [Hz], fb: ROLLING ELEMENT ROTATION FREQUENCY [Hz], n: INTEGER

FIG. 13

| FLAW OF ROLLING BEARING | FREQUENCY AFTER ENVELOP PROCESSING |
|---|---|
| INNER RING (Si) | $Zfi = \dfrac{fr}{2}\left(1+\dfrac{Da}{dm}\cos\alpha\right)z$ [Hz] |
| OUTER RING (So) | $Zfc = \dfrac{fr}{2}\left(1-\dfrac{Da}{dm}\cos\alpha\right)z$ [Hz] |
| ROLLING ELEMENT (Sb) | $2fd = fr\left(1-\dfrac{Da^2}{dm^2}\cos^2\alpha\right)$ [Hz] |
| CAGE (Sc) | $fc = \dfrac{fr}{2}\left(1+\dfrac{Da}{dm}\cos\alpha\right)$ [Hz] |

$fr$: INNER RING ROTATION SPEED [Hz]
$fc$: CAGE ROTATION SPEED [Hz]
$fb$: ROLLING ELEMENT ROTATION SPEED [Hz]
$dm$: PITCH CIRCLE DIAMETER [mm]
$Z$: NUMBER OF ROLLING ELEMENTS
$fi$: $fr-fc$
$Da$: DIAMETER OF ROLLING ELEMENT [mm]
$\alpha$: CONTACT ANGLE [°]

SETTING
A (X0, Y0), B (X1, Y1), C (X2, Y2)

$\delta_1 ( = Y_1-Y_0 ) > 0,$ —①
$\delta_2 ( = Y_2-Y_1 ) < 0,$ —②
WHEN ①,② IS SATISFIED AND
$dy/dx = (Y_1-Y_0)/(X_1-X_0) > 1$
OR
$dy/dx = (Y_2-Y_1)/(X_2-X_1) < -1$
IS SATISFIED, Y1 IS ADOPTED AS PEAK

TIME DOMAIN PART

COMPARING OF ALL OF HARMONICS
WHEN OUTER RING FLAW OCCURS

COMPARING OF ONLY FIRST-ORDER, SECOND ORDER, AND FOURTH-ORDER COMPONENTS (OUTER RING FLAW)

LEVEL DIFFERENCE dB RELATIONSHIP BETWEEN
MAGNITUDE OF PEEL AND LEVEL DIFFERENCE

ANOMALY DIAGNOSIS APPARATUS AND METHOD OF MACHINE INSTALLATION

This is a divisional of application Ser. No. 10/415,931 filed May 5, 2003 now abandoned. The entire disclosure of the prior application, application Ser. No. 10/415,931 is hereby incorporated by reference.

TECHNICAL FIELD

This invention relates to an anomaly diagnosis apparatus and method of a machine installation using a network for diagnosing the presence or absence of an anomaly in a sliding member used with a machine installation.

BACKGROUND ART

A system for detecting sound or vibration produced from a machine installation using a sliding member as a vibration element, performing processing of frequency analysis, etc., for detected data, and detecting an anomaly and estimating the cause of the anomaly, etc., in the sliding member used with the machine installation based on obtained analysis data is well known.

By the way, the sliding members used with the machine installation include bearings, ball screws, linear guides, motors, etc., for example; the sliding members involve a large number of types and are used at various places and in various environments.

Therefore, the factors of sound or vibration caused by the sliding members are complicated and to analyze the factors and make a highly reliable anomaly diagnosis, usually a dedicated analytical instrument and a skill for making a diagnosis become necessary. However, usually the user of the machine installation does not have such a skill required for making a diagnosis or a dedicated analytical instrument.

Then, whenever the user wants to conduct an anomaly diagnosis of a sliding member in a routine check, etc., for example, the user passes data of sound or vibration produced by the machine installation to be subjected to a diagnosis to a machine installation manufacturer, etc., having a necessary skill and a dedicated analytical instrument, and makes a diagnosis request.

FIG. 46 shows a related art example of an anomaly diagnosis apparatus of a machine installation placed in a machine installation manufacturer, etc., as a dedicated analytical instrument for diagnosing the presence or absence of an anomaly in a sliding member.

An anomaly diagnosis apparatus 901 shown here assumes that a sliding member built in a machine installation is a rolling bearing made up of a plurality of parts for rotating and sliding.

As the anomaly diagnosis apparatus 901 of a machine installation, a diagnosis program 905 and determination criterion data 907 for the diagnosis are built in an information processing apparatus (computer) 903 managed by the manufacturer, etc., designing the machine installation and when a user 909 using the machine installation requests the manufacturer to diagnose the presence or absence of an anomaly in the machine installation, the manufacturer processes actual measurement vibration data recording sound or vibration occurring at the operation time of the machine installation of the user 909 by the diagnosis program 905 of the information processing apparatus 903 for diagnosing the presence or absence of an anomaly, and responds to the user 909 with the diagnosis result.

As the determination criterion data 907, the frequency component of vibration occurring when a specific part of the sliding member used with the machine installation is abnormal and the standard peak level in the frequency component are calculated from the specifications, etc., of the sliding member and are set; the determination criterion data 907 is stored in a data storage section 911 of the information processing apparatus 903.

Usually, for example, various databases useful for diagnosis processing, such as a sound/vibration database 971 storing the determination criterion data 907, a customer information database 981 storing information concerning the users using the machine installations to be diagnosed, and a measure database 991 storing information of measures, etc., returned to the user in response to the abnormal condition, are constructed in the data storage section 911.

The diagnosis program 905 is made up of an actual measurement data analysis program 912 for performing appropriate analysis processing of envelope analysis, etc., for the actual measurement vibration data obtained from the user and generating actual measurement frequency spectrum data, for example, and a determination program 913 for diagnosing the presence or absence of an anomaly by comparing the analysis result of the actual measurement data analysis program 912 with the determination criterion data 907.

The determination program 913 adopts as the data stored in the determination criterion data 907 the frequency component occurring when a specific part of the machine installation is abnormal as the determination criterion, for example, and determines the presence or absence of an anomaly in the machine installation and locates the anomaly occurrence point: based on whether or not a peak value of a given level or more appears at the determination criterion position on the actual measurement frequency spectrum data of the analysis result of the actual measurement data analysis program 912.

However, in the related art, the data required for a diagnosis is transferred by mail, etc., or in both the user and the manufacturer, time and labor of the persons in charge, etc., are required for sending and receiving an anomaly diagnosis request and therefore the diagnosis result cannot promptly be provided; this is a problem.

Since sound or vibration which occurs varies largely depending on the specification data and use conditions of the sliding member used with the machine installation, it becomes necessary to enter the specification data and use conditions to make a precise diagnosis.

However, it is not easy for the user to prepare a document describing the specification data, use conditions, etc., whenever the user makes an anomaly diagnosis request, and arrangements for the data and use conditions required for a diagnosis place a large burden on the user, resulting in a problem of making it impossible to easily make an anomaly diagnosis.

Further, the anomaly diagnosis apparatus 901 in the related art described above involves the following problems:

As processing of the determination program 913, the anomaly diagnosis apparatus 901 in the related art described above repeats computation processing of finding a large number of frequency components at the anomaly time from the first order to multi-order for each specific part of the machine installation predetermined and making a diagnosis as to whether or not a peak appears on the frequency spectrum data of the sliding member of the machine installation actually measured for each of the many frequency components and computation processing of making a diagnosis as to whether or not the peak value on the frequency spectrum data is a peak level corresponding to an anomaly.

Thus, the computation processing amount until the final diagnosis is reached becomes enormous, and a large load is imposed on computation processing means and thus an expensive computer having a high computation processing capability becomes necessary, resulting in an increase in the apparatus cost and as the required time for computation processing is prolonged, it becomes difficult to speed up the diagnosis work; this is a problem.

To finish diagnosis processing of a plurality of users promptly as much as possible, a high-performance computer having a high computation processing capability becomes necessary as the information processing apparatus 903, and a problem of increasing the construction cost of a computer system as the diagnosis apparatus occurs.

If user's diagnosis requests concentrate, starting of handling of some requests is delayed and thus the required time until the final diagnosis is reached is further increased and even if a computer having a high computation processing capability is adopted as the information processing apparatus 903, a problem of making it difficult to make a rapid response also occurs.

Further, the user needs to transmit actual measurement vibration data to the manufacturer and the time required for transmitting the actual measurement vibration data from the user to the manufacturer also becomes a factor causing a delay in diagnosis processing.

A method of repeating computation processing of checking to see if each frequency spectrum after undergoing frequency analysis involves a frequency component caused by a sliding member of a machine installation in the descending order of spectrum level without picking up the peak value, etc., and without determining the frequency at which a peak occurs due to an anomaly, etc., also becomes widespread as the comparison processing of the determination program in the related art to detect an anomaly.

In such a method, however, calculation load and time loss are heavy, resulting in a delay in processing; this is a problem. Although an anomaly occurs, if a peak appearing in the frequency spectrum is small, the anomaly is missed and overlooked or when the spectrum level is high because of the effect of noise, if it does not correspond to the peak value, there is a fear of an erroneous diagnosis as an anomaly, and it is difficult to improve reliability of diagnosis; this is also a problem.

In the anomaly diagnosis method in the related art, if noise is put on the harmonic of a frequency component caused by an anomaly in the sliding member of the machine installation or a member relevant to the sliding member of the machine installation, if frequency components of rotation components, etc., in the sliding member or the member relevant to the sliding member overlap, or if the harmonic of a frequency component not caused by the anomaly in the sliding member or the member relevant to the sliding member and the frequency component caused by the anomaly overlap, there is a fear of an erroneous diagnosis as an anomaly because of the effect of the harmonic if actually the sliding member, the member relevant to the sliding member, etc., is normal.

Then, in the related art, the person in charge of diagnosis for managing the anomaly diagnosis apparatus of the machine installation checks actual measurement data provided by vibration detection means each time, extracts a region in which a noise component seems to be small from the actual measurement data provided by the vibration detection means, and executes conversion processing to frequency spectrum data and later comparison processing for the extracted effective actual measurement data, thereby preventing degradation of reliability of diagnosis.

The person in charge of diagnosis checks to see if a noise component exists, for example, by visually checking whether or not a given or more peak value appears on the vibration waveform detected by the vibration detection means.

Noise is detected by the vibration detection means in a state in which it is added to sound or vibration occurring in the machine installation containing the sliding member, and often makes excessive the peak level of the waveform.

However, removal of the noise component by the person in charge of diagnosis interrupts processing of the anomaly diagnosis apparatus of the machine installation and thus incurs a drastic delay in the diagnosis processing; this is a problem.

An output unit is required for displaying the actual measurement data detected by the vibration detection means in such a manner that the person in charge of diagnosis can check the actual measurement data, and there is a problem of increasing the cost of the anomaly diagnosis apparatus of the machine installation to install the output unit.

Further, the noise component removal percentage is affected by the skill degree of the person in charge of diagnosis and variations easily occur in reliability of diagnosis; this is also a problem.

The invention is embodied considering the problems described above and it is an object of the invention to provide an anomaly diagnosis apparatus of a machine installation for enabling the user to easily make an anomaly diagnosis request with a small burden and moreover get the diagnosis result promptly and deal with occurrence of the anomaly rapidly if the user does not have a dedicated analytical instrument or a skill required for anomaly diagnosis of a sliding member, further to provide an anomaly diagnosis apparatus of a machine installation for enabling diagnosis processing to be performed in any desired information processing terminal owned by the user for speeding up the diagnosis processing, and further to provide an anomaly diagnosis method of a machine installation for making it possible to decrease the calculation load for anomaly diagnosis and detect the presence or presence of an anomaly in a short time with good accuracy.

DISCLOSURE OF THE INVENTION

To accomplish the object, according to the invention, there is provided (1) an anomaly diagnosis apparatus of a machine installation for diagnosing the presence or absence of an anomaly in a sliding member used with the machine installation using sound, vibration, or temperature produced from the machine installation, the anomaly diagnosis apparatus having:

a diagnosis processing server and the user information processing terminal connected to a network, characterized in that the user information processing terminal transmits sound, vibration, or temperature data produced from one or more sliding members used with the machine installation and information for identifying the one or more sliding members to the diagnosis processing server, and that the diagnosis processing server makes an anomaly diagnosis of the machine installation based on the transmitted sound, vibration, or temperature data and specification data of the one or more sliding members based on the information for identifying them, and transmits the diagnosis result to the user information processing terminal.

The information transmitted by the user information processing terminal to the diagnosis processing server as the information for identifying the sliding members also includes use condition information of the one or more sliding members. The diagnosis processing server performs anomaly diagnosis processing considering the use condition information of the sliding members received from the user information processing terminal.

The anomaly diagnosis conducted by the diagnosis processing server includes determination of the presence or absence of an anomaly in the machine installation and estimation of the anomaly cause.

For example, bearings, ball screws, linear guides, motors, etc., come under the sliding members.

In the described anomaly diagnosis apparatus of the machine installation, when the user of the machine installation wants diagnosis of the presence or absence of an anomaly in the sliding member used with the machine installation, if the user transmits the sound or vibration data at the use point of the sliding member on the machine installation required for the anomaly diagnosis, the information identifying the sliding member, the sliding member use condition information, etc., from the user information processing terminal through the network to the diagnosis processing server, the diagnosis processing server automatically executes anomaly diagnosis processing based on the received data and further transmits the diagnosis result through the network to the user information processing terminal.

To execute periodic anomaly diagnosis, for example, for one or more sliding members on the machine installation, if the use conditions of the sliding member and the information for identifying the sliding member transmitted by the user to the diagnosis processing server are once prepared and stored in a storage unit, etc., of the user information processing terminal, unless the information is changed, it can be used repeatedly, similar information need not be prepared from the beginning each time an anomaly diagnosis request is made, and the burden required for preparing information required for making an anomaly diagnosis request can be lightened drastically.

Further, an anomaly diagnosis request is sent directly to the diagnosis processing server that can automatically execute anomaly diagnosis processing not via a window job for the person in charge to accept the request manually, and the requested diagnosis processing is executed promptly within the scope of the information processing performance of the diagnosis processing server, so that the user can get the diagnosis result early.

To accomplish the object, according to the invention, there is provided (2) an anomaly diagnosis apparatus of a machine installation wherein an actual measurement data analysis program for analyzing actual measurement vibration data recording sound or vibration produced when a sliding member used with the machine installation operates, determination criterion data recording information used as a determination criterion of the presence or absence of an anomaly in the sliding member used with the machine installation, and a determination program for comparing the analysis result of the actual measurement data analysis program with the determination criterion data and diagnosing the presence or absence of an anomaly in the sliding member are previously uploaded to a diagnosis processing server connected to a network in an executable data format in an information processing terminal of the user using the machine installation so as to enable the programs and the data to be downloaded into the user information processing terminal, characterized in that the user of the machine installation downloads the actual measurement data analysis program, the determination program, and the determination criterion data through the network into the user's information processing terminal, inputs the actual measurement vibration data through an interface to the user's information processing terminal whenever necessary, and executes the actual measurement data analysis program and the determination program in the user's information processing terminal for diagnosing the presence or absence of an anomaly in the sliding member used with the machine installation in the user's information processing terminal.

The machine installation contains one or more sliding members and means a machine installation or a machine wherein vibration occurs as the sliding members slide. The sliding members also include ball screws, linear guides, motors, etc., for example, in addition to rolling bearings.

In the described anomaly diagnosis apparatus of the machine installation, to diagnose the presence or absence of an anomaly in the machine installation, the diagnosis processing of the diagnosis program is performed in the information processing terminal installed in the user, so that the user is saved from having to transmit the actual measurement vibration data recording sound or vibration produced by the machine installation to be diagnosed to the manufacturer, and labor and time required for transmitting the actual measurement vibration data to the manufacturer can be saved.

The diagnosis processing server to which the actual measurement data analysis program, the determination program, and the determination criterion data required for the diagnosis processing are uploaded is used to download the programs and the determination criterion data and does not execute the diagnosis processing itself and therefore concentrating of the diagnosis processing of a large number of users on one information processing apparatus can be circumvented.

Further, the actual measurement data analysis program, the determination program, and the determination criterion data required for the diagnosis processing are downloaded into the information processing terminal of the user via the network and can be introduced into any desired information processing terminal of the user if the information processing terminal has a predetermined communication function and program execution performance, and the diagnosis processing can be left to any idle information processing apparatus of the user.

Further, concentrating of the diagnosis processing of a large number of users on one information processing apparatus need not be considered as described early, so that it can be expected that even an information processing apparatus having a not so high computation processing capability will perform comparatively rapid processing.

(3) To accomplish the object, in the anomaly diagnosis apparatus of the machine installation described above in (2) the Internet is used as the network.

In the described anomaly diagnosis apparatus of the machine installation, the Internet already constructed as a wide-area network and also promoted to broadband for realizing high-speed communications is used as the network for downloading, so that there is no extra cost for constructing, improving, etc., a dedicated network and a large number of users can use the diagnosis system easily and at low cost.

(4) To accomplish the object, in the anomaly diagnosis apparatus of the machine installation described above in (2) or (3), an authentication program for comparing with customer information data of information required for authenticating the user using the machine installation and allowing the user to download the actual measurement data analysis program, the determination program, and the determination criterion data when authenticating the user accessing the diagnosis processing server as the authorized user is built in the diagnosis processing server.

In the described anomaly diagnosis apparatus of the machine installation, it is made possible for the diagnosis processing server to manage the versions, etc., of the diagnosis program and the determination criterion data required by the user in more detail with the authentication program and the customer data in association with each other, for example; it is made possible to realize reliable downloading the optimum diagnosis program and the determination criterion data without placing any burden on the user accessing the diagnosis processing server.

(5) To accomplish the object, in the anomaly diagnosis apparatus of the machine installation described above in any of (2) to (4), a protect program for limiting the number of use times or the expiration date in the downloading information processing terminal is added to the programs and the data downloaded from the diagnosis processing server into the user information processing terminal.

In the described anomaly diagnosis apparatus of the machine installation, illegal repeated use or drain of the diagnosis processing program and the determination criterion data downloaded into the user can be prevented and erroneous use of the program and the data for anomaly diagnosis of a different type of machine installation or the like can be prevented.

To accomplish the object, according to the invention, there is provided (6) an anomaly diagnosis method of a machine installation for diagnosing the presence or absence of an anomaly in a sliding member used with the machine installation by analyzing sound or vibration produced from the machine installation, characterized by:

detecting a signal representing sound or vibration from the sliding member of the machine installation or a member relevant to the sliding member of the machine installation;

finding a frequency spectrum of the detected signal or an envelope signal thereof; and extracting only a frequency component caused by an anomaly in the sliding member of the machine installation or the member relevant to the sliding member of the machine installation from the found frequency spectrum and diagnosing the presence or absence of an anomaly in the sliding member used with the machine installation based on the magnitude of the extracted frequency component.

The anomaly diagnosis method of the machine installation according to the invention is characterized by the fact that (7) in the anomaly diagnosis method described above in (6), the presence or absence of an anomaly is diagnosed by comparing with a reference value determined in response to the effective value of the detected signal or the envelope signal thereof.

In the described anomaly diagnosis method of the machine installation, only specific frequency components are extracted from the frequency spectrum of an envelope signal of vibration occurring from the bearing and are compared with the reference value determined in response to the effective value of the envelope signal, so that the computation processing amount is lessened and speeding up the diagnosis processing can be promoted as compared with the related art method of checking to see if each frequency component is caused by the sliding member of the machine installation in the descending order of spectrum levels after frequency analysis. If the spectrum level peak of the frequency component caused by the sliding member of the machine installation is small, the components can be extracted and thus a highly accurate diagnosis is made possible.

To accomplish the object, according to the invention, there is provided (8) an anomaly diagnosis method of a machine installation for detecting sound or vibration produced from a sliding member of the machine installation or a member relevant to the sliding member of the machine installation, analyzing a detection signal, and diagnosing the presence or absence of an anomaly caused by the sliding member of the machine installation or the member relevant to the sliding member of the machine installation, characterized by:

converting an analog signal of sound or vibration produced from the sliding member of the machine installation or the member relevant to the sliding member of the machine installation into digital form to generate actual measurement digital data, performing appropriate analysis processing of frequency analysis, envelope analysis, and the like for the generated actual measurement digital data to generate actual measurement frequency spectrum data, calculating the level difference between each arbitrary data point and its immediately preceding data point and a gradient to find a peak value for the generated actual measurement frequency spectrum data, and comparing a peak value on the actual measurement frequency spectrum data for the frequency component caused by anomaly in the sliding member of the machine installation or the member relevant to the sliding member of the machine installation, thereby diagnosing the presence or absence of an anomaly in the sliding member of the machine installation or the member relevant to the sliding member of the machine installation.

In the described anomaly diagnosis method of the machine installation, to conduct frequency analysis or envelope analysis on the signal provided by detecting sound or vibration at the bearing use point and extract frequency peaks from the actual measurement frequency spectrum data provided accordingly, for the actual measurement frequency spectrum data, the level difference between each arbitrary data point and its immediately preceding data point and a gradient are calculated to find a peak value, so that extracting of a valley can be circumvented and higher-accuracy diagnosis is made possible as compared with the case of extracting from frequency components of large spectrum levels.

To accomplish the object, according to the invention, there is provided (9) an anomaly diagnosis method of a machine installation for detecting sound or vibration produced from a sliding member of the machine installation or a member relevant to the sliding member of the machine installation, analyzing a detection signal, and diagnosing the presence or absence of an anomaly caused by the sliding member of the machine installation or the member relevant to the sliding member of the machine installation, characterized by:

converting an analog signal of sound or vibration produced from the sliding member of the machine installation or the member relevant to the sliding member of the machine installation into digital form to generate actual measurement digital data, selecting any desired time domain for the generated actual measurement digital data, performing appropriate analysis processing of frequency analysis, envelope analysis, etc., for data in the selected time domain to generate actual measurement frequency spectrum data, calculating the level difference between each arbitrary data point and its immediately preceding data point and a gradient to find a peak value for the generated actual measurement frequency spectrum data, and comparing a peak value on the actual measurement frequency spectrum data for the frequency component caused by anomaly in the sliding member of the machine installation or the member relevant to the sliding member of the machine installation, thereby diagnosing the presence or absence of an anomaly in the sliding member of the machine installation or the member relevant to the sliding member of the machine installation.

To accomplish the object, according to the invention, there is provided

(10) an anomaly diagnosis method of a machine installation for detecting sound or vibration produced from a sliding member of the machine installation or a member relevant to the sliding member of the machine installation, analyzing a detection signal, and diagnosing the presence or absence of an anomaly caused by the sliding member of the machine installation or the member relevant to the sliding member of the machine installation, characterized by:

converting an analog signal of sound or vibration produced from the sliding member of the machine installation or the member relevant to the sliding member of the machine installation into digital form to generate actual measurement digital data, selecting any desired time domain for the generated actual measurement digital data, performing appropriate analysis processing of frequency analysis, envelope analysis, etc., for data in the selected time domain to generate actual measurement frequency spectrum data, selecting any desired frequency domain for the generated actual measurement spectrum data, filtering assuming that the selected frequency domain is a filter band to generate new actual measurement frequency spectrum data, calculating the level difference between each arbitrary data point and its immediately preceding data point and a gradient to find a peak value for the generated actual measurement frequency spectrum data, and comparing a peak value on the actual measurement frequency spectrum data for the frequency component caused by anomaly in the sliding member of the machine installation or the member relevant to the sliding member of the machine installation, thereby diagnosing the presence or absence of an anomaly in the sliding member of the machine installation or the member relevant to the sliding member of the machine installation.

Thus, in the anomaly diagnosis method of the machine installation described above in (9) or (10), the user can use the pointing device 215 such as a mouse to select the analysis range and the filtering range for any desired waveform range in the time waveform after AD conversion and the spectrum waveform after frequency analysis, so that a signal having a high S/N ratio can be extracted by simple operation and higher-accuracy diagnosis is made possible.

The anomaly diagnosis method of the machine installation according to the invention is characterized by the fact that

(11) in the anomaly diagnosis method described above in any of (6) to (10), the frequency component caused by anomaly in the sliding member of the machine installation or the member relevant to the sliding member of the machine installation corresponds to an abnormal part of the machine installation or a machine.

The anomaly diagnosis method of the machine installation according to the invention is characterized by the fact that

(12) in the anomaly diagnosis method described above in any of (6) to (10), the frequency component caused by anomaly in the sliding member of the machine installation or the member relevant to the sliding member of the machine installation is a frequency component caused by an anomaly of a bearing used with the machine installation.

In the anomaly diagnosis method according to the invention, the peak value used as the determination criterion useful for decreasing the calculation load at the diagnosis processing time and improving the reliability of the diagnosis may be found by first detecting sound or vibration produced from the sliding member of the machine installation or the member relevant to the sliding member of the machine installation and next converting the analog signal of the detected sound or vibration into digital form to generate actual measurement digital data and then calculating the level difference between each arbitrary data point and its immediately preceding data point and a gradient for the generated actual measurement frequency spectrum data without finding the peak value for the waveform already subjected to frequency analysis or envelope analysis as described above in (8) to (10).

To accomplish the object, according to the invention, there is provided

(13) an anomaly diagnosis method of a machine installation for diagnosing the presence or absence of an anomaly in a sliding member, etc., of the machine installation by analyzing sound or vibration produced by the machine installation containing the sliding member, characterized by:

detecting a signal representing sound or vibration produced by the sliding member, etc., of the machine installation, generating actual measurement frequency spectrum data of a frequency spectrum of the detected signal or an envelope signal thereof, executing a basic frequency component comparison process of checking whether or not the frequency at an appearance point of a peak equal to or higher than a reference level on the actual measurement frequency spectrum data matches the basic frequency at which a peak appears because of an anomaly in a specific part of the sliding member, etc., and when the frequency at the appearance point of the peak equal to or higher than the reference level on the actual measurement frequency spectrum data matches the basic frequency in the basic frequency component comparison process, executing a low-frequency component comparison process of checking the presence or absence of a frequency component having a peak equal to or higher than the reference level in a low-frequency range equal to or less than the basic frequency on the actual measurement frequency spectrum data;

when the actual measurement frequency spectrum data does not have a peak equal to or higher than the reference level in the low-frequency range equal to or less than the basic frequency in the low-frequency component comparison process, diagnosing the sliding member, etc., as an anomaly in the specific part;

when the actual measurement frequency spectrum data has a peak equal to or higher than the reference level in the low-frequency range equal to or less than the basic frequency in the low-frequency component comparison process, further executing a harmonic component comparison process of determining whether or not the harmonic of the frequency component having the peak equal to or higher than the reference level in the low-frequency range equal to or less than the basic frequency matches the basic frequency; and when the harmonic of the frequency component having the peak equal to or higher than the reference level in the low-frequency range equal to or less than the basic frequency does not match the basic frequency in the harmonic component comparison process, diagnosing the sliding member, etc., as an anomaly in the specific part; when the harmonic matches the basic frequency, diagnosing the sliding member, etc., as no anomaly in the specific part.

The expression "sliding member, etc., of machine installation" mentioned above is used to mean that the sliding member of the machine installation and a sliding member relevant member joined to the sliding member or supporting the sliding member in the machine installation are included.

For example, bearings, ball screws, linear guides, motors, etc., come under the sliding members.

In the described anomaly diagnosis method of the machine installation, the basic frequency component comparison process of checking whether or not the frequency at an appearance point of a peak equal to or higher than a reference level on the actual measurement frequency spectrum data matches the basic frequency at which a peak appears because of an anomaly in a specific part of the sliding member, etc., is executed. If the frequency at the appearance point of the peak equal to or higher than the reference level on the actual measurement frequency spectrum data matches the basic frequency in the basic frequency component comparison process, subsequently the low-frequency component comparison process and the harmonic component comparison process are executed without immediately diagnosing the sliding member, etc., as an anomaly.

If the low-frequency component comparison process and the harmonic component comparison process are executed, whether or not the peak equal to or higher than the reference level in the basic frequency on the actual measurement frequency spectrum data is caused by any other factor of overlap of frequency components of rotation components, etc., of the sliding member, etc., the effect of harmonic, etc., for example, rather than an anomaly of damage, etc., in the sliding member.

Thus, when the frequency at the appearance point of the peak equal to or higher than the reference level on the actual measurement frequency spectrum data matches the basic frequency in the basic frequency component comparison process, further the low-frequency component comparison process and the harmonic component comparison process are executed, whereby erroneous diagnosis of assuming that the peak caused by any other factor of overlap of frequency components of rotation components, etc., of the sliding member, etc., the effect of harmonic, etc., is caused by an anomaly in the sliding member, etc., can be circumvented and the reliability of diagnosing the presence or absence of an anomaly in the sliding member, etc., can be improved.

To accomplish the object, according to the invention, there is provided

(14) an anomaly diagnosis method of a machine installation for detecting sound or vibration produced from a sliding member of the machine installation, analyzing a detected vibration signal, and diagnosing the presence or absence of an anomaly caused by the sliding member, characterized by:

converting an analog signal of sound or vibration produced from the sliding member into a digital signal to generate actual measurement digital data, performing appropriate analysis processing of frequency analysis, envelope analysis, and the like for the actual measurement digital data to generate actual measurement frequency spectrum data, and diagnosing the presence or absence of an anomaly in a specific part of the sliding member of the machine installation based on the presence or absence of a peak on the actual measurement frequency spectrum data for first-order, second-order, fourth-order value of frequency component occurring when the specific part of the sliding member is abnormal.

To accomplish the object, according to the invention, there is provided

(15) an anomaly diagnosis apparatus of a machine installation for detecting sound or vibration produced from a sliding member of the machine installation, analyzing a detected vibration signal, and diagnosing the presence or absence of an anomaly caused by the sliding member of the machine installation, the anomaly diagnosis apparatus including:

AD conversion means for converting an analog signal of sound or vibration produced from the sliding member of the machine installation into a digital signal to generate actual measurement digital data, and computation processing means for performing appropriate analysis processing of frequency analysis, envelope analysis, and the like for the actual measurement digital data to generate actual measurement frequency spectrum data, and diagnosing the presence or absence of an anomaly in a specific part of the sliding member based on the presence or absence of a peak on the actual measurement frequency spectrum data for first-order, second-order, fourth-order value of frequency component occurring when the specific part of the sliding member is abnormal.

According to the anomaly diagnosis method and apparatus of the machine installation described above in (14) and (15), the comparison process of checking the presence or absence of a peak on the actual measurement frequency spectrum data corresponding to frequency components occurring when each specific part of the sliding member of the machine installation is abnormal is limited to three times of the first-order, second-order, and fourth-order values of the frequency components occurring when the specific part of the sliding member of the machine installation is abnormal and therefore the computation processing amount in the comparison process is drastically decreased and the load on the computation processing means is drastically lightened as compared with the related art case where the comparison process is repeated for all of a large number of frequency components of first-order to high-order frequency components, for example.

Further, since the comparison process is executed three times of the first-order, second-order, and fourth-order values of the frequency components occurring when the specific part of the sliding member of the machine installation is abnormal, erroneous diagnosis caused by the effect of noise, etc., is hard to occur and highly reliable diagnosis is made possible as compared with the case where a determination is made based only on the first-order component of frequency components occurring under abnormal condition.

The anomaly diagnosis method of the machine installation according to the invention is characterized by the fact that

(16) in the anomaly diagnosis method and apparatus of the machine installation described above in (14), after generating the actual measurement frequency spectrum data, an effective value of the actual measurement frequency spectrum data is calculated, a threshold value is set based on the effective value, and the peak on the actual measurement frequency spectrum data for the first-order, second-order, fourth-order value of the frequency component occurring when the specific part of the sliding member 403 is abnormal is handled as the effective peak only when the peak exceeds the threshold value.

The anomaly diagnosis apparatus of the machine installation according to the invention is characterized by the fact that

(17) in the anomaly diagnosis apparatus of the machine installation described above in (15), after generating the actual measurement frequency spectrum data, the computation processing means 413 calculates an effective value of the actual measurement frequency spectrum data, sets a threshold value based on the effective value, and handles the peak on the actual measurement frequency spectrum data for the first-order, second-order, fourth-order value of the frequency component occurring when the specific part of the sliding member 403 is abnormal as the effective peak only when the peak exceeds the threshold value.

In doing so, for example, before a computation process for comparison for the peaks on the actual measurement frequency spectrum data corresponding to the first-order value, the second-order value, and the fourth-order value of the frequency components occurring when the specific part of the sliding member of the machine installation is abnormal is executed, waste of executing the comparison process for insignificant peaks can be avoided.

To accomplish the object, according to the invention, there is provided

(18) an anomaly diagnosis method of a machine installation for detecting sound or vibration produced from a sliding member of the machine installation, analyzing a detected vibration signal, and diagnosing the presence or absence of an anomaly caused by the sliding member, characterized by:

converting an analog signal of sound or vibration produced from the sliding member of the machine installation into a digital signal to generate actual measurement digital data, performing appropriate analysis processing of frequency analysis, envelope analysis, and the like for the actual measurement digital data to generate actual measurement frequency spectrum data, and then calculating an effective value or an average value of the actual measurement frequency spectrum data, setting the calculated effective value or average value as a reference level, and estimating the magnitude of damage to a specific part of the sliding member of the machine installation causing an anomaly to occur from the level difference between level on the actual measurement frequency spectrum data corresponding to the first-order value of the frequency component occurring when the specific part of the sliding member of the machine installation is abnormal and the reference level.

Generally, growing of the peak level on the actual measurement frequency spectrum caused by damage to the sliding member of the machine installation becomes most noticeable at the peak corresponding to the first-order value of the frequency components caused by the anomaly.

Thus, as shown in the anomaly diagnosis method of the machine installation described above in (18), the level difference between the level on the actual measurement frequency spectrum data corresponding to the first-order value of the frequency components occurring when the specific part of the sliding member of the machine installation is abnormal and the effective value of the actual measurement frequency spectrum data is calculated, whereby the magnitude of the damage can be estimated efficiently by performing minimum computation processing, and it is made possible to determine the appropriate replacement time of the damaged part.

To accomplish the object, according to the invention, there is provided

(19) an anomaly diagnosis apparatus of a machine installation for detecting sound or vibration produced from the machine installation containing a sliding member, analyzing a detected vibration signal, and diagnosing the presence or absence of an anomaly caused by the machine installation containing the sliding member, the anomaly diagnosis apparatus including:

vibration detection means for detecting sound or vibration produced by the machine installation containing the sliding member and outputting an electric signal responsive to the detected sound or vibration;

sampling reference setting means for setting a reference value to exclude an area where the effect of noise is large from the output signal of the vibration detection mean;

sampling means for extracting effective actual measurement data with an area where the effect of noise is large excluded from the output signal of the vibration detection means based on the reference value set in the sampling reference setting means; and computation processing means for performing appropriate analysis processing of envelope analysis, etc., for the effective actual measurement data extracted by the sampling means to generate actual measurement frequency spectrum data and diagnosing the presence or absence of an anomaly in a specific part of the machine installation containing the sliding member based on the presence or absence of a peak on the actual measurement frequency spectrum data for frequency component occurring when the specific part of the machine installation containing the sliding member is abnormal.

According to the anomaly diagnosis apparatus of the machine installation described above in (19), the sampling means automatically executes removal of the noise component from the actual measurement data detected by the vibration detection means from the machine installation containing the sliding member based on the reference value set in the sampling reference setting means.

Therefore, the person in charge of diagnosis for managing the anomaly diagnosis apparatus of the machine installation need not check the actual measurement data to remove the noise component each time, and interrupting of processing of the anomaly diagnosis apparatus of the machine installation to check the actual measurement data does not occur.

The noise component is removed uniformly by machine processing based on the reference value, so that the skill degree of the person in charge of diagnosis does not affect the noise component removal rate.

Further, since the person in charge of diagnosis need not check the actual measurement data to remove the noise component, an output unit for displaying the actual measurement data detected by the vibration detection means in such a manner that the person in charge of diagnosis can check the actual measurement data can also be omitted.

Preferably, in the anomaly diagnosis apparatus of the machine installation according to the invention, the sampling reference setting means may automatically calculate the reference value to select an area where an excessive value caused by the effect of noise is not contained from the average level of the electric signals detected by the vibration detection means, the operation timing of the vibration detection means, etc., and a predetermined constant, etc.

If the sampling reference setting means thus automatically sets the reference value, the data entry operation of the person in charge of diagnosis in the anomaly diagnosis apparatus of the machine installation to set the reference value is decreased and the load on the person in charge of diagnosis is lightened and at the same time, the required time for the data entry operation can be saved.

The machine installation containing the sliding member contains one or more sliding members and means a machine installation or a machine wherein vibration occurs as the sliding members slide, and also contains ball screws, linear guides, motors, etc., in addition to rolling bearings.

BRIEF DESCRIPTION OF THE DRAWINGS

FIG. 2 is a flowchart to show the operation of the first embodiment of the invention.

FIG. 3 is a schematic representation of the format of one input screen when a diagnosis request is sent to a diagnosis processing server.

FIG. 5 is a schematic representation listing occurrence frequencies caused by an anomaly of a specific part of a bearing when a sliding member is a bearing.

FIG. 13 is a drawing to show the relationship between damage points in a rolling bearing and frequencies.

Figure 1:
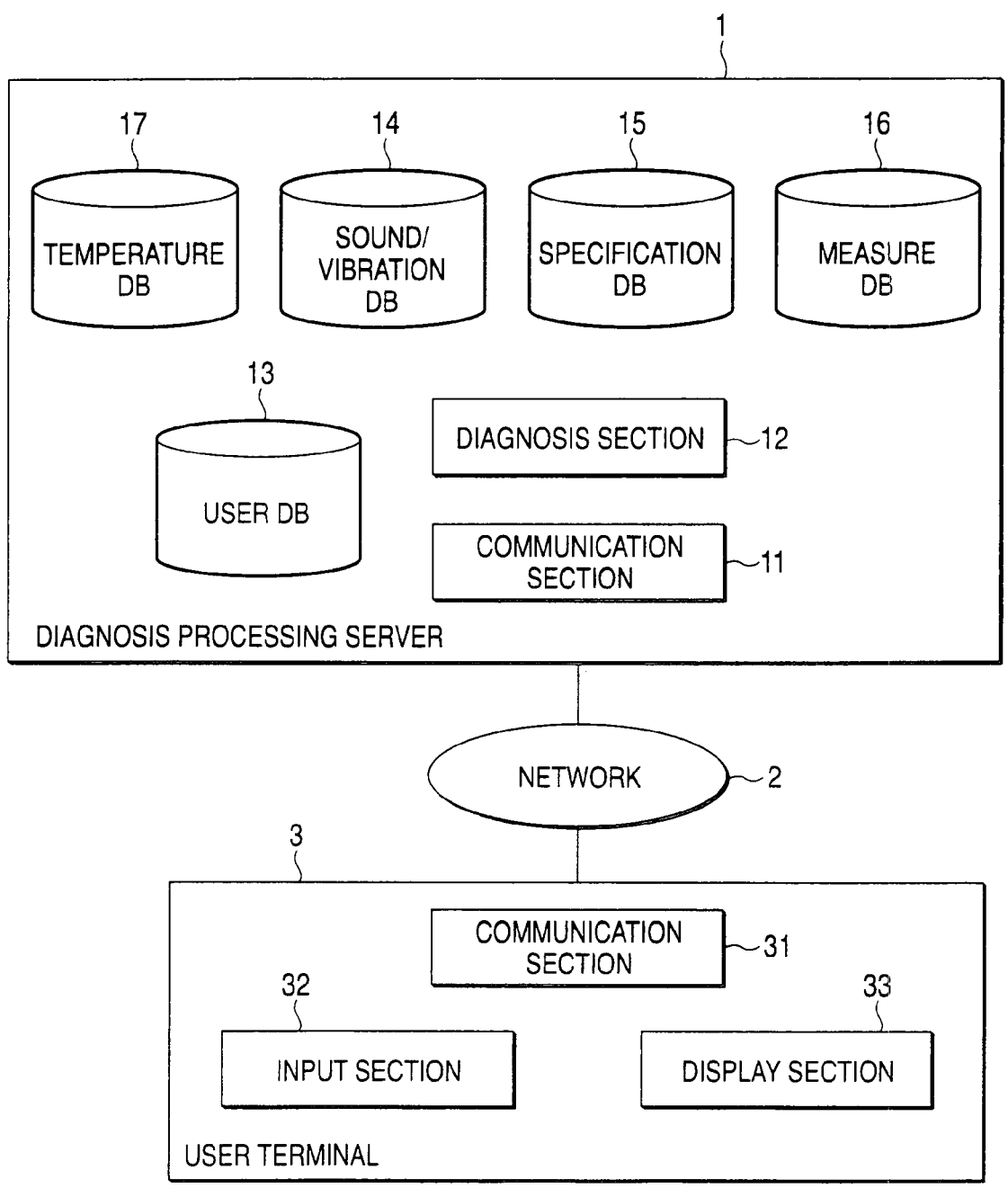
FIG. 1 is a schematic block diagram of a first embodiment of an anomaly diagnosis apparatus of a machine installation according to the invention.

In the drawings, numeral 1 denotes diagnosis processing server, numeral 2 denotes network, numeral 3 denotes user information processing terminal, numerals 11 and 31 denote communication sections, numeral 12 denote diagnosis section, numeral 13 denotes user database, numeral 14 denotes sound/vibration database, numeral 15 denotes specification database, numeral 16 denotes measure database, numeral 17 denotes temperature database, numeral 32 denotes input section, numeral 33 denotes display section, numeral 121 denotes anomaly diagnosis apparatus, numeral 123 denotes network, numeral 125 denotes diagnosis processing server, numeral 127 denotes machine installation containing sliding member, numeral 129 denotes information processing terminal, numeral 131 denotes actual measurement vibration data, numeral 141 denotes actual measurement analysis program, numeral 143 denotes sound/vibration database, numeral 143a denotes determination criterion data, numeral 145 denotes determination program, numeral 148 denotes diagnosis processing menu, numeral 153 denotes input means, numeral 154 denotes display means, numeral 181 denotes customer information database, numeral 191 denotes measure database, numeral 203 denotes machine installation containing sliding member, numeral 211 denotes sensor, numeral 212 denotes amplifier, numeral 213 denotes AD converter, numeral 214 denotes diagnosis computer, numeral 215 denotes pointing device, numeral 216 denotes AD converter, numeral 217 denotes graphical user interface, numeral 401 denotes anomaly diagnosis apparatus of machine installation, numeral 403 denotes machine installation containing sliding member, numeral 405 denotes vibration detection means, numeral 407 denotes amplification means, numeral 409 denotes AD conversion means, numeral 413 denotes computation processing means, numeral 501 denotes anomaly diagnosis apparatus of machine installation, numeral 503 denotes machine installation containing sliding member, numeral 505 denotes vibration detection means, numeral 507 denotes amplification means, numeral 509 denotes AD conversion means, numeral 511 denotes sampling reference setting means, numeral 513 denotes input means, numeral 515 denotes sampling means, and numeral 517 denotes computation processing means.

BEST MODE FOR CARRYING OUT THE INVENTION

Embodiments of an anomaly diagnosis apparatus and method of a machine installation according to the invention will be discussed in detail with reference to the accompanying drawings.

FIG. 1 is a schematic block diagram of a first embodiment of an anomaly diagnosis apparatus of a machine installation according to the invention.

The anomaly diagnosis apparatus of a machine installation of the first embodiment includes a diagnosis processing server 1 and a user information processing terminal 3 which are connected through a network 2 such as the Internet. For example, general-purpose personal computers that can be connected to the network 2 through a predetermined communication interface can be used as the diagnosis processing server 1 and the user information processing terminal 3.

The diagnosis processing server 1 includes a communication section 11, a diagnosis section 12, a user database 13, a sound/vibration database 14, a specification database 15, a measure database 16, and a temperature database 17. In the drawing, the database is abbreviated as DB.

The user information processing terminal 3 can be connected to the network 2 when necessary, and includes a communication section 31, an input section 32, and a display section 33. FIG. 1 shows only one user information processing terminal 3, but a plurality of user information processing terminals 3 can be connected.

The input section 32 inputs sound or vibration data occurring from one or more sliding member use points contained in the machine installation and information for identifying the sliding member (containing part number and sliding member use condition information). The communication sections 31 and 11 transfer data to and from the network. The diagnosis section 12 diagnoses an anomaly in the machine installation based on the sound or vibration data occurring from one or more sliding member use points of the machine installation and the information for identifying the sliding member, input through the network.

Generally, various machine elements containing a part sliding in rotational motion or linear motion, such as bearings, ball screws, linear guides, and motors, come under the sliding members in the machine installation.

An anomaly diagnosis based on the sound or vibration data is made specifically by a method of computing frequency analysis of the original waveform of the vibration data, frequency analysis after envelope processing, peak factor, etc., and comparing them with reference data computed based on the specifications and use conditions of the sliding member or initially registered data, etc. Various methods are well known and can be used.

The user database 13 stores for each user the ID and name of the user accessing the diagnosis processing server 1 through the user information processing terminal 3, the sliding member used by the user, information required for identifying the sliding member, the use conditions of the sliding member, the past diagnosis results, the measures, etc.

The sound/vibration database 14 stores sound or vibration data transmitted from the user information processing terminal 3.

The specification database 15 stores the specifications of the sliding members used with the machine installation.

The measure database 16 stores advice responsive to the diagnosis result of the machine installation.

Next, the operation of the anomaly diagnosis apparatus of the embodiment will be discussed based on a flow in FIG. 2.

It is assumed that the sliding member used with the machine installation is a bearing and that sound data is used. The user who wants to make an anomaly diagnosis collects sound data of the bearing use point with a microphone, etc., and converts the collected analog data into digital form to create a file in a predetermined format, for example, a WAV file (step 101). The sound data may be acquired at the user information processing terminal 3 or using any other dedicated apparatus. The collected analog data may be converted directly into digital form or the data once recorded on magnetic tape, etc., may be converted into digital form.

Next, the user accesses the diagnosis processing server 1 through the network 2 and logs in to the diagnosis processing server 1 (step 102). The diagnosis processing server 1 may be accessed freely or may be accessible only by limited members. To access the diagnosis processing server 1 freely, preferably the user is once registered and the user ID is issued and at the second time or later, the user accesses the diagnosis processing server 1 using the user ID. The example assumes that the user is already registered.

The diagnosis processing server 1 checks the user ID (step 103). If the user is already registered, the diagnosis processing server 1 causes the user information processing terminal 3 to display a data input screen on, prompting the user to enter data (step 104). FIG. 3 shows a display screen example in this case.

The user enters the bearing part number and the use conditions of the number of revolutions, used lubricant, etc., and transmits the already acquired sound data file (step 105).

Figure 4:
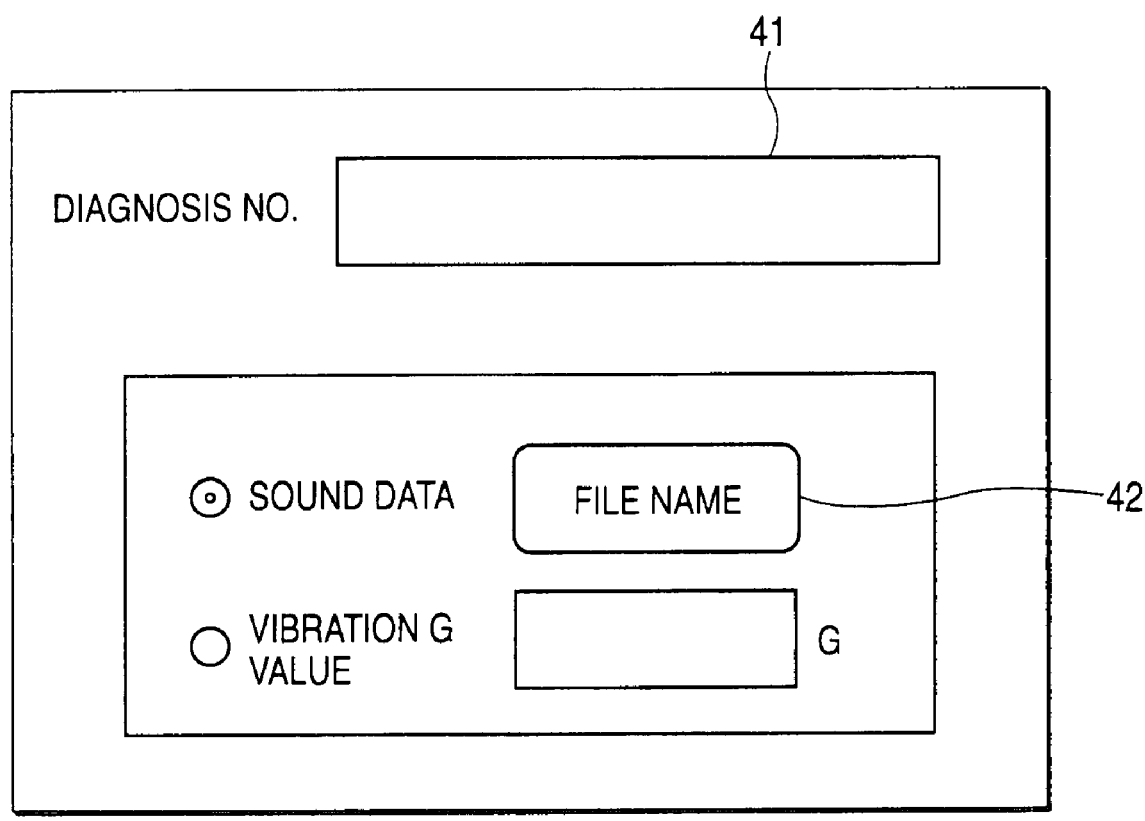
FIG. 4 is a schematic representation of the format of another input screen when a diagnosis request is sent to a diagnosis processing server in the first embodiment of the invention.

As the sound data file, a file previously stored in a storage section (not shown) in the user information processing terminal 3 may be used or a file read from an FD (floppy disk), etc., may be used. If an anomaly diagnosis of the same bearing was made in the past (for example, in a routine check, etc.), the user needs only to enter the diagnosis number and may omit the bearing part number and the use conditions. FIG. 4 shows a display screen example in the case.

In this case, the user enters the diagnosis number in an area 41 and the sound data file name in an area 42.

Upon reception of the bearing part number, the use conditions, and the sound data file, the diagnosis processing server 1 acquires the bearing specifications from the specification database 15 based on the bearing part number (step 106) and calculates the vibration occurrence frequency when the bearing is used based on the acquired specifications and use conditions (step 107). The diagnosis processing server 1 also performs analysis processing of the data in the sound data file (step 108).

As the analysis processing, filtering, envelope, FFT processing, etc., is performed as required. The diagnosis processing server 1 makes a comparison between the analysis result at step 108 and the calculation result at step 107 (step 109) and determines whether or not an anomaly exists (step 110). The comparing and determining are executed by comparing the occurrence frequencies caused by the bearing as shown in FIG. 5, for example.

Figure 6:
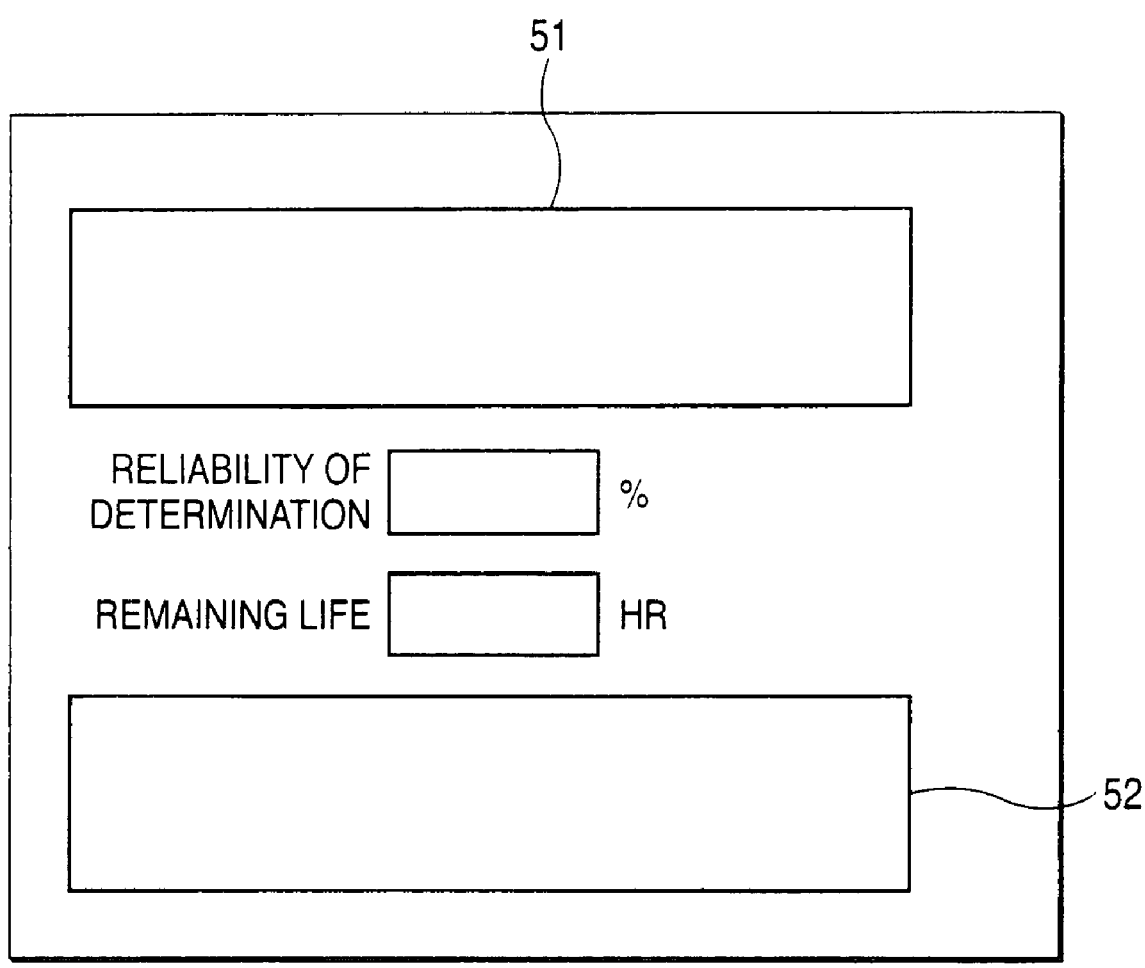
FIG. 6 is a drawing to show the format of a diagnosis result screen displayed on a user information processing terminal in the first embodiment of the invention.
Figure 7:
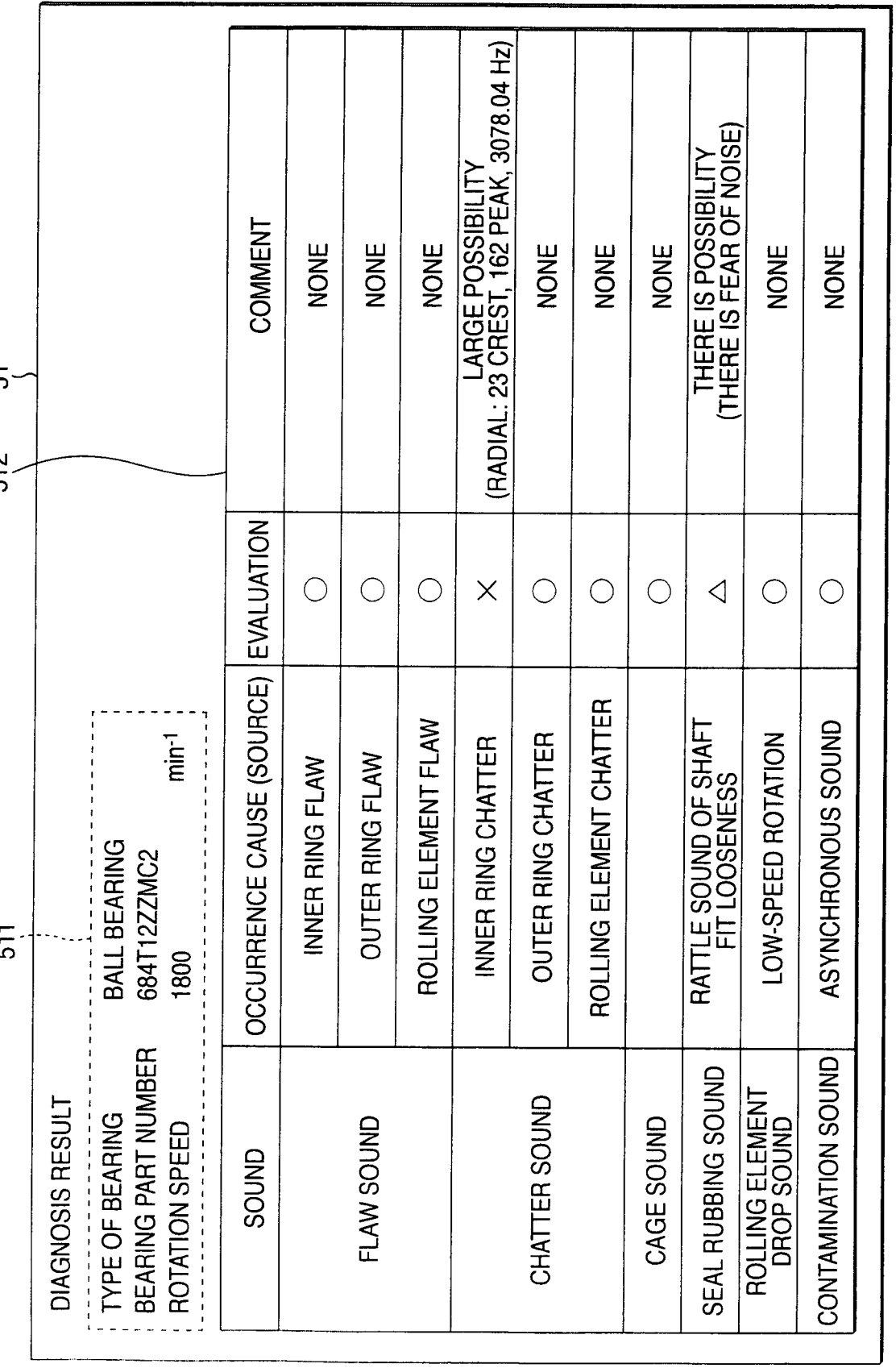
FIG. 7 is a schematic representation of a detailed format example of the contents of diagnosis result displayed on the user information processing terminal in the first embodiment of the invention.

Subsequently, the diagnosis processing server 1 retrieves the measure database 16 based on the determination result and extracts the cause and measures (step 111). Then, it transmits the diagnosis result to the user information processing terminal 3 and causes the user information processing terminal 3 to display the diagnosis result (step 112). FIG. 6 shows a display screen example of the diagnosis result. The contents shown in FIG. 7 are displayed in an area 51. In FIG. 7, the diagnosis conditions are displayed in an area 511 and the diagnosis result of the type of produced sound, the occurrence source, evaluation, comments, etc., is displayed in an area 512. Referring again to FIG. 6, the cause of the anomaly and the measures against the anomaly are displayed in an area 52. The reliability of the determination, the remaining life (guideline for the time until the sliding member does not function as a bearing), and the like are also displayed for advising the user of the replacement time. The diagnosis processing server 1 registers in the sound/vibration database 14 (step 113).

Upon acquisition of the diagnosis result, the user logs off (step 114). To continue diagnosis, the user may again enter different data at step 104.

In the described anomaly diagnosis apparatus of the machine installation, when the user of the machine installation wants diagnosis of the presence or absence of an anomaly in the bearing of the sliding member used with the machine installation, if the user transmits the sound or vibration data at the use point of the bearing on the machine installation required for the anomaly diagnosis, the information identifying the used bearing (bearing part number, etc.), the bearing use condition information, etc., from the user information processing terminal 3 through the network 2 to the diagnosis processing server 1, the diagnosis processing server 1 automatically executes anomaly diagnosis processing based on the received data and further transmits the diagnosis result through the network 2 to the user information processing terminal 3.

To execute periodic anomaly diagnosis, for example, for one or more bearings on the machine installation, if the use conditions of each bearing and the information for identifying each bearing transmitted by the user to the diagnosis processing server 1 are once prepared and stored in a storage unit, etc., of the user information processing terminal 3, unless the information is changed, it can be used repeatedly, similar information need not be prepared from the beginning each time an anomaly diagnosis request is made, and the burden required for preparing information required for making an anomaly diagnosis request can be lightened drastically.

Further, an anomaly diagnosis request is sent directly to the diagnosis processing server 1 that can automatically execute anomaly diagnosis processing not via a window job for the person in charge to accept the request manually, and the requested diagnosis processing is executed promptly within the scope of the information processing performance of the diagnosis processing server 1, so that the user can get the diagnosis result early.

Therefore, if the user does not have a dedicated analytical instrument or a skill required for anomaly diagnosis of the sliding member, the user can make an anomaly diagnosis request easily with a small burden and moreover can get the diagnosis result promptly and deal with occurrence of the anomaly rapidly.

Figure 8:
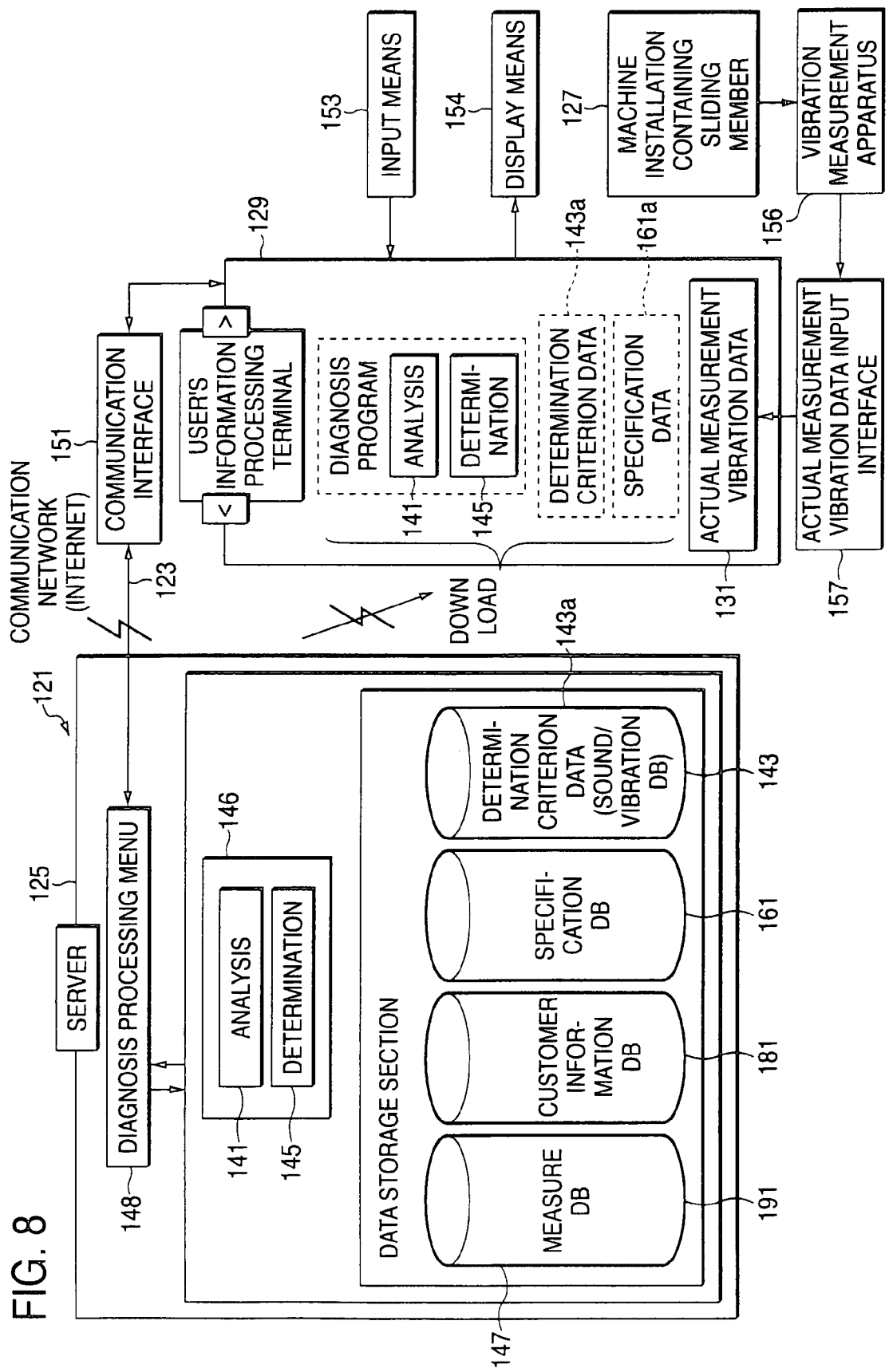
FIG. 8 is a block diagram to show the configuration of a second embodiment of an anomaly diagnosis apparatus of a machine installation according to the invention.

FIG. 8 is a block diagram to show the configuration of a second embodiment of an anomaly diagnosis apparatus of a machine installation according to the invention.

An anomaly diagnosis apparatus 121 of a machine installation of the second embodiment is made up of a diagnosis processing server 125 of an information processing apparatus (computer) connected to a network 123 and an information processing terminal 129 which is installed in the user using a machine installation 127 containing a sliding member wherein the presence or absence of an anomaly is to be diagnosed and can access the diagnosis processing server 125 through the network 123, and the Internet is used as the network 123.

In the embodiment, the sliding member used with the machine installation 127 is a rolling bearing.

Uploaded in an executable data format in the information processing terminal 129 to the diagnosis processing server 125 are an actual measurement data analysis program 141 for analyzing actual measurement vibration data 131 recording sound or vibration occurring when the machine installation 127 containing the sliding member operates, determination criterion data 143a recording information used as the determination criterion of the presence or absence of an anomaly at a specific part of the machine installation 127 containing the sliding member, and a determination program 145 for comparing the analysis result of the actual measurement data analysis program 141 with the determination criterion data 143a and diagnosing the presence or absence of an anomaly for the specific part of the machine installation 127 containing the sliding member.

As the determination criterion data 143a, the frequency component of vibration occurring when the specific part of the machine installation is abnormal and the standard peak level in the frequency component are calculated from the specifications, etc., of the machine installation and are set; the determination criterion data 143a is managed in a sound/vibration database 143 constructed in a data storage section 147 of the diagnosis processing server 125.

Various databases useful for diagnosis processing, such as a specification database 161 storing information of the specifications, etc., of the machine installation, a customer information database 181 storing information concerning the user using the machine installation to be diagnosed, and a measure database 191 storing information of measures, etc., returned to the user in response to the abnormal condition in addition to the above-mentioned sound/vibration database 143, are constructed in the data storage section 147.

The actual measurement data analysis program 141 and the determination program 145 are uploaded to a diagnosis program storage section 146 of the diagnosis processing server 125.

In the embodiment, when the actual measurement data analysis program 141 is executed in the information processing terminal 129, it performs appropriate analysis processing of envelope analysis, etc., for the actual measurement vibration data 131 and generates actual measurement frequency spectrum data indicating sound or vibration occurring when the sliding member used with the machine installation 127 rotates.

When the determination program 145 is executed in the information processing terminal 129, it adopts as the data stored in the determination criterion data 143a the frequency component occurring when the specific part of the machine installation 127 is abnormal as the determination criterion, and determines the presence or absence of an anomaly in the machine installation 127 containing the sliding member and locates the anomaly occurrence point based on whether or not a peak value of a given level or more appears at the determination criterion position on the actual measurement frequency spectrum data of the analysis result of the actual measurement data analysis program 141. The determination program 145 outputs the determination result to display means information processing terminal 54 or if the user makes a request, outputs the determination result to a printer connected to the information processing terminal 129.

The actual measurement data analysis program 141, the determination program 145, and the determination criterion data 143a uploaded to the diagnosis processing server 125 are managed by a diagnosis processing menu 148 built in the diagnosis processing server 125 so that they can be downloaded according to a given access procedure.

In the anomaly diagnosis apparatus 121 of the embodiment, the measures to be taken by the user or the manufacturer in response to the abnormal condition of the machine installation 127 containing the sliding member diagnosed are set in detail in the measure database 191 of the diagnosis processing server 125. When the user downloads the actual measurement data analysis program 141 and the determination program 145, the measure database 191 is also downloaded together and the determination program 145 references the measure database 191 in response to the determination result and outputs the measures to be taken to eliminate the anomaly to the display means 154, etc.

The information processing terminal 129 is a personal computer and is connected to the network 123 through a communication interface 151.

Connected to the information processing terminal 129 are input means 153 of a keyboard, etc., and the display means 154 implemented as a CRT, etc., capable of displaying the various contents of the information processing terminal 129, such as the data stored in the information processing terminal 129 and the processing state in the information processing terminal 129.

A vibration measurement apparatus 156 for detecting sound or vibration of the rotation operation of the sliding member used with the machine installation 127 is connected to the information processing terminal 129 through an actual measurement vibration data input interface 157. The information processing terminal 129 inputs the actual measurement vibration data 131 provided by the vibration measurement apparatus 156 through the actual measurement vibration data input interface 157 and stores the data in a predetermined data storage section.

The user accesses the diagnosis processing server 125 through the network 123 from the information processing terminal 129 and downloads the actual measurement data analysis program 141, the determination program 145, and the determination criterion data 143a into the information processing terminal 129 of the user and on the other hand, inputs the actual measurement vibration data 131 to the information processing terminal 129 of the user through the actual measurement vibration data input interface 157 and executes the actual measurement data analysis program 141 and the determination program 145 in the information processing terminal 129 of the user for diagnosing the presence or absence of an anomaly in the machine installation 127 containing the sliding member in the information processing terminal 129 of the user.

Figure 9:
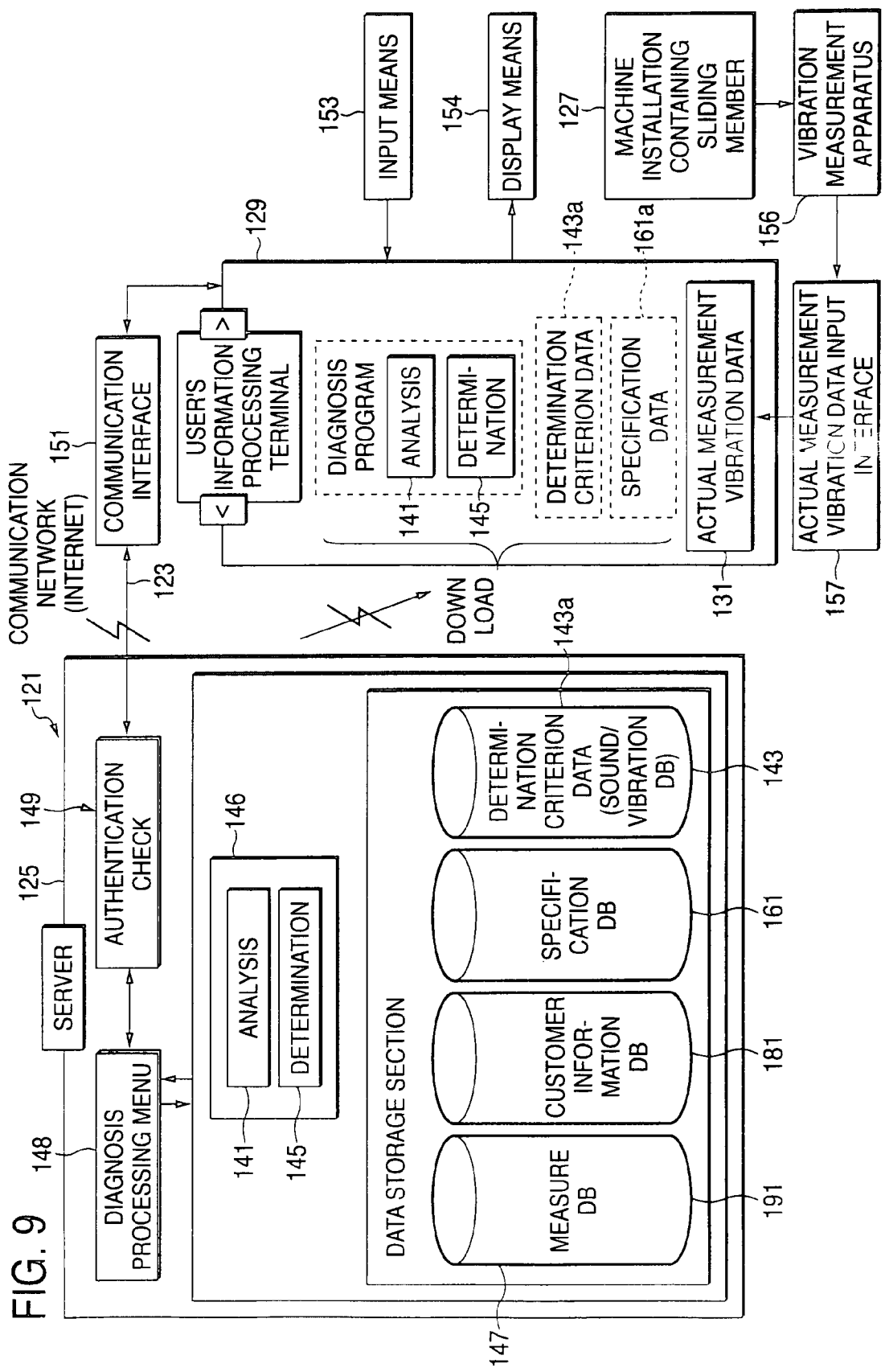
FIG. 9 is a block diagram to show the configuration of a third embodiment of an anomaly diagnosis apparatus of a machine installation according to the invention.

An authentication program for comparing with customer information of information required for authenticating the user using the machine installation 127 containing the sliding member and allowing the user to download the actual measurement data analysis program 141, the determination program 145, and the determination criterion data 143a when authenticating the user as the authorized user may be built in the diagnosis processing menu 148 of the diagnosis processing server 125 and only when the user is authenticated as the authorized user in an authentication check process 149 of the authentication program, as shown in FIG. 9, the user may be allowed to download the actual measurement data analysis program 141 and the determination program 145 as the user operates the diagnosis processing menu 148.

A protect program for limiting the number of use times or the expiration date in the downloading information processing terminal 129 may be added to the programs 41 and 45 and the data 143a downloaded from the diagnosis processing server 125 into the information processing terminal 129.

Figure 10:
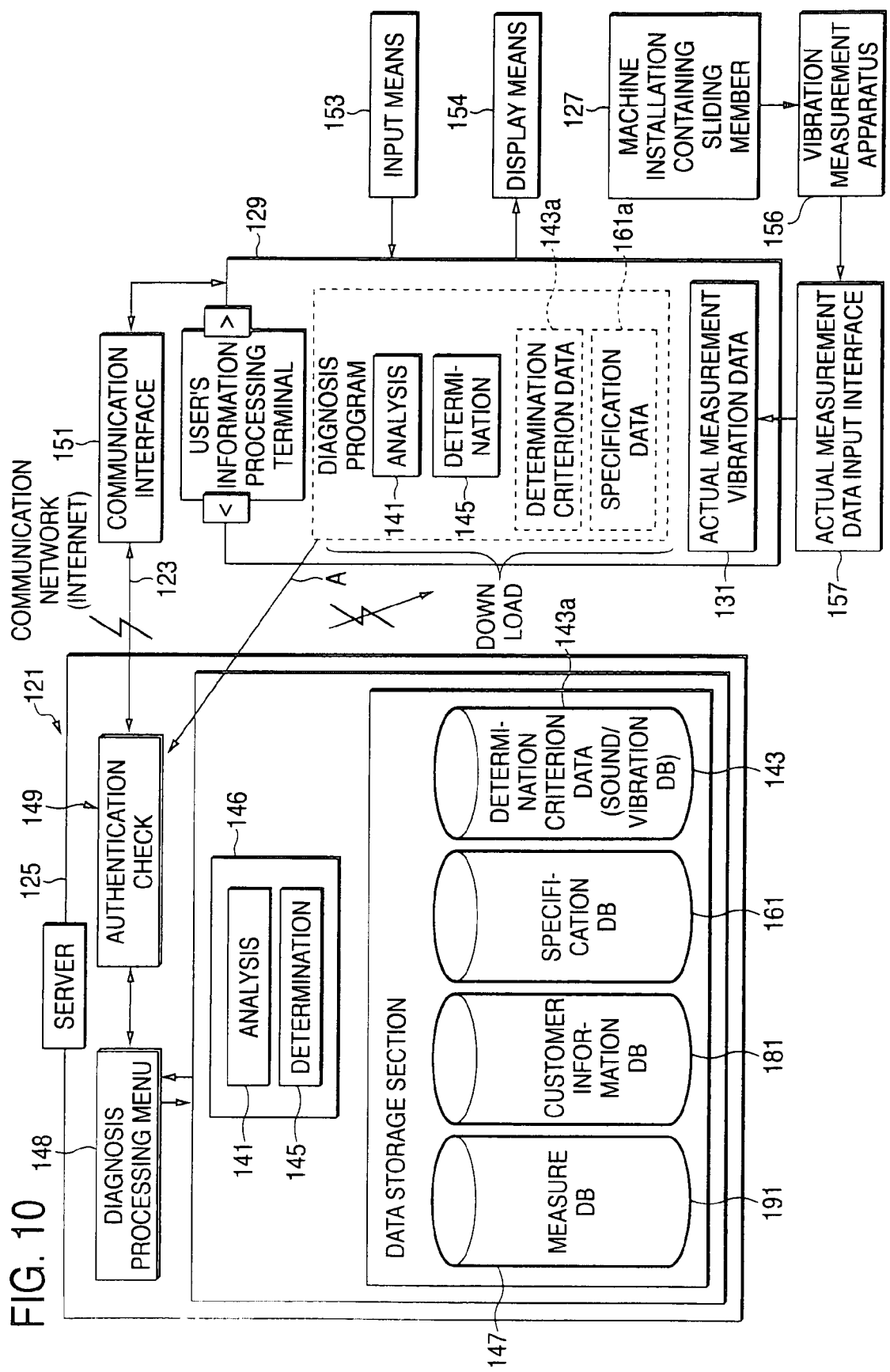
FIG. 10 is a block diagram to show the configuration of a fourth embodiment of an anomaly diagnosis apparatus of a machine installation according to the invention.

As indicated by arrow A in FIG. 10, the protect program may be automatically executed just after completion of download, may access the diagnosis processing server 125 for undergoing the authentication check process 149, and may erase, etc., the actual measurement data analysis program 141, the determination program 145, and the determination criterion data 143a after use the stipulated number of times, thereby limiting the number of use times.

In the anomaly diagnosis apparatus 121 of the second embodiment described above, to diagnose the presence or absence of an anomaly in the machine installation 127 containing the sliding member, the diagnosis processing of the diagnosis program made up of the actual measurement data analysis program 141 and the determination program 145 is performed in the information processing terminal 129 installed in the user, so that the user is saved from having to transmit the actual measurement vibration data 131 recording sound or vibration produced by the machine installation 127 containing the sliding member to be diagnosed to the manufacturer and the diagnosis processing can be speeded up because of saving labor and time required for transmitting the actual measurement vibration data 131 to the manufacturer.

The diagnosis processing server 125 to which the actual measurement data analysis program 141, the determination program 145, and the determination criterion data 143a required for the diagnosis processing are uploaded is used to download the programs and the determination criterion data 143a to the user's information processing terminal and does not execute the diagnosis processing itself and therefore concentrating of the diagnosis processing of a large number of users on one information processing apparatus can be circumvented.

Further, the actual measurement data analysis program 141, the determination program 145, and the determination criterion data 143a required for the diagnosis processing are downloaded into the information processing terminal 129 of the user via the network 123 and can be introduced into any desired information processing terminal 129 of the user if the information processing terminal 129 has a predetermined communication function and program execution performance, and the diagnosis processing can be left to any idle information processing apparatus of the user.

Therefore, as the diagnosis processing is started promptly, it can also be speeded up.

Further, concentrating of the diagnosis processing of a large number of users on one information processing apparatus need not be considered as described early, so that it can be expected that even an information processing apparatus having a not so high computation processing capability will perform comparatively rapid processing.

Therefore, as a system configuration limiting the computation processing capability of the information processing terminal 129 in moderation in such a manner that a popularly priced personal computer is adopted as the information processing terminal 129, the system construction cost can be suppressed to a low cost and at the same time, the diagnosis processing can be speeded up.

In the anomaly diagnosis apparatus 121 of the embodiment, the Internet already constructed as a wide-area network and also promoted to broadband for realizing high-speed communications is used as the network 123 for accessing the diagnosis processing server 125, so that there is no extra cost for constructing, improving, etc., a dedicated network and it is made possible for a large number of users to use the diagnosis system easily and at low cost.

Since the anomaly diagnosis apparatus 121 of the embodiment has the authentication program for allowing only the authorized user to download the programs and the data, it is made possible for the diagnosis processing server 125 to manage the versions, etc., of the diagnosis program and the determination criterion data 143a required by the user in more detail with the authentication program and the customer data in association with each other, for example; it is made possible to realize reliable downloading the optimum diagnosis program and the determination criterion data 143a without placing any burden on the user accessing the diagnosis processing server 125, and service as the manufacturer can be enhanced.

Since the anomaly diagnosis apparatus 121 of the embodiment adds the protect program for limiting the number of use times or the expiration date in the information processing terminal 129 to the programs and the data downloaded from the diagnosis processing server 125, illegal repeated use or drain of the diagnosis processing program and the determination criterion data 143a downloaded into the user can be prevented and erroneous use of the program and the data for anomaly diagnosis of a sliding member used with a different type of machine installation or the like can be prevented.

Therefore, illegal drain of the technology of the manufacturer can be prevented and the reliability of the diagnosis processing can be enhanced.

In the embodiment, the protect program automatically executed just after completion of downloading the program and the data required for the diagnosis processing from the diagnosis processing server for limiting the number of use times of the downloaded program and data is added to the downloaded program and data. However, a similar advantage can also be provided by adopting a method of adding a protect program for limiting the expiration date or the use time from the download completion time in such a manner that the downloaded program and data are erased after the expiration of a given time since the download completion time, for example, or a step of accessing the diagnosis processing server and receiving authentication (process indicated by the arrow A shown in FIG. 10) when the downloaded program is executed in place of the protect program for limiting the number of use times.

In the embodiment, the specific analysis method of the actual measurement vibration data in the actual measurement data analysis program, etc., is not limited to the envelope analysis, etc., shown in the embodiment described above. Various waveform processing and analysis methods of shaping the vibration waveform data and revealing the waveform features can be applied.

The specific processing method of the determination program is not limited to the method in the embodiment described above either.

Further, the sliding member in the machine installation wherein the presence or absence is diagnosed is not limited to a rolling bearing either. Various machines and machine elements having rotary sliding parts or linear sliding parts, such as ball screws, linear guides, or motors, for example, with unusual change made in operation sound when an anomaly of damage, etc., occurs in the sliding part can come under the sliding members according to the invention.

The types of data stored in the data storage section of the diagnosis processing server according to the invention, etc., are not limited to those in the embodiment described above either. The types of data stored, etc., and putting data into databases can be improved whenever necessary so that authentication of the authorized user and reporting of the measures responsive to the anomaly occurrence state can be executed speedily.

The network to which the diagnosis processing server is connected is not limited to the Internet. For example, a locally useful network, such as an already existing network using public lines or a cable TV network, may be selected.

Figure 11:
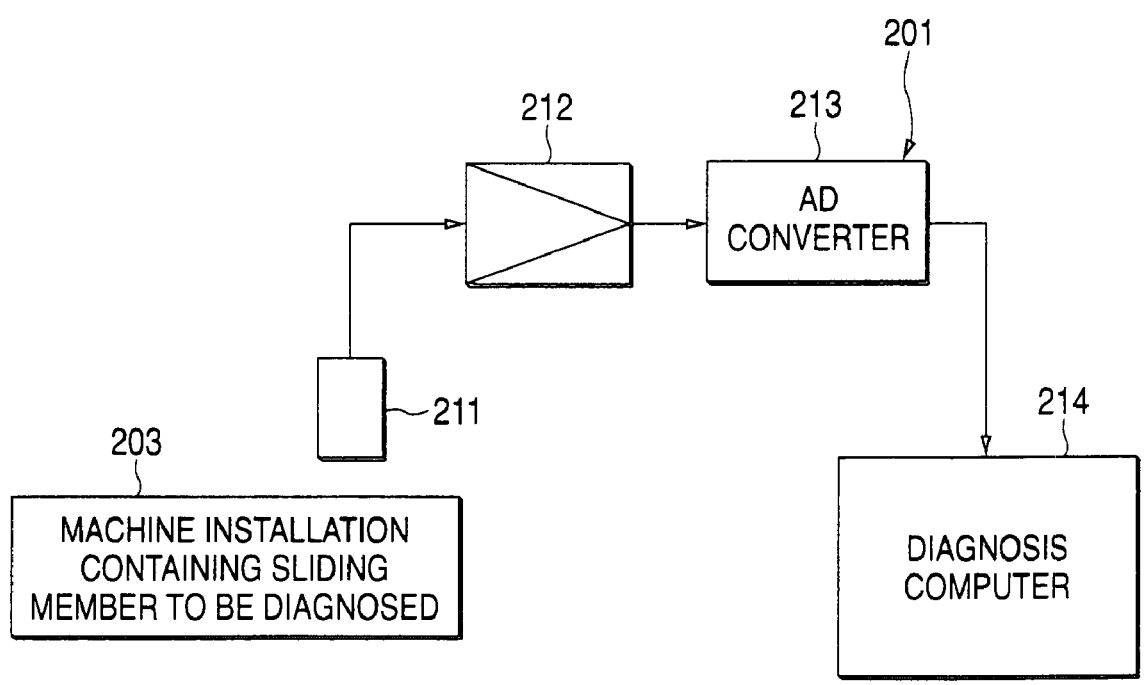
FIG. 11 is a block diagram to show the configuration of a fifth embodiment of an anomaly diagnosis apparatus of a machine installation according to the invention.
Figure 12:
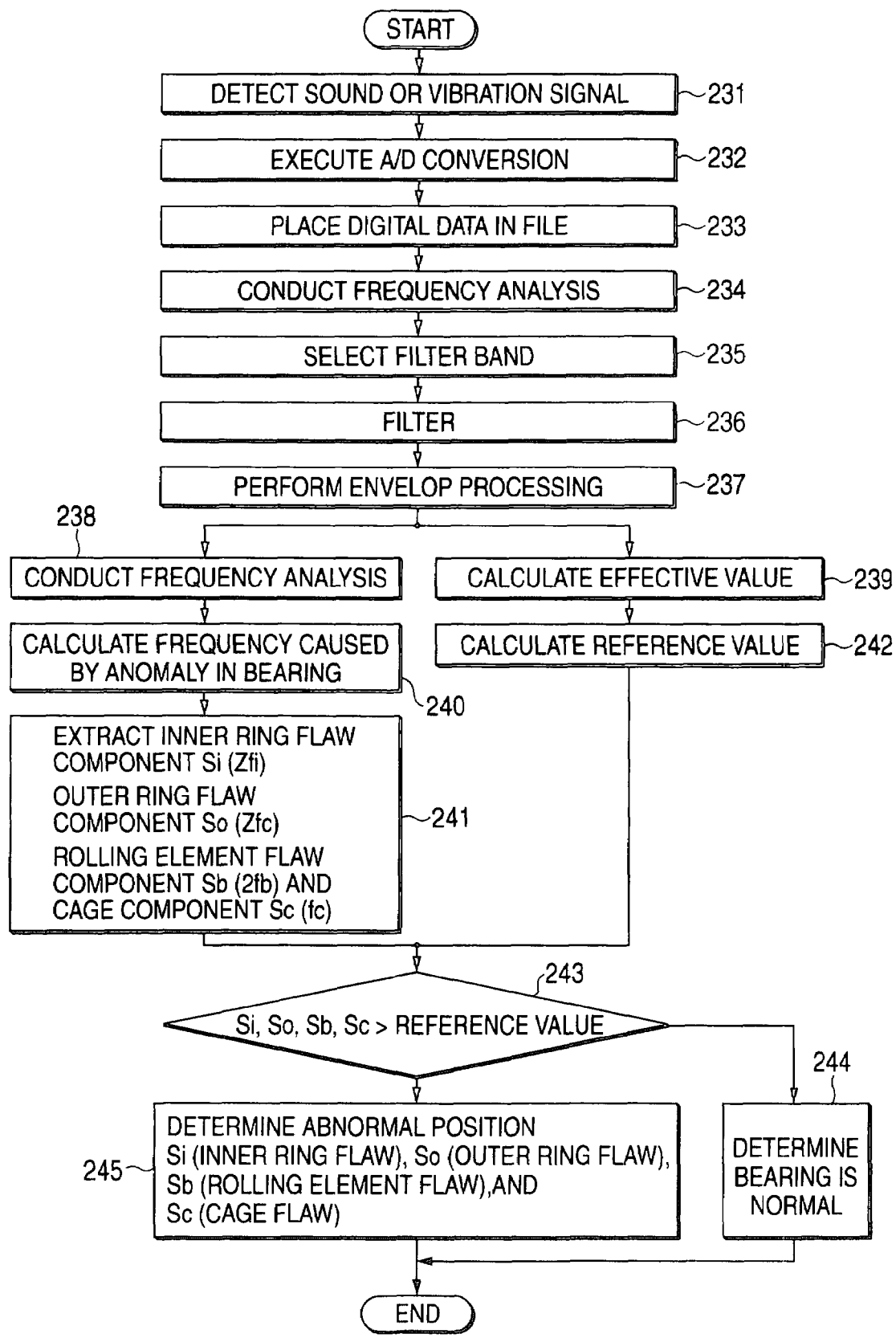
FIG. 12 is a flowchart to show a procedure of anomaly diagnosis processing executed by the apparatus in FIG. 11.

FIG. 11 is a block diagram to show the configuration of a fifth embodiment of an anomaly diagnosis apparatus of a machine installation according to the invention, and FIG. 12 is a flowchart to show a procedure of anomaly diagnosis processing executed by the apparatus in FIG. 11.

An anomaly diagnosis apparatus 201 of the embodiment diagnoses the presence or absence of an anomaly caused by damage, etc., to a rolling bearing of a sliding member for a machine installation 203 installing one or more rolling bearings as sliding members causing vibration to occur at the operation time.

It is known that the presence or absence of damage to a rolling bearing can be determined based on whether or not an envelope signal of vibration occurring from the bearing has a peak in a specific frequency component.

The frequency can be calculated from the specifications of the bearing, and the relationship between damage points and frequencies as shown in FIG. 13 is known.

Therefore, the presence or absence of damage to a bearing can be determined simply by extracting only the frequency component from the frequency spectrum of an envelope signal of vibration occurring from the bearing and comparing the frequency component with a reference value determined in response to the effective value of the envelope signal.

The frequency is calculated after specification data is input when a diagnosis is made. To diagnose the same installation or machine, the data resulting from the past calculation may be retained and be read for use.

The anomaly diagnosis apparatus 201 of the embodiment includes a sensor 211 for detecting sound or vibration, an amplifier 212, an AD converter 213, and a diagnosis computer 214. The sensor 211 detects sound or vibration in the proximity of the diagnosis point of the machine installation 203 or machine to be diagnosed and uses a microphone, a vibration acceleration sensor, etc.

A signal provided by the sensor 211 is amplified by the amplifier 212 and then is converted into a digital signal by the AD converter 213 and the digital signal is input to the diagnosis computer 214.

The diagnosis computer 214 contains a frequency analysis program and conducts an anomaly diagnosis. For frequency analysis used for an anomaly diagnosis based on sound or vibration data, various methods are well known and therefore will not be discussed here.

An anomaly diagnosis method executed by the anomaly diagnosis apparatus 201 of the embodiment is an improvement in determination procedure of the presence or absence of an anomaly and an abnormal point based on frequency analysis data.

Next, the processing procedure in the anomaly diagnosis method executed by the anomaly diagnosis apparatus 201 will be discussed with reference to FIG. 12.

To begin with, the user who wants to make an anomaly diagnosis detects sound or vibration data at the bearing use point by the sensor 211 (step 231) and converts the detected analog data into digital data by the AD converter 213 (step 232) and enters the digital data in the diagnosis computer 214.

The diagnosis computer 214 places the digital data in a file in a predetermined format (for example, a WAV file) (step 233). Hereinafter, the sound or vibration data placed in a file will be described simply as "digital data."

The data may be converted into digital form using an AD conversion section (not shown) contained in the diagnosis computer 214. The analog data from the sensor 211 may be converted directly into digital form or the data once recorded on magnetic tape, etc., may be converted into digital form.

Next, the diagnosis computer 214 conducts frequency analysis of the input digital data and determines the main frequency band of the input data (step 234). The diagnosis computer 214 determines the filter band in response to the determined frequency band (step 235) and filters the digital data (step 236). This step is executed to improve S/N of the input sound or vibration data and need not be executed if S/N of the input signal is sufficient.

Subsequently, envelope processing is executed (step 237) and frequency analysis processing is performed for the provided envelope data (step 238) and the effective value is calculated (step 239). The effective value provided at step 239 is used for calculation processing of a reference value to determine an anomaly (step 242). The reference value is found according to an expression such as reference value=effective value+α (α: Variable) or reference value=effective value×β (β: Variable), for example.

At step 240, computation shown in FIG. 13 is performed based on the design specifications and use conditions of the bearing used at the diagnosis point, and the frequency component value occurring when an anomaly occurs at a specific point of the bearing is calculated. The calculated frequencies correspond to an inner ring flaw, an outer ring flaw, a rolling element flaw, and cage sound.

The frequency component values may be calculated before the step or when a similar diagnosis was conducted formerly, the data may be used. The specification data used for calculation is previously input.

Next, from the frequency spectrum data provided at step 238, inner ring flaw component Si (Zfi), outer ring flaw component So (Zfc), rolling element flaw component Sb ($2fb$), and cage component Sc (fc) are extracted in response to the frequency component values calculated at step 240 (step 241), and the components are compared with the reference value calculated at step 242 (step 243). When all components are smaller than the reference value, it is determined that the bearing is normal (step 244). When any component is larger than the reference value, the corresponding part is determined abnormal, and a message is output (step 245).

Figure 14:
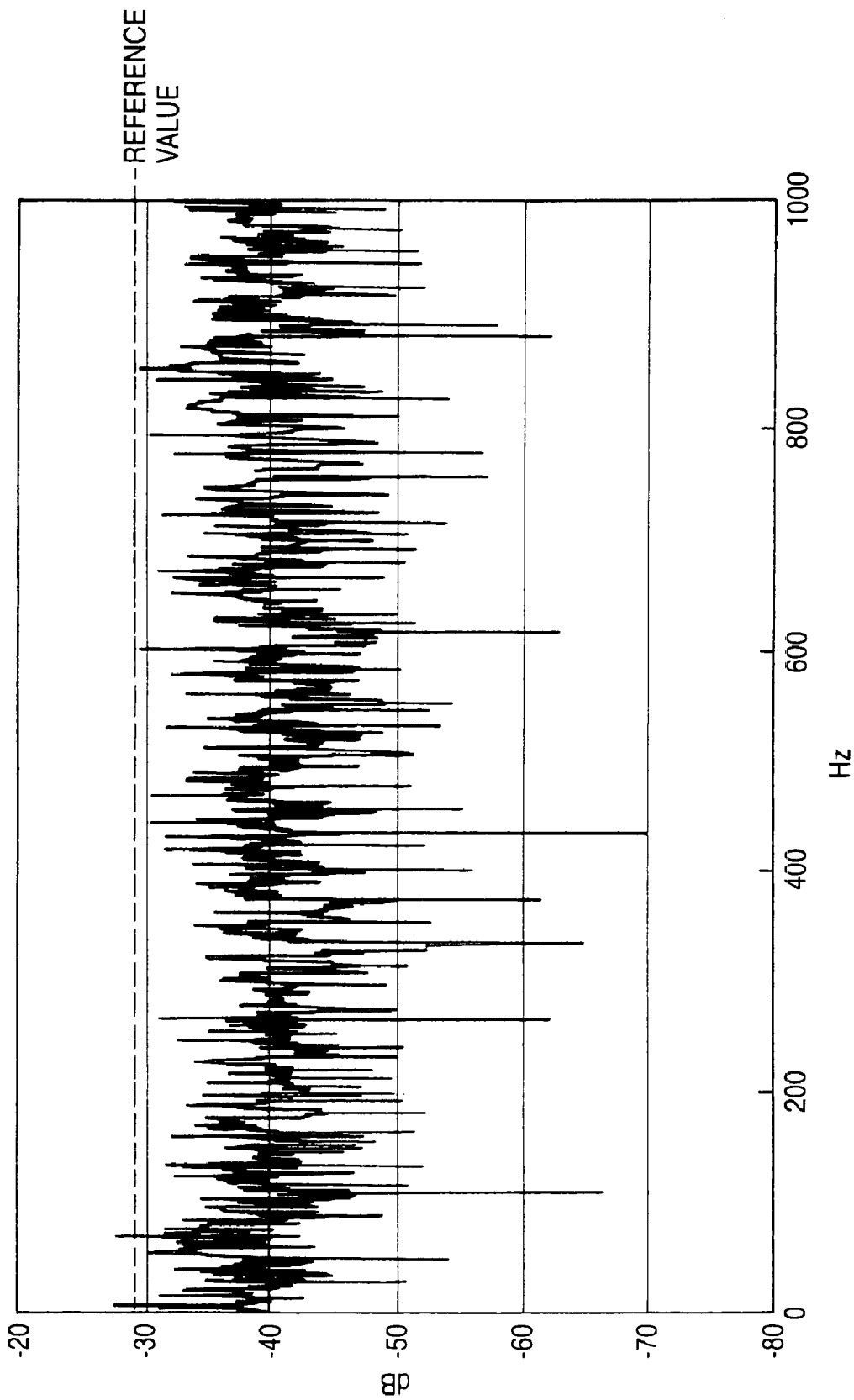
FIG. 14 provides a waveform provided by performing envelope processing.

Next, a specific example of anomaly diagnosis is shown. For example, actual measurement frequency spectrum and envelope processing waveforms obtained as sound is recorded from a single row deep groove ball bearing under the run conditions of fixed outer ring, 1500 revolutions of inner ring per minute, and axial load 9.8 N are obtained as in FIGS. 14 and 15. In FIG. 14, when the frequency components caused by the bearing are extracted and are compared with the reference value (−29.3 dB), the frequency components are smaller than the reference value. That is, it is understood that the frequency components exceeding the reference value are not caused by the bearing and therefore it can be determined that the bearing is normal.

Figure 15:
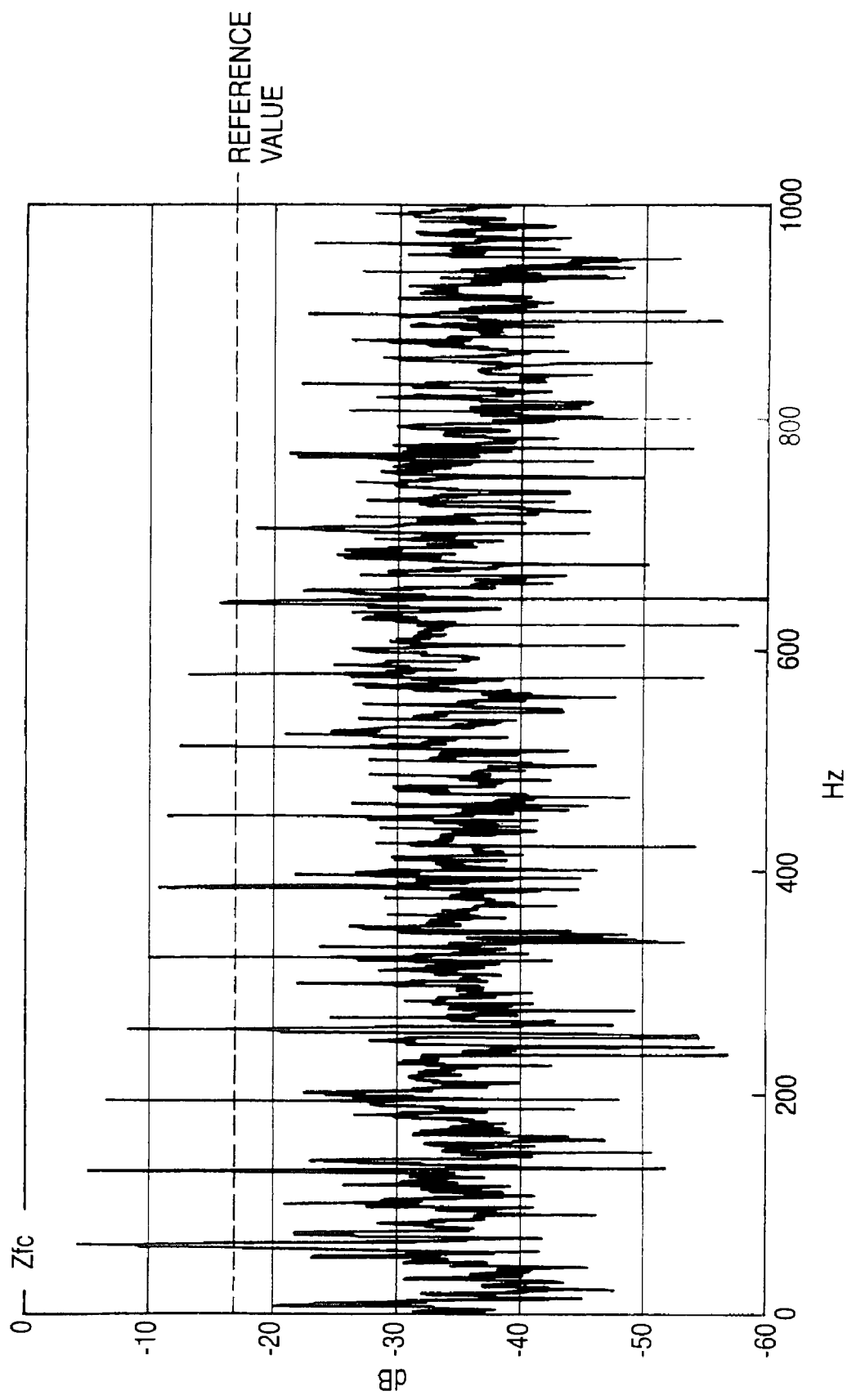
FIG. 15 provides another waveform provided by performing envelope processing.

On the other hand, in the example in FIG. 15, the Zfc component caused by damage to the outer ring of the specific part is larger than the reference value (−19.5 dB) and therefore the abnormal sound is determined an outer ring flaw sound. In the example, reference value=effective value+10 dB.

Figure 16:
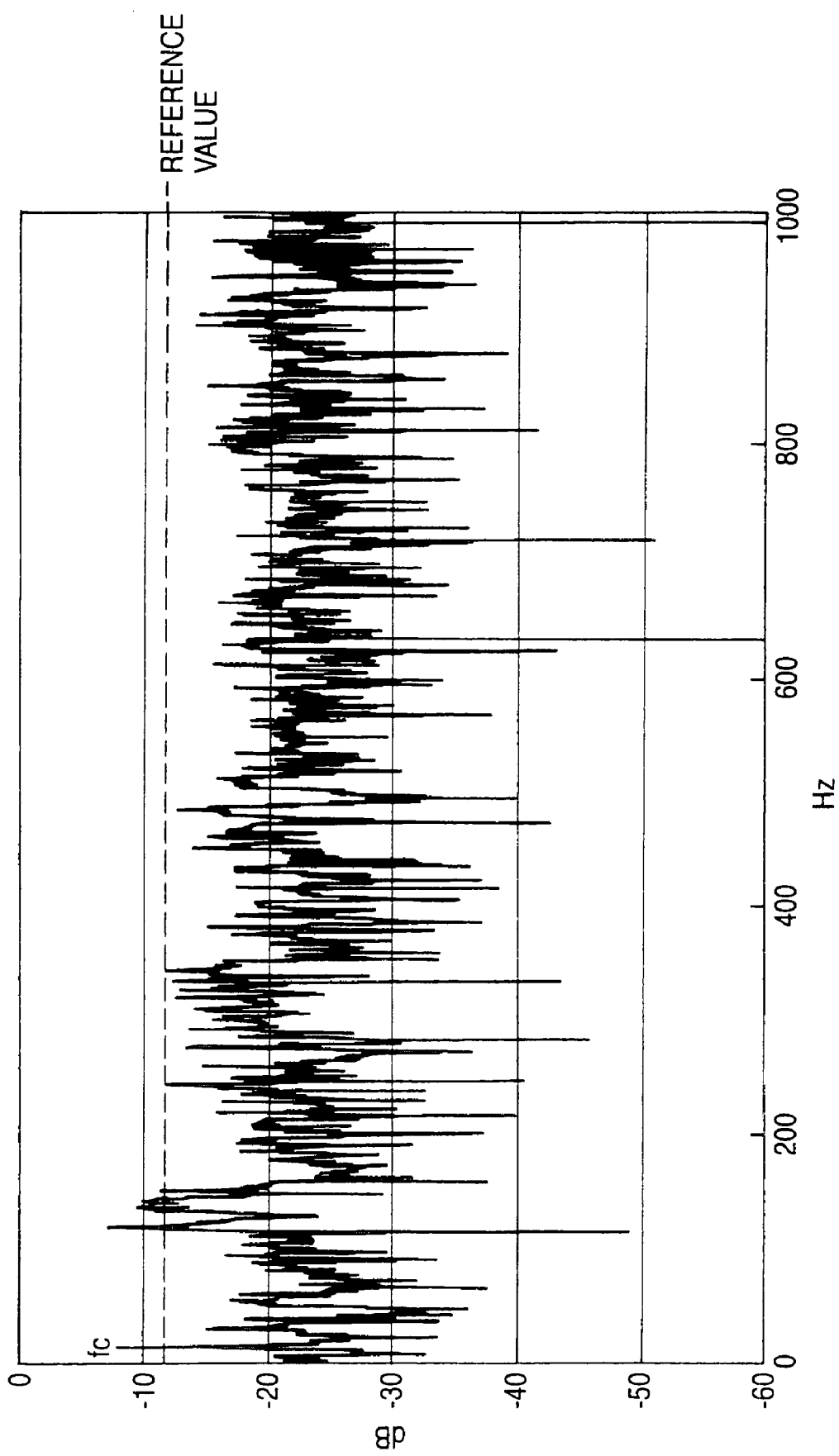
FIG. 16 provides another waveform provided by performing envelope processing.

Likewise, for a single row deep groove ball bearing (the part number differs from that in FIG. 14, 15) under the run conditions of fixed outer ring, 2400 revolutions of inner ring per minute, and axial load 9.8 N, waveform is obtained as in FIG. 16, for example. When the components caused by the bearing are extracted and are compared with the reference value (−12.6 dB), the fc component caused by damage to the cage of the specific part is larger than the reference value and a cage sound anomaly is found. Also in the example, reference value=effective value+10 dB.

Since the presence or absence of a peak of occurrence frequency is determined based on the match degree with the frequency caused by the bearing and the larger-than or smaller-than relation with the reference value, a diagnosis can be made if the peak level is small as in FIG. 16.

Thus, according to the anomaly diagnosis method according to the fifth embodiment of the invention, only specific frequency components are extracted from the frequency spectrum of an envelope signal of vibration occurring from the bearing and are compared with the reference value determined in response to the effective value of the envelope signal, so that the computation processing amount is lessened and speeding up the diagnosis processing can be promoted as compared with the related art method of checking to see if each frequency component is caused by the sliding member of the machine installation 203 in the descending order of spectrum levels after frequency analysis. If the spectrum level peak of the frequency component caused by the sliding member of the machine installation 203 is small, the components can be extracted and thus a highly accurate diagnosis is made possible.

In the description given above, the sound or vibration envelope signal is used to determine the presence or absence of a flaw of the bearing, but a signal representing sound or vibration can also be used directly to diagnose the presence or absence of chatter sound of the bearing.

Next, processing in a sixth embodiment of an anomaly diagnosis apparatus of a machine installation according to the invention will be discussed.

The anomaly diagnosis apparatus of the sixth embodiment differs from that of the fifth embodiment in diagnosis program installed in diagnosis computer, but has the same hardware configuration as the anomaly diagnosis apparatus of the fifth embodiment shown in FIG. 11 and therefore the hardware configuration will not be discussed again.

In the anomaly diagnosis apparatus of the sixth embodiment, sound or vibration data at the bearing use point is detected by a sensor 211 and the detected analog data is converted into digital data by an AD converter 213 to generate actual measurement digital data and the generated actual measurement digital data is input to a diagnosis computer 214. The diagnosis computer 214 performs appropriate analysis processing of frequency analysis, envelope analysis, and the like for the input actual measurement digital data to generate actual measurement frequency spectrum data and calculates the level difference between each arbitrary data point and its immediately preceding data point and a gradient to find a peak value for the generated actual measurement frequency spectrum data.

The reason why the peak value can be found will be discussed.

Since the actual measurement frequency spectrum data is digital data, each frequency and spectrum level data exist discretely, of course. Thus, an expression of a curve (namely, function) is not required and the level difference between data points can be used to find a peak value.

Figure 17:
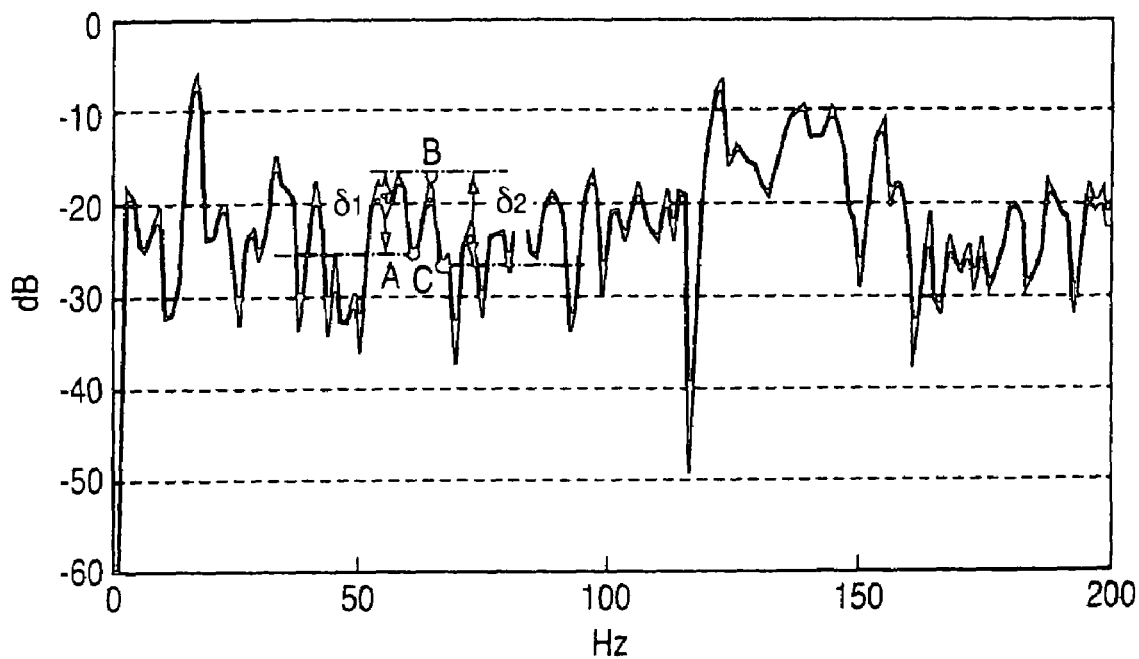
FIG. 17 is a drawing to describe a peak value calculation method of the invention.

Specifically, in FIG. 17, the value difference between the level of one frequency component (Y1) and the level one data before the frequency component (Y0) is calculated and the result is obtained as the difference data ($\delta$=Y1−Y0).

When the sign of the difference data ($\delta$) changes from plus to minus (zero in some cases), an inflection point is indicated and therefore the frequency data and spectrum level data involved in the difference data on which plus or minus is based is the peak value.

The peak value is calculated regardless of whether or not the crest is steep. By the way, the peak value required for diagnosis aims at only sharp waveforms and thus data when the gradient formed by the frequency data (x) and the spectrum level data (y) exceeds 1 (dy/dx>1) or is smaller than −1 (dy/dx<−1) is defined as the peak value.

The presence or absence of an anomaly and the anomaly part can be diagnosed by comparing with the frequency component caused by the bearing based on the peak value thus found.

Figure 18:
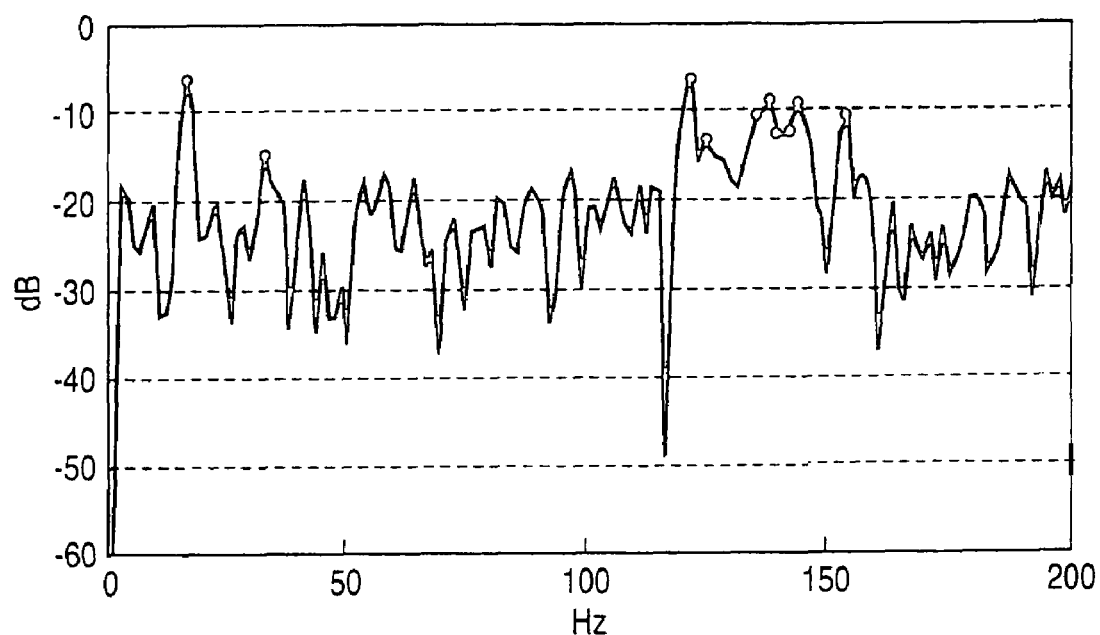
FIG. 18 is a drawing to describe a peak value extracting method from frequency components of large spectrum levels in order.

FIG. 18 shows an example of extracting 10 points of large spectrum levels in order using a peak value extracting method from frequency components of large spectrum levels about the frequency analysis result of data after undergoing AD conversion.

Figure 19:
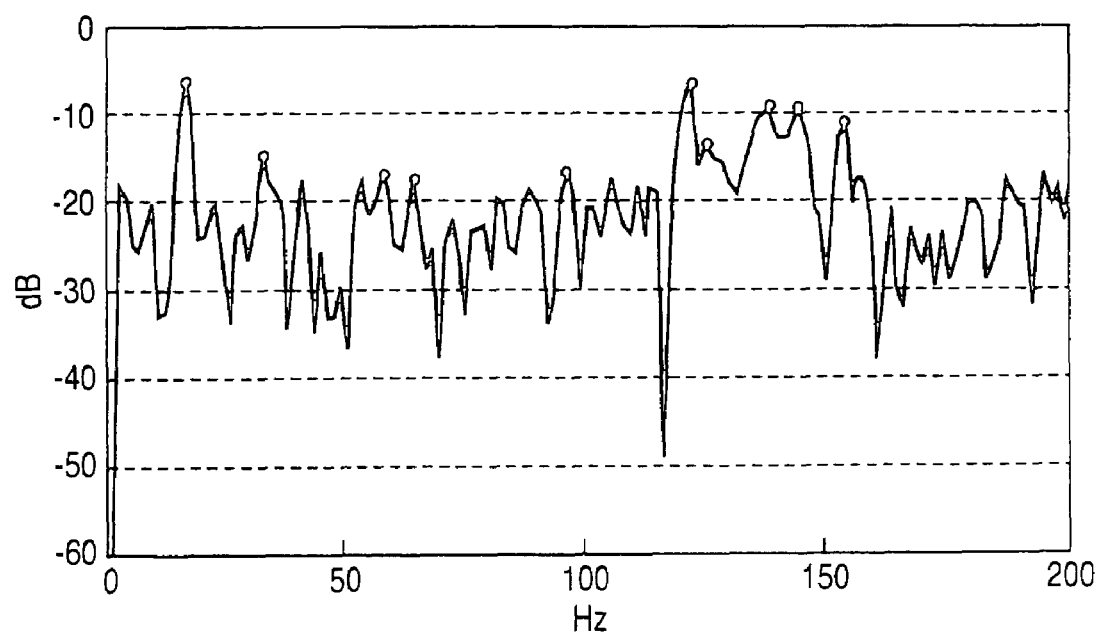
FIG. 19 is a drawing to describe peak value extraction by the peak value calculation method of the invention.

FIG. 19 shows an example of extracting 10 points of large spectrum levels in order by the peak value extracting method of the embodiment.

As shown in FIG. 18, it is seen that in the peak value extracting method in order from the frequency components of large spectrum levels, three points are extracted in the proximity of 140 Hz of valley points (values) of the spectrum although the level is high.

In contrast, in the peak value extracting method of the embodiment, as shown in FIG. 19, only peaks are extracted and the peaks in the proximity of 60 Hz can be extracted as 10 points of large spectrum levels. Adopting the peak value extracting method, only the peaks are extracted, so that lost of necessary data as the valley points (values) of the spectrum are extracted can be prevented.

After the peak values are thus found for the actual measurement frequency spectrum data, the presence or absence of an anomaly in the bearing is determined by comparing the peak values on the actual measurement frequency spectrum data relative to the frequency component caused by an anomaly in the bearing.

Figure 20:
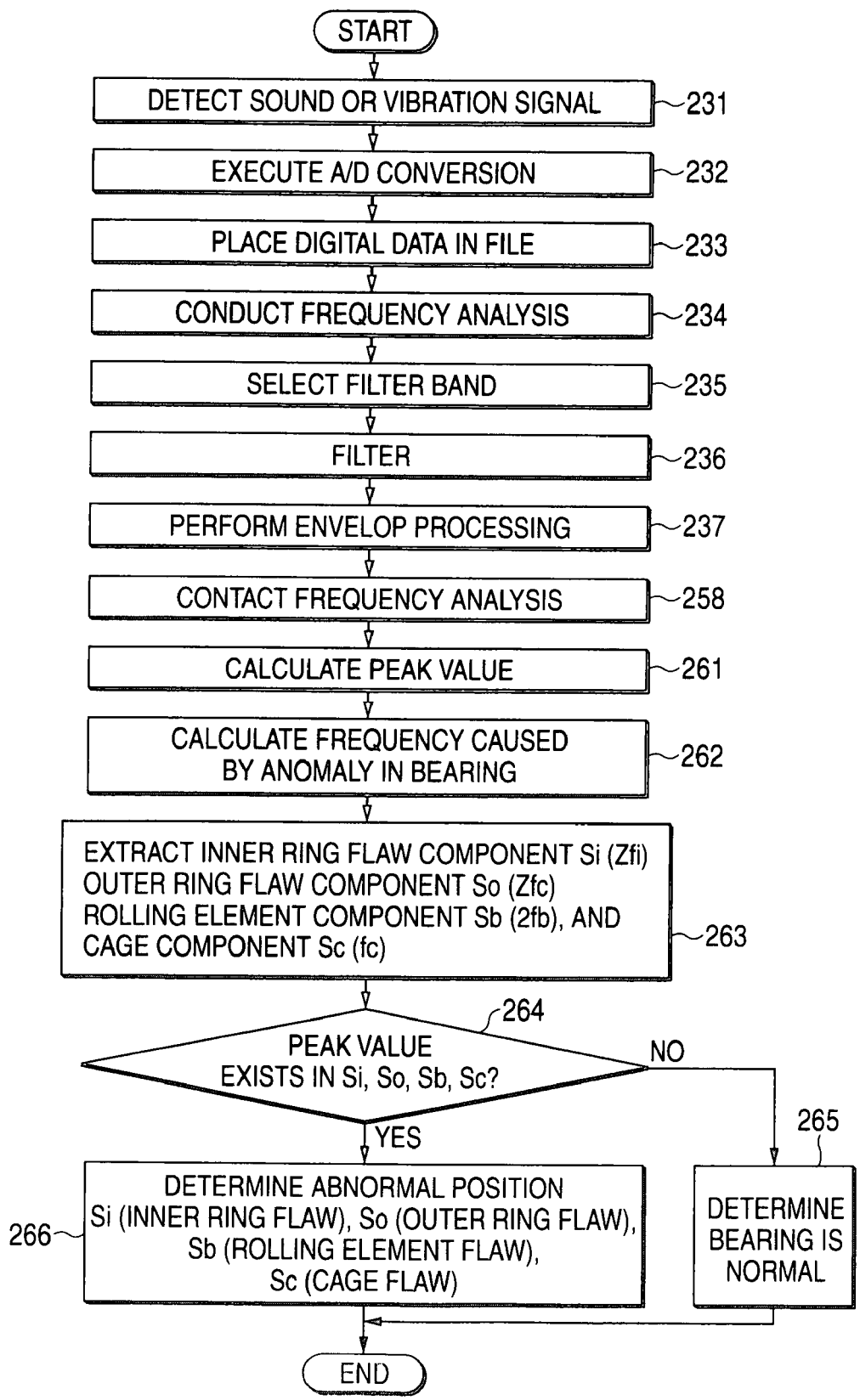
FIG. 20 is a flowchart of diagnosis processing according to a six embodiment of an anomaly diagnosis apparatus of a machine installation according to the invention.

FIG. 20 is a flowchart to show the processing procedure of the anomaly diagnosis method executed by the anomaly diagnosis apparatus of the sixth embodiment.

In the figure, steps 231 to 237 are the same as those previously described with reference to FIG. 12 and therefore will not be discussed again.

In the embodiment, envelope processing is executed (step 237) and frequency analysis processing is performed for the provided envelope data (step 258) and actual measurement frequency spectrum data is generated. For the generated actual measurement frequency spectrum data, the level difference between each arbitrary data point and its immediately preceding data point and a gradient are calculated to calculate a peak value (step 261).

At step 262, computation shown in FIG. 13 is performed based on the design specifications and use conditions of the bearing used at the diagnosis point, and the frequency component value occurring when an anomaly occurs at a specific point of the bearing is calculated. The calculated frequencies correspond to an inner ring flaw, an outer ring flaw, a rolling element flaw, and cage sound. The frequency component values may be calculated before the step or when a similar diagnosis was conducted formerly, the data may be used. The specification data used for calculation is previously input.

Next, from the frequency spectrum data provided at step 258, inner ring flaw component Si (Zfi), outer ring flaw component So (Zfc), rolling element flaw component Sb (2fb), and cage component Sc (fc) are extracted in response to the frequency component values calculated at step 262 (step 263), and the components are compared with the peak value calculated at step 261 (step 264). If there is no peak value in all components, it is determined that the bearing is normal (step 265).

If there is the peak value in any component, the corresponding part is determined abnormal, and a message is output (step 266).

That is, if the peak value exists for the inner ring flaw component Si (Zfi), it is determined that the inner ring contains an anomaly of a flaw, etc. If the peak value exists for the outer ring flaw component So (Zfc), it is determined that the outer ring contains an anomaly of a flaw, etc. If the peak value exists for the rolling element flaw component Sb (2fb), it is determined that the rolling element contains an anomaly of a flaw, etc. If the peak value exists for the cage component Sc (fc), it is determined that the cage contains an anomaly of a flaw, etc. If the peak value exists for a plurality of frequency components, it can be determined that there are a plurality of abnormal points. For example, if the peak value exists for each of the inner ring flaw component Si (Zfi) and the outer ring flaw component So (Zfc), it can be determined that the inner ring and the outer ring are abnormal.

Thus, according to the anomaly diagnosis method of the sixth embodiment, to conduct frequency analysis or envelope analysis on the signal provided by detecting sound or vibration at the bearing use point and extract frequency peaks from the actual measurement frequency spectrum data provided accordingly, for the actual measurement frequency spectrum data, the level difference between each arbitrary data point and its immediately preceding data point and a gradient are calculated to find a peak value, so that extracting of a valley can be circumvented and higher-accuracy diagnosis is made possible as compared with the case of extracting from frequency components of large spectrum levels.

In the embodiment, the signal generated from the sliding member of a machine installation 203 is processed, but the invention can also be applied to a mode wherein a shape signal of roughness, etc., is converted into a digital amount.

In the embodiment, the peak value is found for the waveform after frequency analysis or envelope analysis, but the peak value may be extracted from actual measurement digital data into which data of detected sound or vibration occurring from the bearing is converted.

Figure 21:
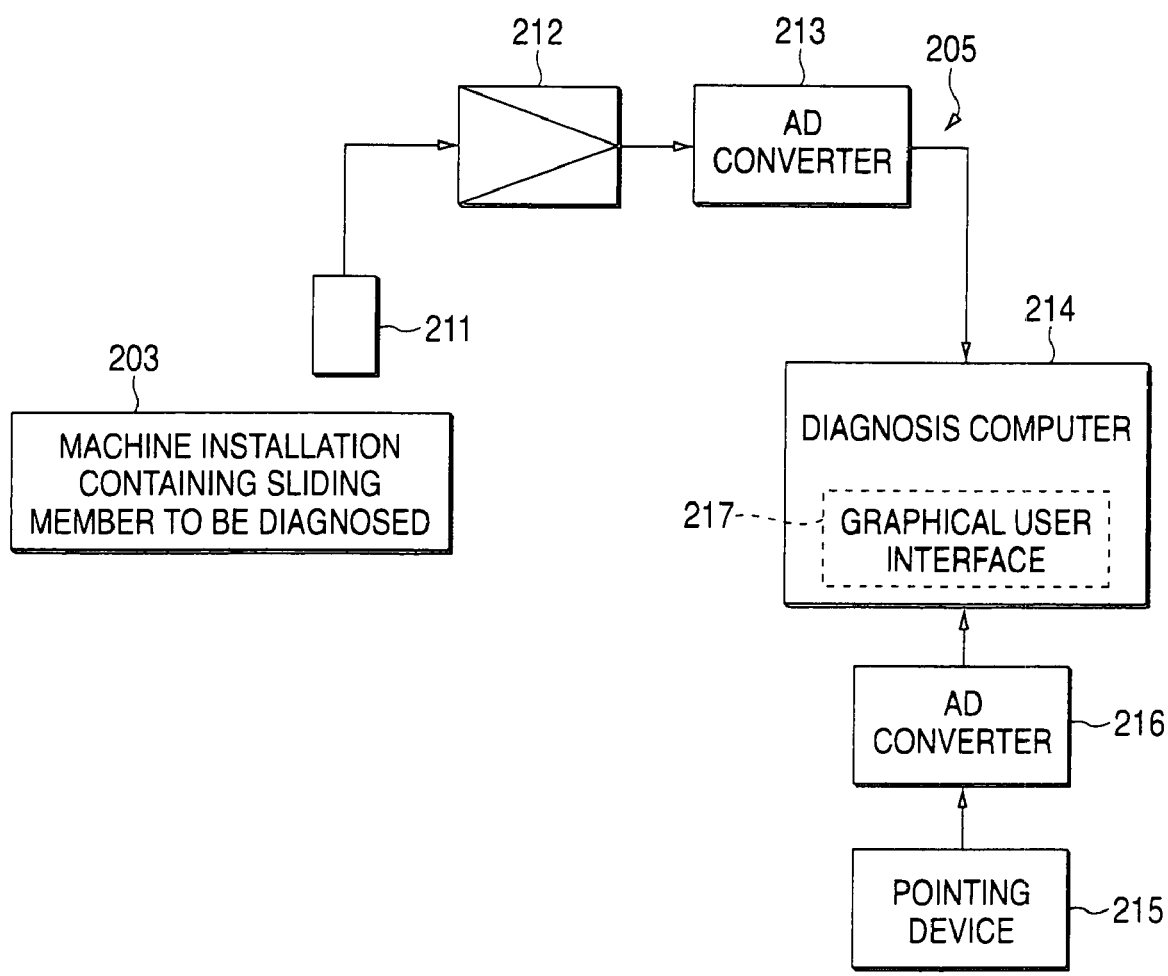
FIG. 21 is a schematic block diagram of a seventh embodiment of an anomaly diagnosis apparatus of a machine installation according to the invention.

FIG. 21 is a block diagram to show a schematic configuration of a seventh embodiment of an anomaly diagnosis apparatus according to the invention. Components common to those of the anomaly diagnosis apparatus 201 of the fifth embodiment shown in FIG. 11 are denoted by the same reference numerals in FIG. 21.

An anomaly diagnosis apparatus 205 of the seventh embodiment detects sound or vibration at a bearing use point by a sensor 211 and converts detected analog signal into digital data by an AD converter 213 to generate actual measurement digital data and inputs the generated actual measurement digital data to a diagnosis computer 214. The diagnosis computer 214 includes a pointing device 215 such as a mouse and an AD converter 216 for converting X and Y coordinate data output from the pointing device 215 into digital data.

The diagnosis computer 214 further includes a graphical user interface 217, enabling the user to use the pointing device 215 to select any desired time domain out of a time domain waveform based on waveform data after AD conversion or any desired frequency domain out of a frequency domain waveform based on waveform data provided by conducting frequency analysis of the waveform data after AD conversion, as described below.

The waveform data after AD conversion or the waveform data provided by conducting frequency analysis of the waveform data after AD conversion is displayed on a monitor (not shown) of the diagnosis computer 214. While seeing the display, the user operates the pointing device 215 to specify any desired time domain waveform or any desired frequency domain waveform.

When the user uses the pointing device 215 to select any desired time domain part out of the waveform data visually displayed on the monitor, appropriate analysis processing of frequency analysis, envelope analysis, etc., is performed for the data in the time domain part to generate actual measurement frequency spectrum data and visually displays the actual measurement frequency spectrum data on the monitor. Next, when the user uses the pointing device 215 to specify any desired frequency domain part in the frequency domain waveform visually displayed on the monitor, the diagnosis computer 214 assumes the frequency domain part to be a filter band and filters actual measurement digital data to generate new actual measurement frequency spectrum data.

After the actual measurement frequency spectrum data is generated, the level difference between each data point and its immediately preceding data point and a gradient are calculated to find a peak value in the ascending order of the frequencies. After the peak value is found, it is compared with the peak value on the actual measurement frequency spectrum data for the frequency component occurring when a specific part of the bearing is abnormal, and the presence or absence of an anomaly in the bearing is diagnosed.

Here, a specific example will be discussed with reference to the accompanying drawings.

Figure 22:
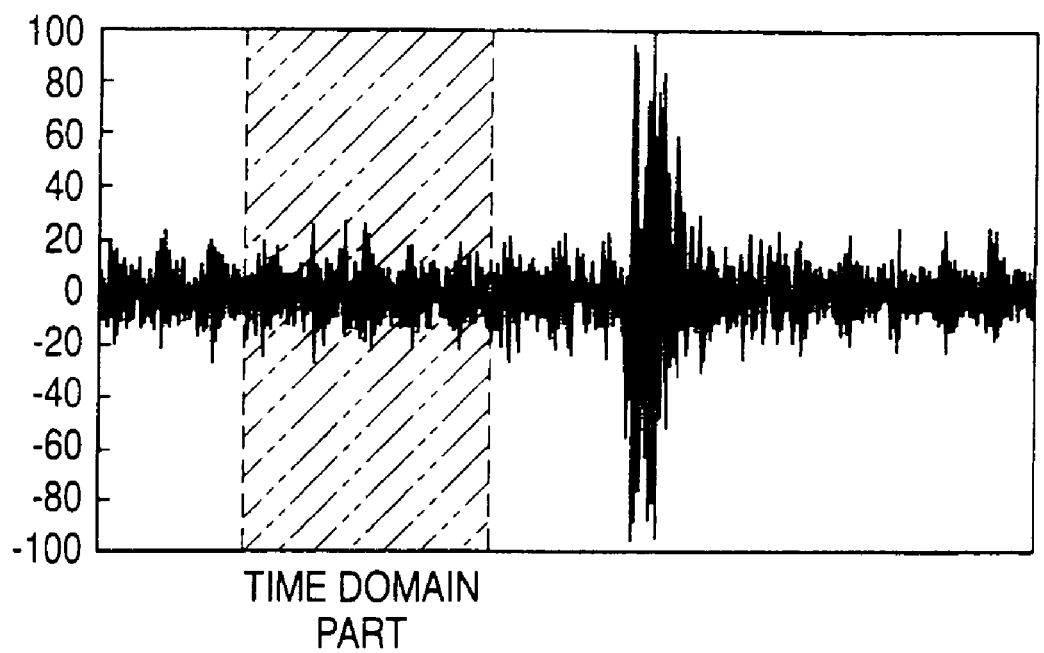
FIG. 22 is a drawing to describe diagnosis processing of the anomaly diagnosis apparatus of a machine installation shown in FIG. 21 and is a raw waveform chart of signal data.

FIG. 22 is a raw signal data waveform chart after AD conversion. The user uses the pointing device 215 to drag a portion which seems to be less affected by noise, etc., in the signal data waveform, thereby selecting any desired time domain.

Figure 23:
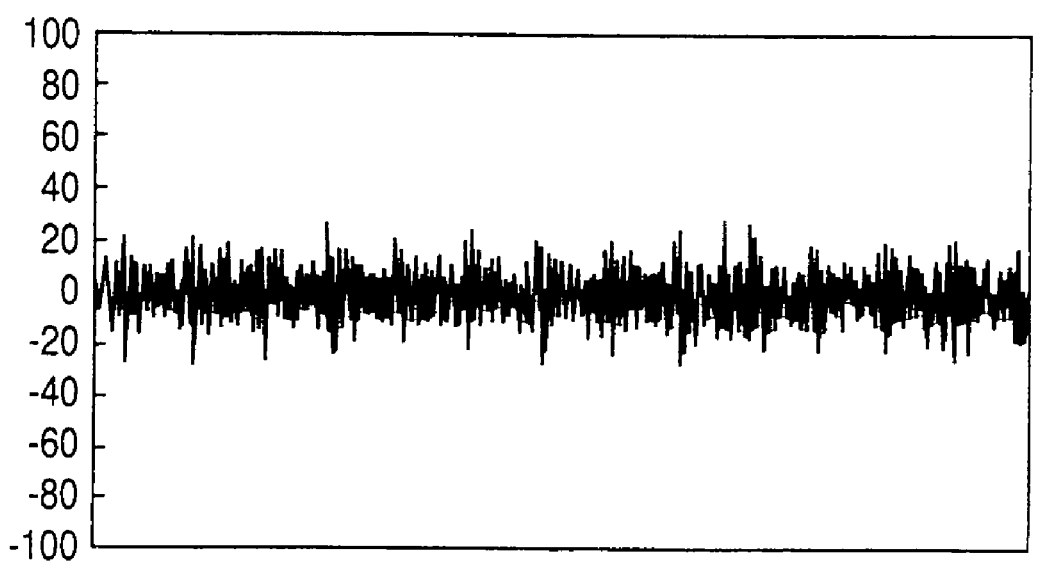
FIG. 23 is a drawing to describe diagnosis processing of the anomaly diagnosis apparatus of a machine installation shown in FIG. 21 and is an enlarged view of selection range part of the raw waveform of signal data.
Figure 24:
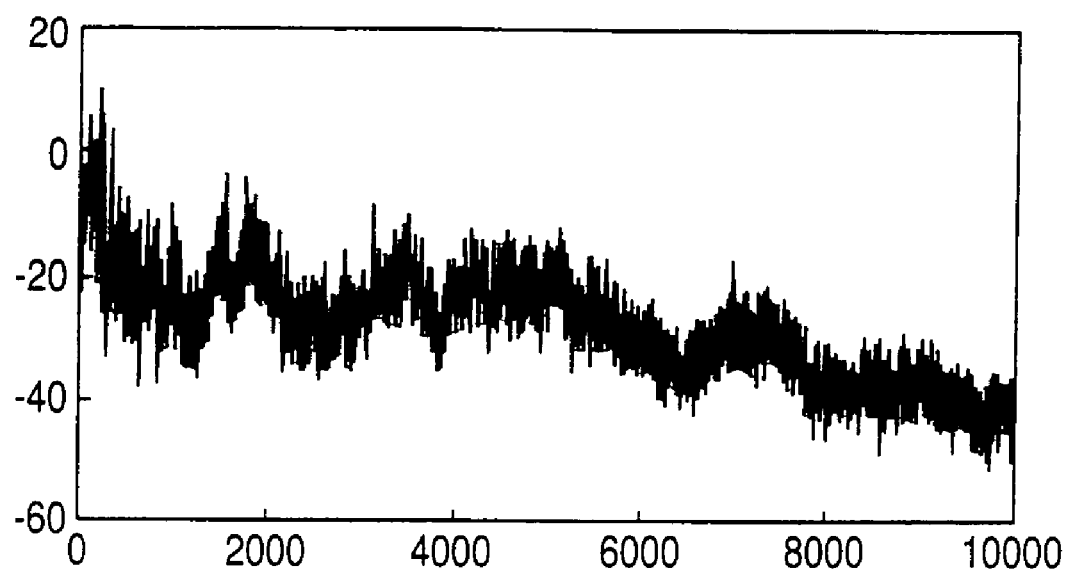
FIG. 24 is a drawing to describe diagnosis processing of the anomaly diagnosis apparatus of a machine installation shown in FIG. 21 and is a frequency spectrum of signal data.
Figure 25:
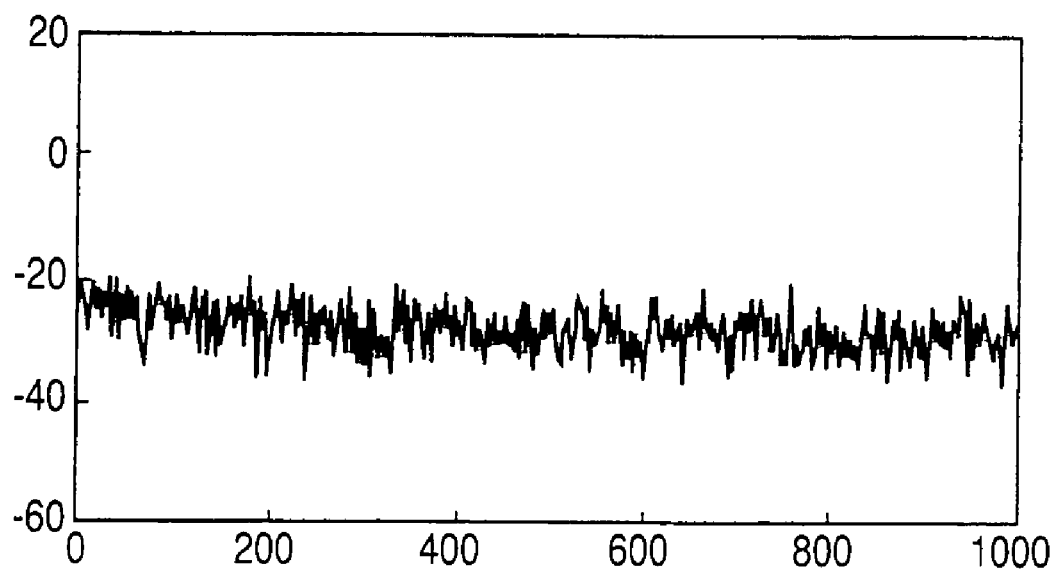
FIG. 25 is a drawing to describe diagnosis processing of the anomaly diagnosis apparatus of a machine installation shown in FIG. 21 and is a drawing to show an envelope frequency spectrum of signal data.

The hatched portion in the figure is the selected portion (time domain part). After the time domain part is selected, a raw waveform of signal data in the selected range is visually displayed automatically or by simple operation (see FIG. 23). If necessary, further range selection can also be performed. Envelope processing and frequency analysis are performed for the selected signal data automatically or by simple operation and a frequency spectrum (see FIG. 24) and an envelope frequency spectrum (see FIG. 25) are visually displayed.

Figure 26:
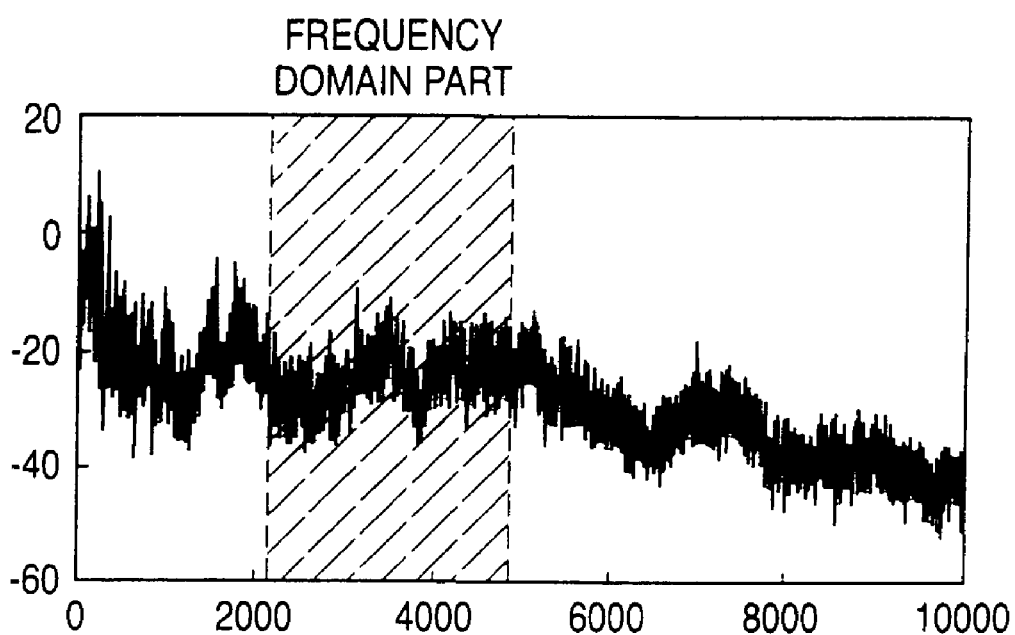
FIG. 26 is a drawing to describe diagnosis processing of the anomaly diagnosis apparatus of a machine installation shown in FIG. 21 and is a drawing to show frequency spectrum of signal data and selected range.
Figure 27:
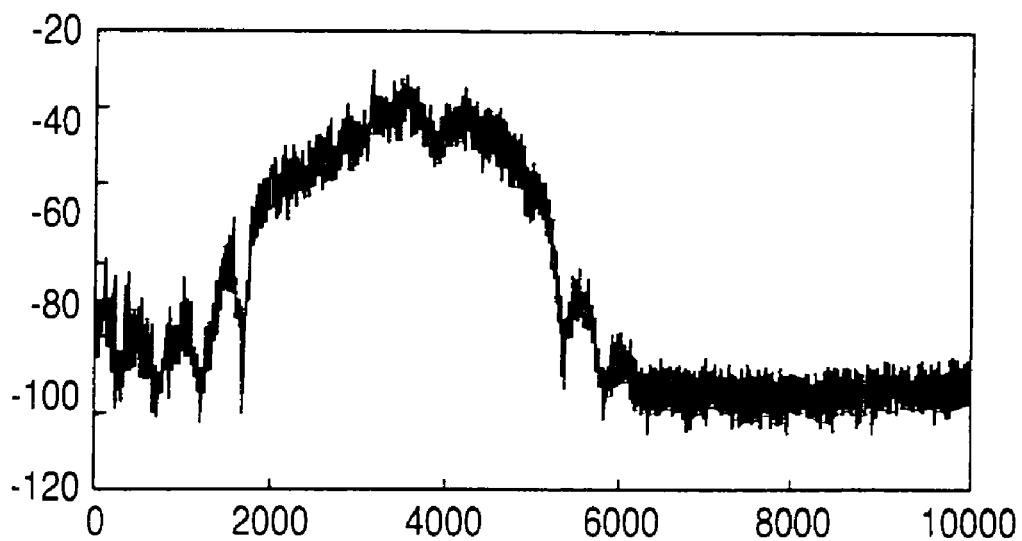
FIG. 27 is a drawing to describe diagnosis processing of the anomaly diagnosis apparatus of a machine installation shown in FIG. 21 and is a drawing to show frequency spectrum after being filtered.
Figure 28:
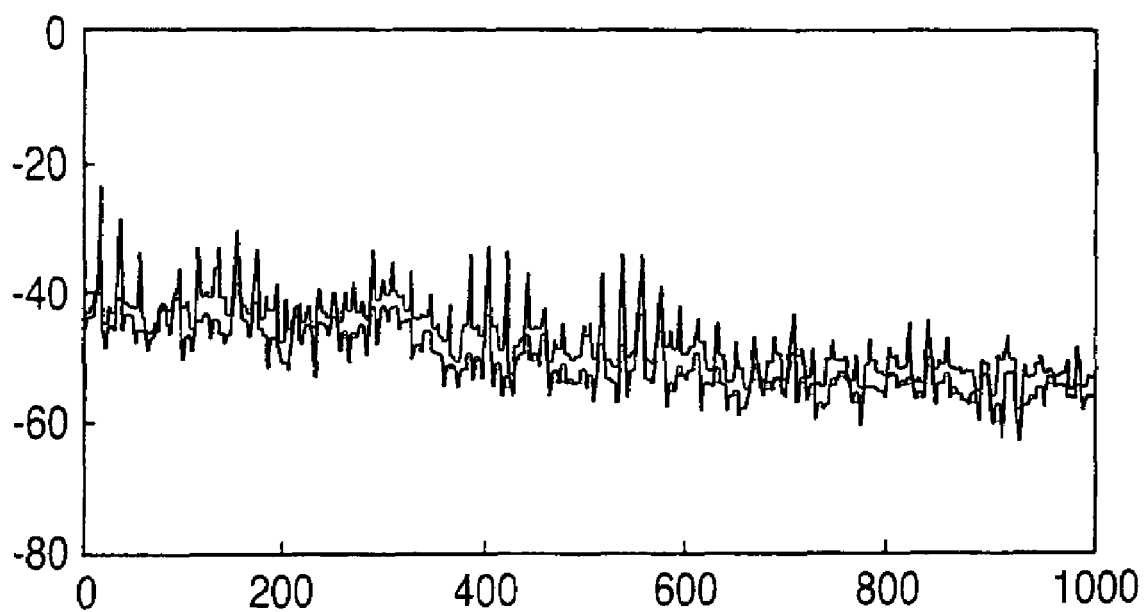
FIG. 28 is a drawing to describe diagnosis processing of the anomaly diagnosis apparatus of a machine installation shown in FIG. 21 and is a drawing to show envelope frequency spectrum after being filtered.

If the user uses the pointing device 215 to drag any desired frequency domain (see FIG. 26) in the frequency spectrum, filtering with the selected range as the filter band, envelope processing, and frequency analysis are performed automatically or by simple operation and a frequency spectrum (see FIG. 27) and an envelope frequency spectrum (see FIG. 28) are visually displayed.

Thus, according to the anomaly diagnosis method of the seventh embodiment of the invention, the user can use the pointing device 215 such as a mouse to select the analysis range and the filtering range for any desired waveform range in the time waveform after AD conversion and the spectrum waveform after frequency analysis, so that a signal having a high S/N ratio can be extracted by simple operation and higher-accuracy diagnosis is made possible.

At this time, the user can also listen to sound data after being filtered and can also make a determination by the hearing sense.

Figure 29:
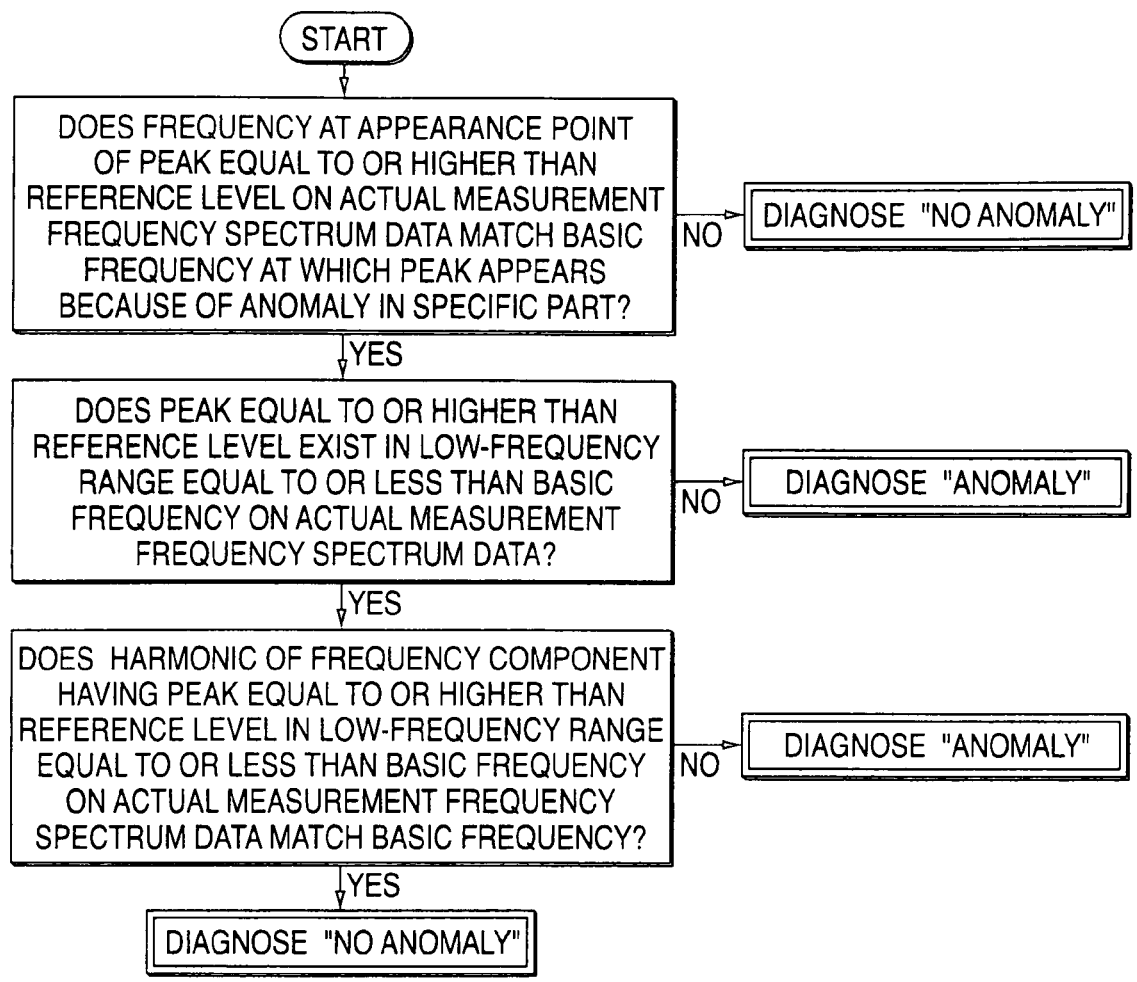
FIG. 29 is a flowchart to show a diagnosis processing procedure of an anomaly diagnosis method executed by an eighth embodiment of an anomaly diagnosis apparatus according to the invention.

FIG. 29 is a flowchart to show a diagnosis processing procedure of an anomaly diagnosis method executed by an eighth embodiment of an anomaly diagnosis apparatus according to the invention. The basic hardware configuration of the apparatus may be similar to that of the apparatus of the fifth embodiment shown in FIG. 11 and therefore the hardware configuration will not be discussed again.

In an anomaly diagnosis method according to the eighth embodiment, sound or vibration produced by a machine installation containing a sliding member is analyzed, thereby diagnosing the presence or absence of an anomaly in the sliding member, etc., of the machine installation.

The expression "sliding member, etc., of machine installation" mentioned here is used to mean that the sliding member of the machine installation and a sliding member relevant member joined to the sliding member or supporting the sliding member in the machine installation are included.

For example, bearings, ball screws, linear guides, motors, etc., come under the sliding members.

In the anomaly diagnosis method according to the eighth embodiment, first a signal representing sound or vibration produced by the sliding member, etc., of the machine installation is detected and actual measurement frequency spectrum data of a frequency spectrum of the detected signal or its envelope signal is generated. The later processing is performed according to the procedure shown in FIG. 29.

That is, first a basic frequency component comparison process of checking whether or not the frequency at an appearance point of a peak equal to or higher than a reference level on the actual measurement frequency spectrum data matches the basic frequency at which a peak appears because of an anomaly in a specific part of the sliding member, etc., is executed (step 301) and when the frequency at the appearance point of the peak equal to or higher than the reference level on the actual measurement frequency spectrum data does not match the basic frequency in the basic frequency component comparison process, the sliding member, etc., is diagnosed as no anomaly (step 302).

When the frequency at the appearance point of the peak equal to or higher than the reference level on the actual measurement frequency spectrum data matches the basic frequency in the basic frequency component comparison process at step 301, the process advances to step 303 and a low-frequency component comparison process of checking the presence or absence of a frequency component having a peak equal to or higher than the reference level in a low-frequency range equal to or less than the basic frequency on the actual measurement frequency spectrum data is executed.

When the actual measurement frequency spectrum data does not have a peak equal to or higher than the reference level in the low-frequency range equal to or less than the basic frequency in the low-frequency component comparison process at step 303, the sliding member, etc., is diagnosed as an anomaly in the specific part (step 304).

On the other hand, when the actual measurement frequency spectrum data has a peak equal to or higher than the reference level in the low-frequency range equal to or less than the basic frequency in the low-frequency component comparison process at step 303, the process advances to step 305 and a harmonic component comparison process of determining whether or not the harmonic of the frequency component having the peak equal to or higher than the reference level in the low-frequency range equal to or less than the basic frequency matches the basic frequency is executed.

When the harmonic of the frequency component having the peak equal to or higher than the reference level in the low-frequency range equal to or less than the basic frequency does not match the basic frequency in the harmonic component comparison process at step 305, the sliding member, etc., is diagnosed as an anomaly in the specific part (step 306); when the harmonic matches the basic frequency, the sliding member, etc., is diagnosed as no anomaly in the specific part (step 307).

The situation in which the peak level on the actual measurement frequency spectrum data exceeds the reference level is caused to occur not only in the case where an anomaly of damage, etc., occurs in the sliding member, etc., but also by any other factor of overlap of frequency components of rotation components, etc., of the sliding member, etc., contained in the machine installation, the effect of harmonic, etc.

Thus, if the sliding member, etc., is diagnosed as an anomaly based simply on the fact that the basic frequency at which a peak appears because of an anomaly in a specific part of the sliding member, etc., matches the peak on the actual measurement frequency spectrum data as the result of making comparison therebetween, in fact the peak equal to or higher than the reference level is caused by any other factor and no anomaly may occur in the sliding member, etc.; there is a risk of incurring degradation of reliability of the diagnosis.

However, as in the embodiment, when a match is found in the basic frequency component comparison process, if the low-frequency component comparison process and the harmonic component comparison process are further executed, whether or not the peak equal to or higher than the reference level in the basic frequency on the actual measurement frequency spectrum data is caused by any other factor of overlap of frequency components of rotation components, etc., of the sliding member, etc., the effect of harmonic, etc., for example, rather than an anomaly of damage, etc., in the sliding member.

Thus, erroneous diagnosis of assuming that the peak caused by any other factor of overlap of frequency components of rotation components, etc., of the sliding member, etc., the effect of harmonic, etc., is caused by an anomaly in the sliding member, etc., can be circumvented and the reliability of diagnosing the presence or absence of an anomaly in the sliding member, etc., can be improved.

Next, waveform charts of actual measurement frequency spectrum of the sliding member to be diagnosed and a diagnosis process according to the embodiment for each waveform chart will be discussed.

Figure 30:
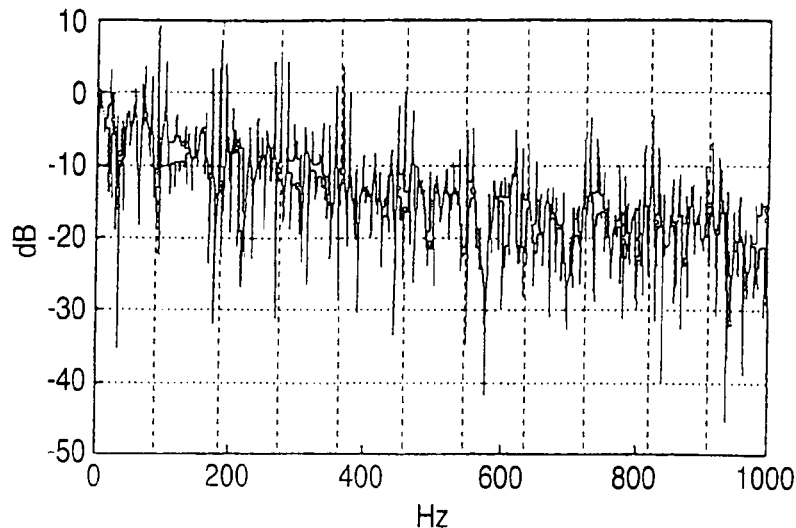
FIG. 30 is a schematic representation of a waveform when the diagnosis processing in FIG. 29 is executed for a damaged inner ring of a rolling bearing as the sliding member according to the invention and a peak equal to or higher than the reference level does not appear in low-frequency range in comparison process with the basic frequency of peak caused by inner ring damage.

FIG. 30 is a schematic representation of a waveform when the diagnosis processing in FIG. 29 is executed for a damaged inner ring of a rolling bearing as the sliding member. In the basic frequency component comparison process, it is recognized that the peak equal to or higher than the reference level matches the basic frequency of the peak caused by the inner ring damage (Zfi: 89.9 Hz). Thus, the low-frequency component comparison process is executed. In the low-frequency component comparison process, it is recognized that a high-level component is not found in the low-frequency range equal to or less than the basic frequency (Zfi: 89.9 Hz) and therefore it is not assumed that occurrence of the large peak in the basic frequency is caused by any other factor mentioned above, and the process advances to step 304 and the inner ring is diagnosed as an anomaly.

Figure 31:
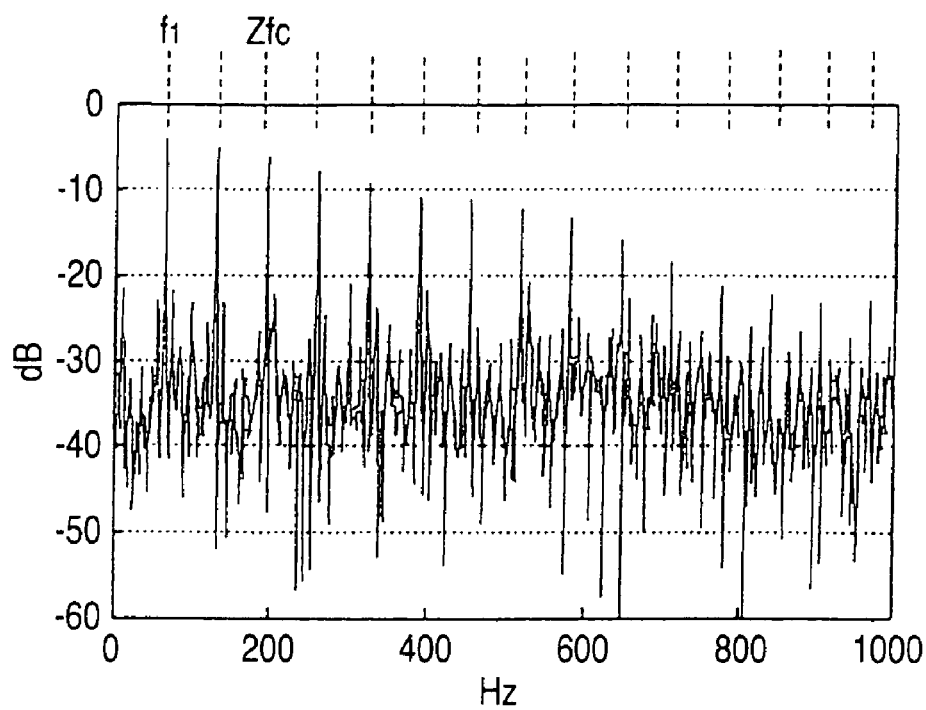
FIG. 31 is a schematic representation of a waveform when the diagnosis processing in FIG. 29 is executed for an undamaged outer ring of a rolling bearing as the sliding member according to the invention and harmonic of low frequency and basic frequency match in comparison process with the basic frequency of peak caused by outer ring damage.

FIG. 31 is a schematic representation of a waveform when the diagnosis processing in FIG. 29 is executed for an undamaged outer ring of a rolling bearing as the sliding member. In the basic frequency component comparison process, it is recognized that the peak equal to or higher than the reference level matches the basic frequency of the peak caused by the outer ring damage (Zfc: 194.7 Hz). Thus, the low-frequency component comparison process is executed. In the low-frequency component comparison process, it is recognized that a high-level component f1 (64.5 Hz) exists in the lower-frequency range than the basic frequency (Zfc: 194.7 Hz) and therefore the harmonic component comparison process at step 305 is executed.

In the harmonic component comparison process, it is recognized that the harmonic of the high-level component f1 (64.5 Hz) in the low-frequency range roughly matches the basic frequency and therefore it is assumed that occurrence of the large peak in the basic frequency is caused by any other factor mentioned above, and the process advances to step 307 and the outer ring is diagnosed as no anomaly.

Figure 32:
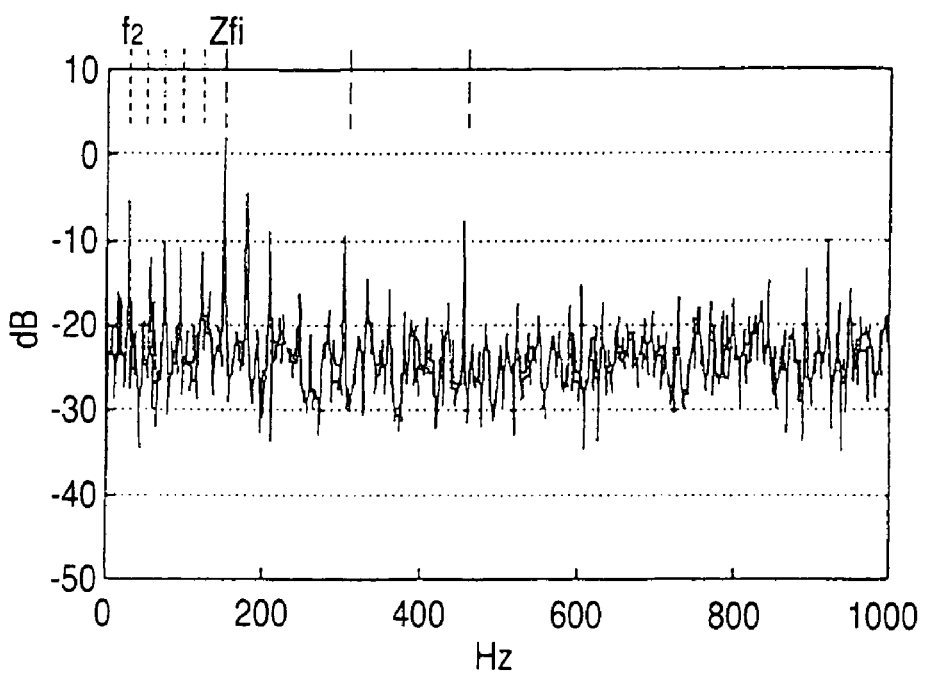
FIG. 32 is a schematic representation of a waveform when the diagnosis processing in FIG. 29 is executed for a damaged inner ring of a rolling bearing as the sliding member according to the invention and harmonic of low frequency and basic frequency match in comparison process with the basic frequency of peak caused by inner ring damage.

FIG. 32 is a schematic representation of a waveform when the diagnosis processing in FIG. 29 is executed for a damaged inner ring of a rolling bearing as the sliding member. In the basic frequency component comparison process, it is recognized that the peak equal to or higher than the reference level matches the basic frequency of the peak caused by the inner ring damage (Zfi: 150.7 Hz). Thus, the low-frequency component comparison process is executed. In the low-frequency component comparison process, a higher-level component f2 (30.1 Hz) than the reference level is found in the low-frequency range equal to or less than the basic frequency (Zfi: 150.7 Hz). Therefore, the process goes to step 305 and the harmonic component comparison process is executed.

In the harmonic component comparison process, it is recognized that the harmonic of the high-level component f2 (30.1 Hz) in the low-frequency range roughly matches the basic frequency, but the level of the basic frequency is higher than the level of the component f2 and therefore it is not assumed that occurrence of the large peak in the basic frequency is caused by any other factor mentioned above, and the process advances to step 306 and the inner ring is diagnosed as an anomaly.

As described above, if the low-frequency component comparison process and the harmonic component comparison process are added to the basic frequency component comparison process and the presence or absence of the effect of any other factor of harmonic, etc., is examined, higher-reliability diagnosis can be realized.

Figure 33:
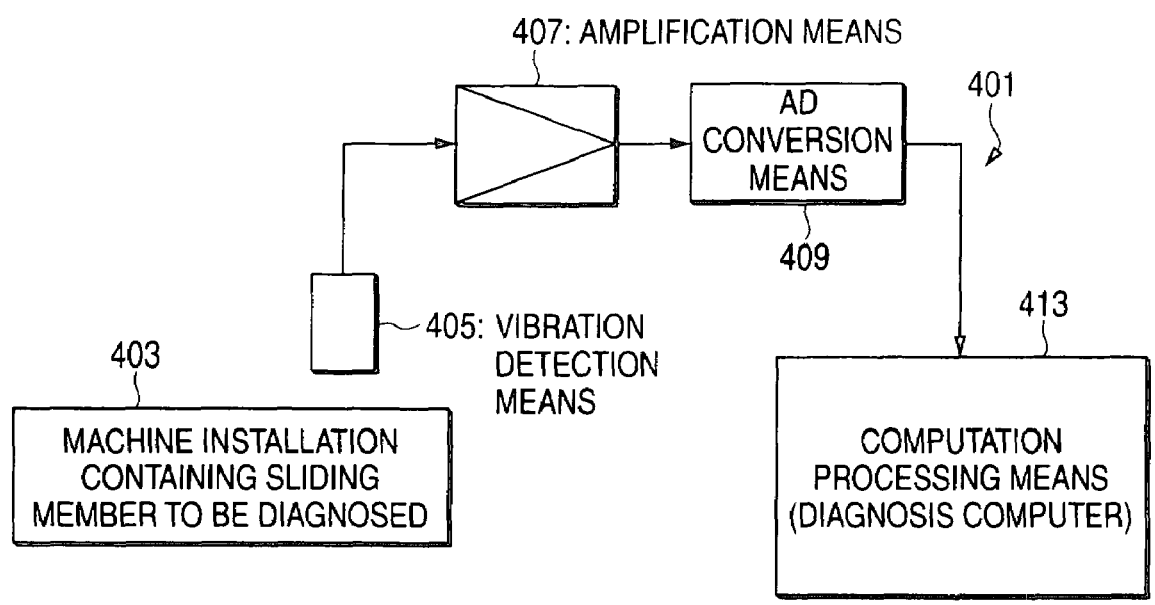
FIG. 33 is a block diagram to show the configuration of a ninth embodiment of an anomaly diagnosis apparatus of a machine installation for executing an anomaly diagnosis method of a machine installation according to the invention.
Figure 34:
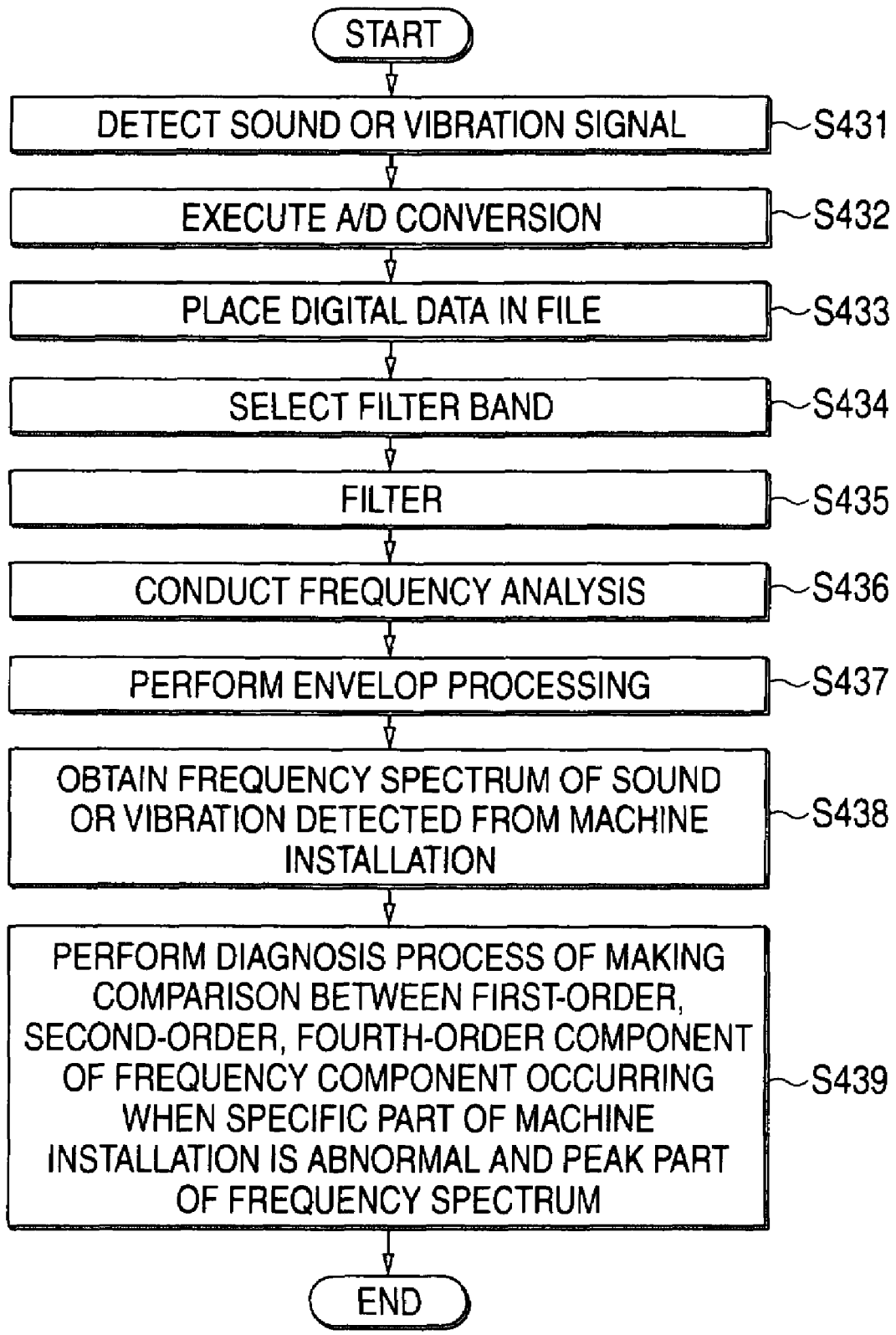
FIG. 34 is a flowchart to show a processing procedure of the anomaly diagnosis apparatus of a machine installation shown in FIG. 33.

FIG. 33 is a block diagram to show a schematic configuration of a ninth embodiment of an anomaly diagnosis method and apparatus of a machine installation according to the invention. FIG. 34 is a flowchart to show a diagnosis processing procedure of the anomaly diagnosis apparatus of a machine installation shown in FIG. 33.

To being with, the schematic configuration of an anomaly diagnosis apparatus 401 of the ninth embodiment will be discussed with reference to FIG. 33 and then the anomaly diagnosis method of a machine installation executed by the anomaly diagnosis apparatus 401 will be discussed in detail.

The anomaly diagnosis apparatus 401 of a machine installation of the ninth embodiment includes vibration detection means 405 for outputting an analog electric signal responsive to sound or vibration produced by a sliding member of the machine installation to be diagnosed, amplification member 407 for amplifying the signal output by the vibration detection means 405, AD conversion means 409 for converting the analog signal amplified by the amplification member 407 into a digital signal to generate actual measurement digital data, and computation processing means 413 for diagnosing the presence or absence of an anomaly in a specific part of the sliding member of the machine installation based on the actual measurement digital data output by the AD conversion means 409.

The embodiment assumes that the sliding member of the machine installation is a rolling bearing. Wearing of and damage to inner and outer rings, rolling element, a cage, etc., making up the rolling bearing are diagnosed based on sound or vibration when the rolling bearing is driven.

In the embodiment, the expression "sound or vibration of sliding member of machine installation" is used to mean that AE (Acoustic Emission) when the sliding member of the machine installation is driven is contained.

The computation processing means 413 is a diagnosis computer for performing computation processing of previously stored processing data and actual measurement digital data received from the AD conversion means 409 according to a diagnosis program.

The computation processing means 413 performs appropriate analysis processing of frequency analysis, envelope analysis, and the like for the actual measurement digital data output by the AD conversion means 409 to generate actual measurement frequency spectrum data and diagnoses the presence or absence of an anomaly in a specific part of the sliding member 403 of the machine installation based on the presence or absence of a peak on the actual measurement frequency spectrum data for the first-order, second-order, fourth-order value of frequency component occurring when the specific part of the machine installation 403 containing the sliding member is abnormal.

The described anomaly diagnosis apparatus 401 of the machine installation performs processing according to the procedure shown in FIG. 34.

First, the vibration detection means 405 detects sound or vibration produced by the machine installation 403 containing the sliding member (step S431). Next, a signal provided by the amplification means 407 is converted into a digital signal by the AD conversion means 409 (step S432) and the digital signal is passed to the computation processing means 413.

The computation processing means 413 puts the signal received from the AD conversion means 409 into a digital file in a file format such as a WAV file, for example, (step S433). If necessary, filtering is performed for removing, etc., extra signal to generate actual measurement digital data.

In the embodiment, as the filtering, predetermined processing is performed for the input signal by a filtering program previously built in the computation processing means 413, and the filtering is made up of a filter band selection step of presetting the frequency range to be cut, etc., (step S434) and a filtering step of cutting extra signal according to the selected filter band (step S435).

The filtering at steps S434 and S435 is executed to improve the S/N ratio of the collected data and need not be executed if the S/N ratio of the input signal is sufficient.

Next, analysis processing of frequency analysis, envelop analysis, and the like is performed for the generated actual measurement digital data (steps S436 and S107), and actual measurement frequency spectrum data d1 representing sound or vibration detected from the machine installation 403 containing the sliding member is obtained (step S438).

Figure 35:
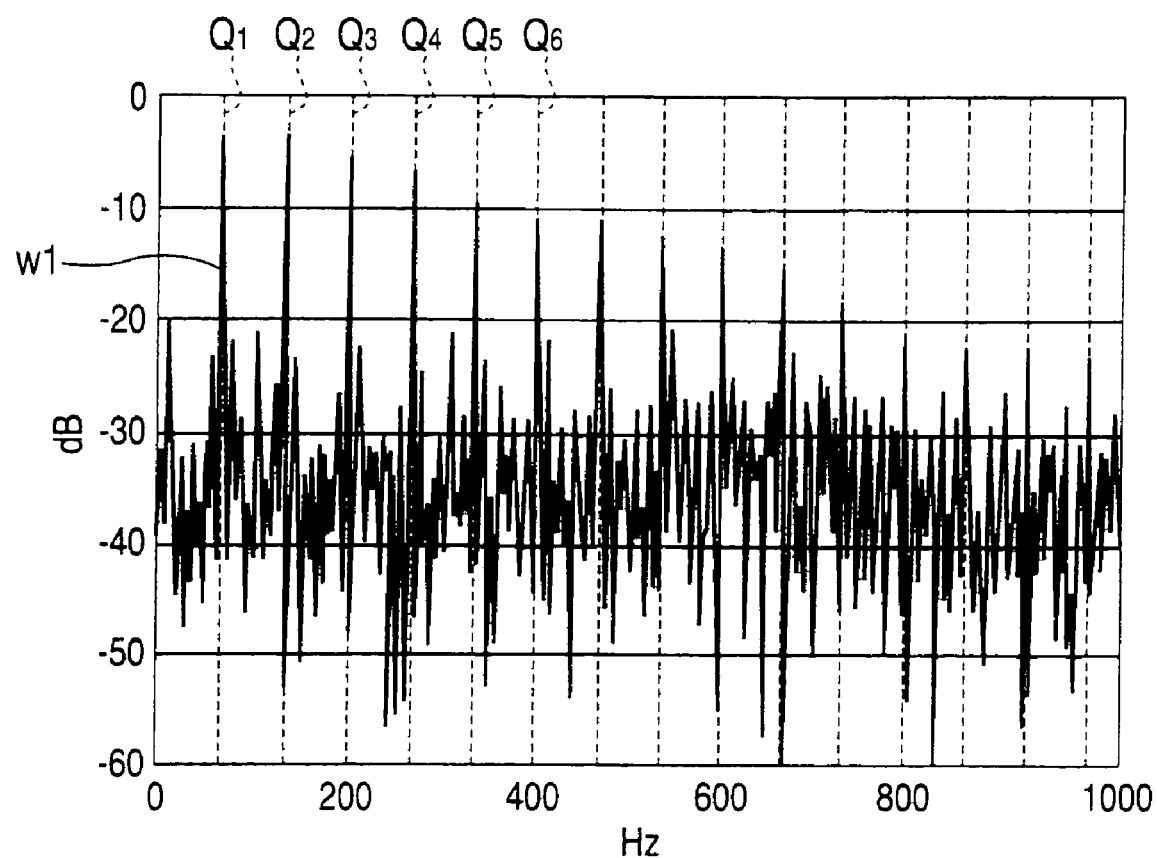
FIG. 35 is a waveform chart to show an actual measurement frequency spectrum when abnormal vibration occurs due to a flaw of an outer ring of a rolling bearing as a sliding member of the machine installation.

The obtained actual measurement frequency spectrum data d1 is waveform w1 shown in FIG. 35.

This waveform w1 is provided by rotating the inner ring at a speed of 150 rpm with the outer ring fixed in the rolling bearing as the sliding member of the machine installation.

Further, the computation processing means 413 diagnoses the presence or absence of an anomaly in a specific part of the machine installation 403 containing the sliding member based on the presence or absence of a peak on the actual measurement frequency spectrum data d1 for the first-order, second-order, fourth-order value of frequency component occurring when the specific part of the machine installation 403 containing the sliding member is abnormal (step S439).

As for the bearing of the sliding member of the machine installation, the frequency component values occurring when specific parts are abnormal are determined in response to the design specifications and use conditions of the bearing, as shown in FIG. 13.

The computation processing means 413 previously stores as reference values the first-order, second-order, and fourth-order values of frequency component occurring when each specific part shown in FIG. 13 is abnormal for the machine installation 403 containing the sliding member, and executes step S439 based on the reference values.

Figure 36:
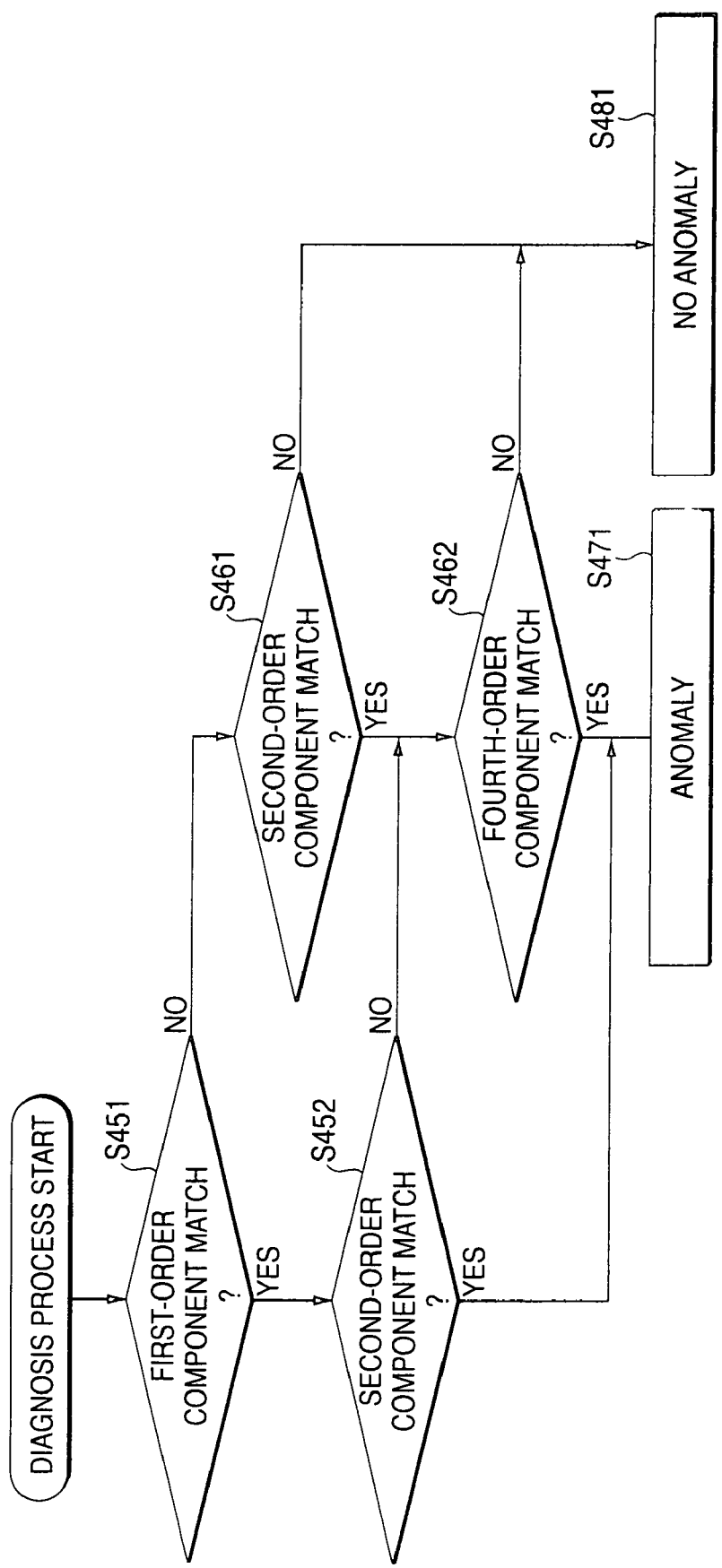
FIG. 36 is a flowchart to show a detailed processing procedure of comparison process between frequency component when an anomaly occurs and a peak part of actual measurement frequency spectrum data in the ninth embodiment of the invention.

At step S439, specifically, according to a procedure shown in FIG. 36, a comparison process of checking the presence or absence of a peak on the actual measurement frequency spectrum data d1 for the first-order, second-order, fourth-order value of frequency component occurring when each specific part of the machine installation 403 containing the sliding member is abnormal is executed. If it is recognized that a peak exists on the actual measurement frequency spectrum data d1 in two or more frequency components as both the first-order value and the second-order value of the frequency component match a peak on the actual measurement frequency spectrum data d1 (steps S451 and S452) or as both the second-order value and the fourth-order value match a peak on the actual measurement frequency spectrum data d1 although the first-order value of the frequency component does not match a peak on the actual measurement frequency spectrum data d1 (steps S461 and S462), the sliding member is diagnosed as an anomaly in the specific part (step S471).

On the other hand, if a peak exists on the actual measurement frequency spectrum data d1 in one or no frequency component, the possibility that a peak may happen to be formed because of vibration, etc., caused by anomaly in any other part as noise is high, and the sliding member is diagnosed as no anomaly (step S481).

Figure 37:
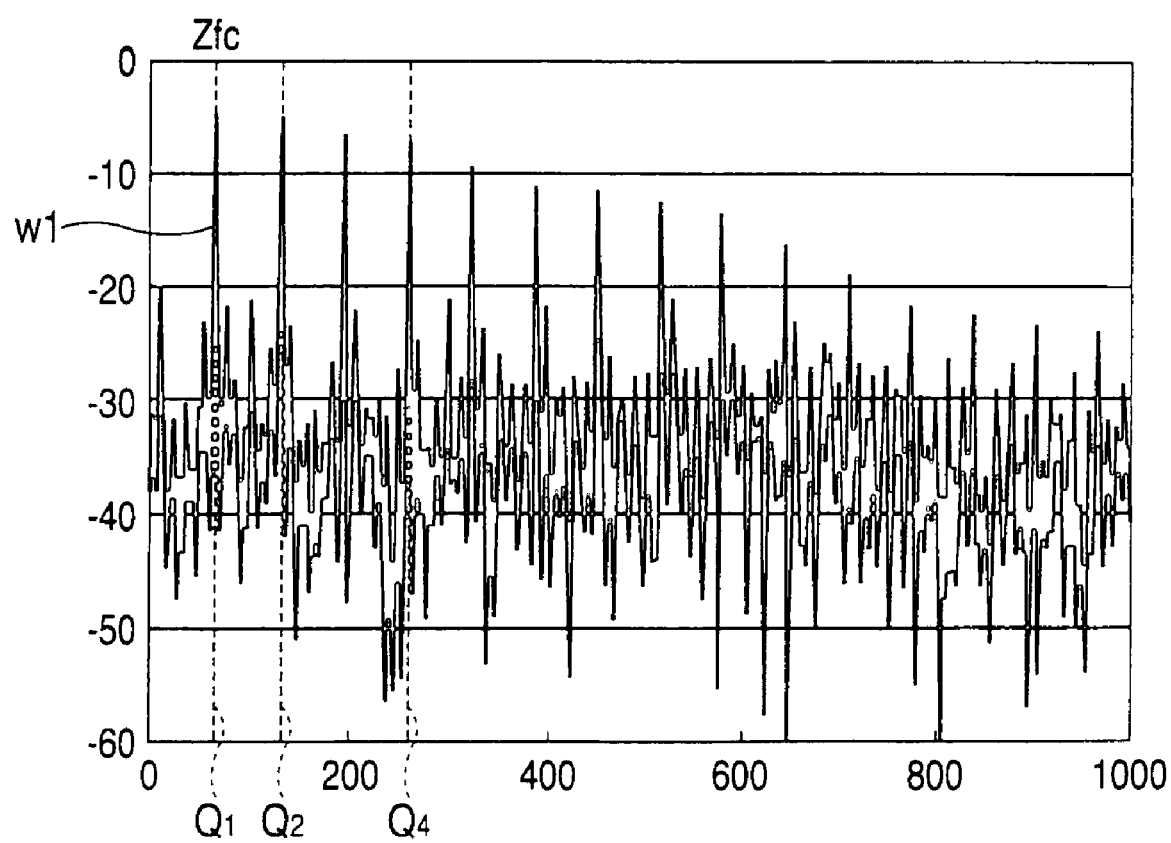
FIG. 37 is a waveform chart to show comparison parts with frequency components under abnormal condition on the actual measurement frequency spectrum when abnormal vibration occurs due to a flaw of the outer ring of the rolling bearing as the sliding member of the machine installation.

FIG. 37 shows three frequency components of first-order value Q1, second-order value Q2, and fourth-order value Q4 of frequency components occurring due to damage to the outer ring of a specific part by dashed lines in the waveform w1 provided by rotating the inner ring at a speed of 150 rpm with the outer ring fixed in the rolling bearing as the sliding member of the machine installation.

FIG. 35 shows all frequency components of first-order value Q1 to high-order Qn of frequency components occurring due to damage to the outer ring by dashed lines in similar waveform w1.

In the anomaly diagnosis method executed by the anomaly diagnosis apparatus 401 of the machine installation of the ninth embodiment described above, the comparison process of checking the presence or absence of a peak on the actual measurement frequency spectrum data d1 corresponding to frequency components occurring when each specific part of the machine installation 403 containing the sliding member is abnormal is limited to three times of the first-order, second-order, and fourth-order values of the frequency components occurring when the specific part of the machine installation 403 containing the sliding member is abnormal and therefore the computation processing amount in the comparison process is drastically decreased as compared with the related art case where the comparison process is repeated for all of a large number of frequency components of first-order to high-order frequency components, for example, as shown in FIG. 35.

Thus, the load on the computation processing means 413 in analyzing the vibration signal detected from the machine installation 403 containing the sliding member is lightened drastically and the diagnosis work can be speeded up. Since the computation processing amount is decreased, it is made possible to use an inexpensive computer having a low computation processing capability as the computer used as the computation processing means 413 and it is also made possible to decrease the apparatus cost.

Further, if a determination is made based only on the first-order component of frequency components occurring under abnormal condition, there is a possibility of making an erroneous diagnosis as a peak on the corresponding actual measurement frequency spectrum happens to shift or grow due to the effect of noise, etc.

However, to execute the comparison process three times of the first-order, second-order, and fourth-order values of the frequency components occurring when the specific part of the machine installation 403 containing the sliding member is abnormal as described above, there is almost no probability that the process will receive the effect of noise, etc., three times, and the reliability of the diagnosis can be improved.

Preferably, after generating the actual measurement frequency spectrum data d1, the computation processing means 413 calculates an effective value f1 of the actual measurement frequency spectrum data d1, sets a threshold value t1 based on the effective value f1, and handles each peak on the actual measurement frequency spectrum data d1 for the first-order value Q1, the second-order value Q2, and the fourth-order value Q4 of the frequency components occurring when the specific part of the machine installation 403 containing the sliding member is abnormal as the effective peak only when the peak exceeds the threshold value t1.

Figure 38:
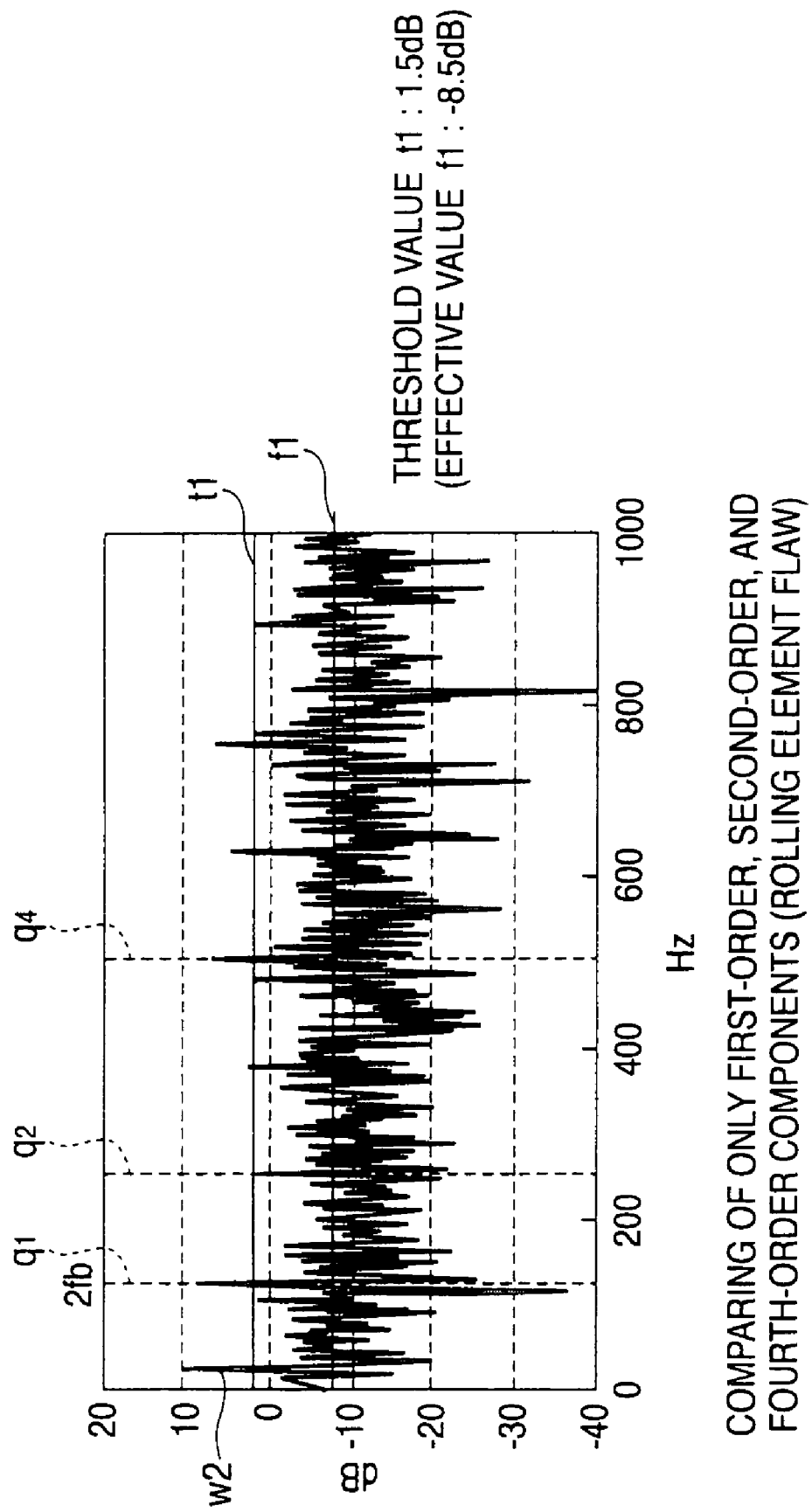
FIG. 38 is a waveform chart to show comparison parts with frequency components under abnormal condition on the actual measurement frequency spectrum when abnormal vibration occurs due to a flaw of a rolling element of the rolling bearing as the sliding member of the machine installation.

In FIG. 38, the effective value f1 and the threshold value t1 are written into a waveform w2 of the actual measurement frequency spectrum data d1 provided by rotating the inner ring at a speed of 150 rpm with the outer ring fixed in the rolling bearing as the sliding member of the machine installation. First-order value q1, second-order value q2, and fourth-order value q4 of the frequency components occurring due to a flaw of the rolling element of the rolling bearing as the sliding member of the machine installation are written into the waveform w2 by dotted lines.

In this case, the effective value f1 is provided as the average level of amplitude of the waveform w2 is calculated, and is −8.5 dB The threshold value t1 is 1.5 dB because of setting $$t1 = (f1 + 10 \text{ dB}) \tag{1}$$

In this example, it is shown that all of the three peaks corresponding to the first-order value, the second-order value, and the fourth-order value of the frequency components occurring due to the flaw of the rolling element are greater than the threshold value t1 and the comparison process is required.

When it is thus made possible to select significant peaks based on the threshold value t1, if an extraction process of extracting effective peaks based on the threshold value t1 is performed, for example, before a computation process for comparison for the peaks on the actual measurement frequency spectrum data corresponding to the first-order value, the second-order value, and the fourth-order value of the frequency components occurring when the specific part of the machine installation 403 containing the sliding member is abnormal is executed, waste of executing the comparison process for insignificant peaks can be avoided and the load of the computation processing amount is furthermore lightened and speeding up the diagnosis process can be promoted.

In the embodiments described above, diagnosing the presence or absence of an anomaly of damage to each specific part has been shown.

Figure 39:
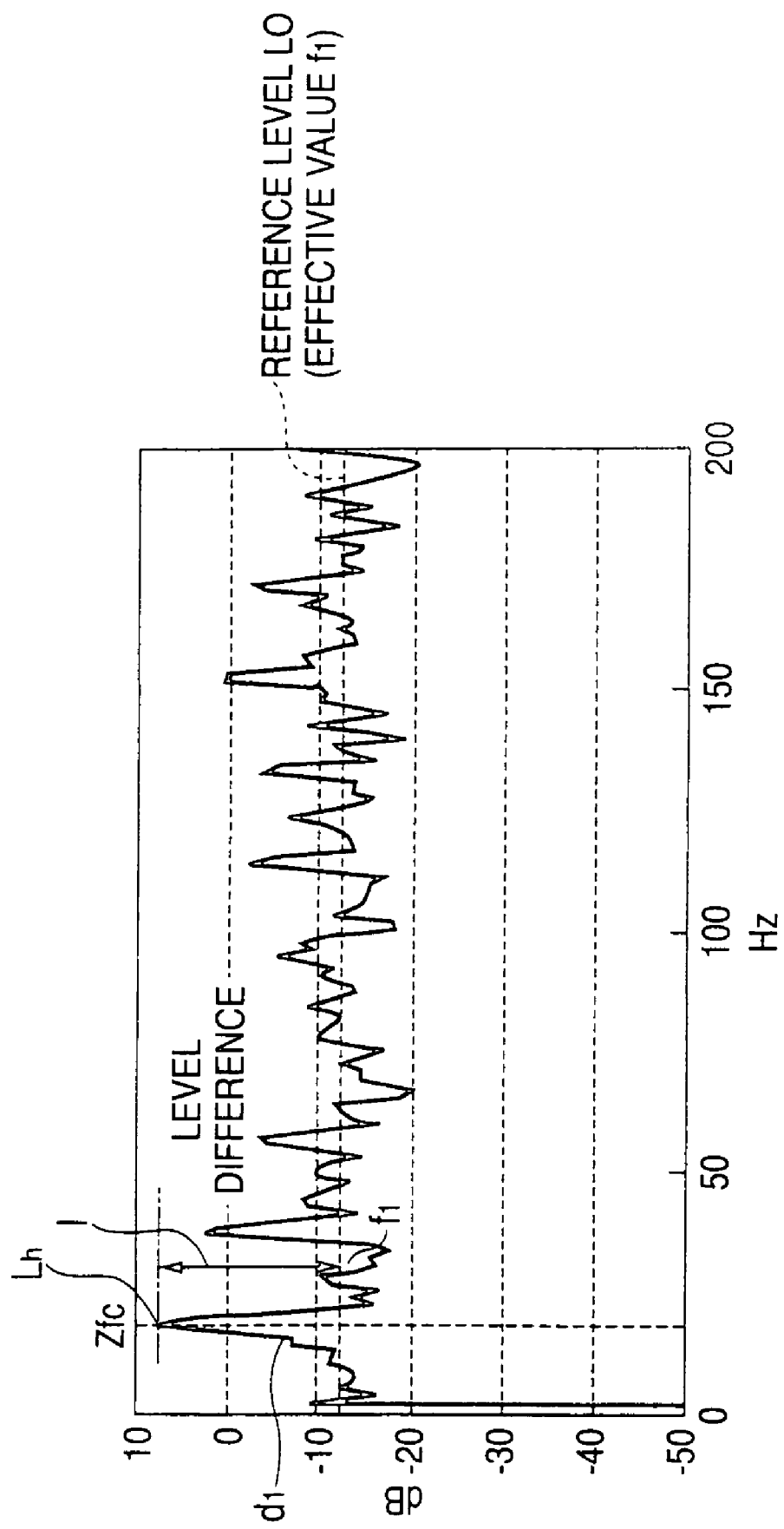
FIG. 39 is a waveform chart of an actual measurement frequency spectrum showing frequency components and reference level to be compared to estimate the magnitude of peel according to the anomaly diagnosis method of the machine installation according to the invention.

However, if appropriate analysis processing of frequency analysis, envelope analysis, and the like is performed for the actual measurement digital data to generate the actual measurement frequency spectrum data d1 as described above, it is advisable to calculate the effective value f1 of the actual measurement frequency spectrum data d1, set the calculated effective value as reference level L0, and estimate the magnitude of damage to the specific part of the sliding member of the machine installation causing an anomaly to occur from the value of level difference l between level Lh on the actual measurement frequency spectrum data d1 corresponding to the first-order Q1 of the frequency components occurring when the specific part of the machine installation 403 containing the sliding member is abnormal and the reference level L0, for example, as shown in FIG. 39.

Figure 40:
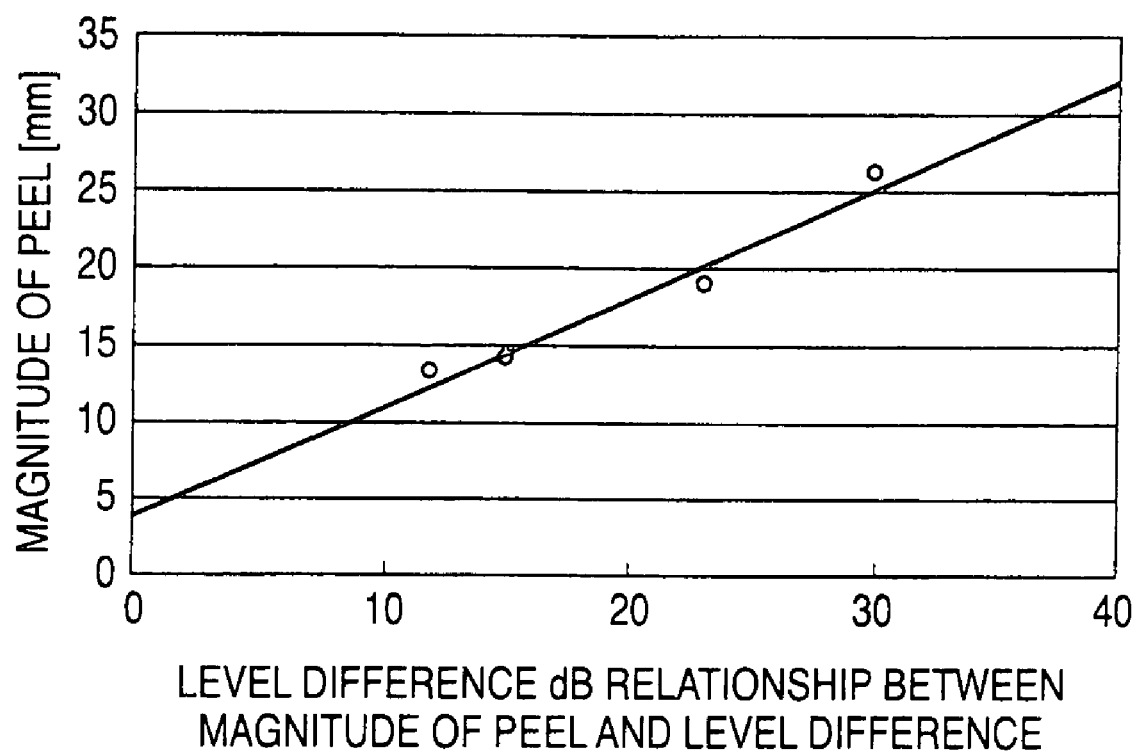
FIG. 40 is a correlation drawing between the magnitude of peel of rolling element surface causing abnormal vibration and the level difference between each peak appearing on the actual measurement frequency spectrum and the reference level in a rolling bearing diagnosed as the sliding member of the machine installation.

FIG. 40 shows the relationship between the magnitude of peel and the level difference between each peak appearing on the actual measurement frequency spectrum data d1 and the reference level when peel of damage to a raceway ring occurs in the rolling bearing as the sliding member of the machine installation.

Thus, generally the level difference grows in proportion to the magnitude of damage and therefore if the level difference between each peak appearing on the actual measurement frequency spectrum data d1 and the reference level is found, the magnitude of damage can be estimated.

Moreover, growing of the peak level on the actual measurement frequency spectrum caused by damage to the machine installation 403 containing the sliding member becomes most noticeable at the peak corresponding to the first-order value of the frequency components caused by the anomaly.

Thus, the level difference between the level on the actual measurement frequency spectrum data corresponding to the first-order value of the frequency components occurring when the specific part of the machine installation 403 containing the sliding member is abnormal and the effective value of the actual measurement frequency spectrum data is calculated, whereby the magnitude of the damage can be estimated efficiently by performing minimum computation processing, and the damaged part replacement time is determined from the estimated magnitude of the damage, so that excessive parts replacement and maintenance are circumvented and it is made possible to reduce the upkeep cost in the machine and the installation containing the sliding member of the machine installation.

The average value of the actual measurement frequency spectrum data d1 may be adopted as the reference level L0 in place of the effective value f1.

The machine installation and the sliding member diagnosed by the anomaly diagnosis method and apparatus of the machine installation of the invention are not limited to the rolling bearings shown in the embodiments described above.

Any machine installation can be diagnosed if it is a machine installation or a machine containing one or more sliding members wherein vibration occurs due to rotary sliding or linear sliding of the sliding member. The sliding members also include ball screws, linear guides, motors, etc., for example, in addition to the rolling bearings.

The sliding member of the machine installation can be diagnosed without being removed from the machine or the installation if sound or vibration occurring when the sliding member of the machine installation is rotated can be detected by predetermined vibration detection means even with the sliding member built in the machine or the installation.

Figure 41:
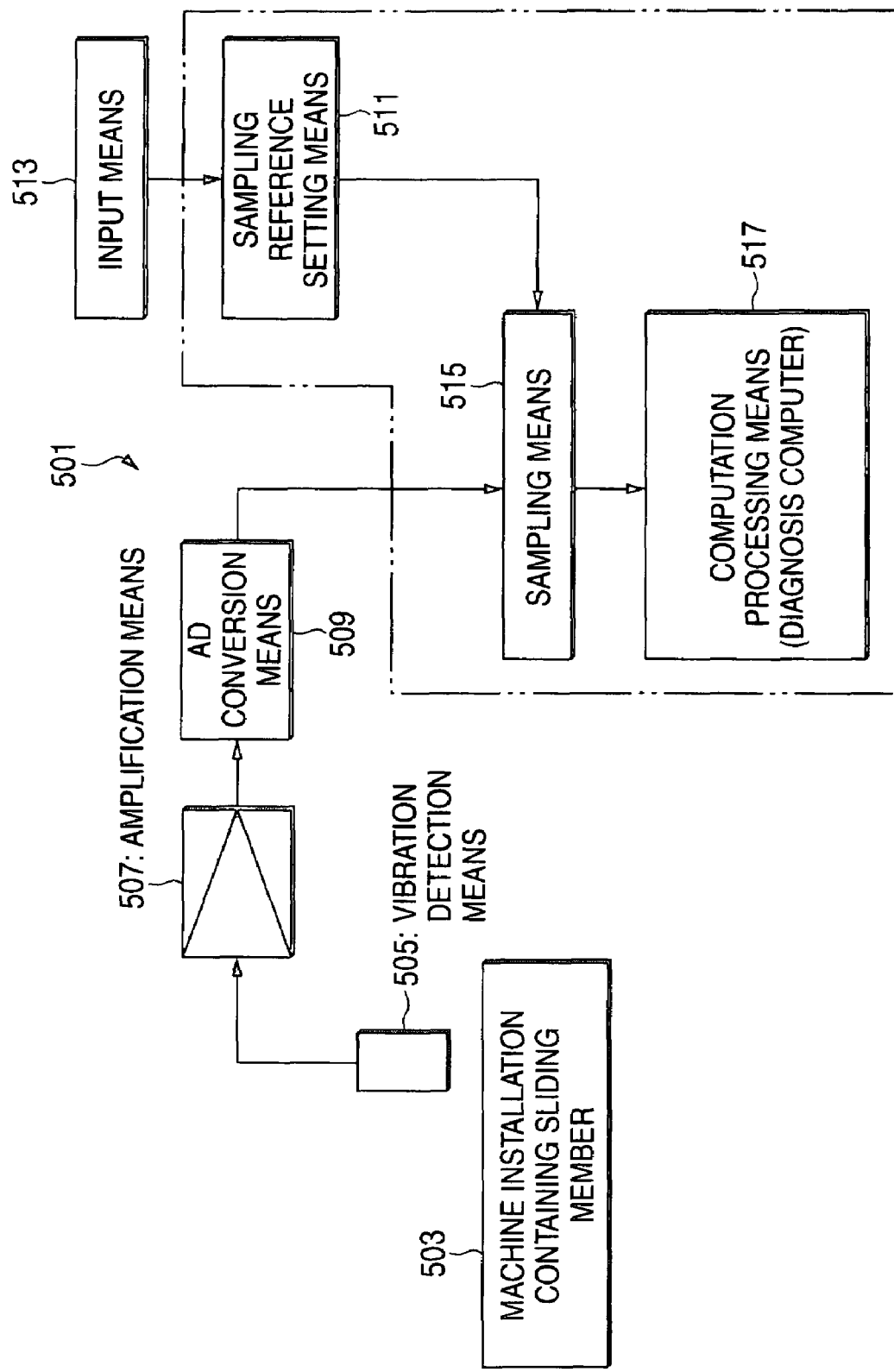
FIG. 41 is a schematic block diagram of a tenth embodiment of an anomaly diagnosis apparatus of a machine installation according to the invention.
Figure 42:
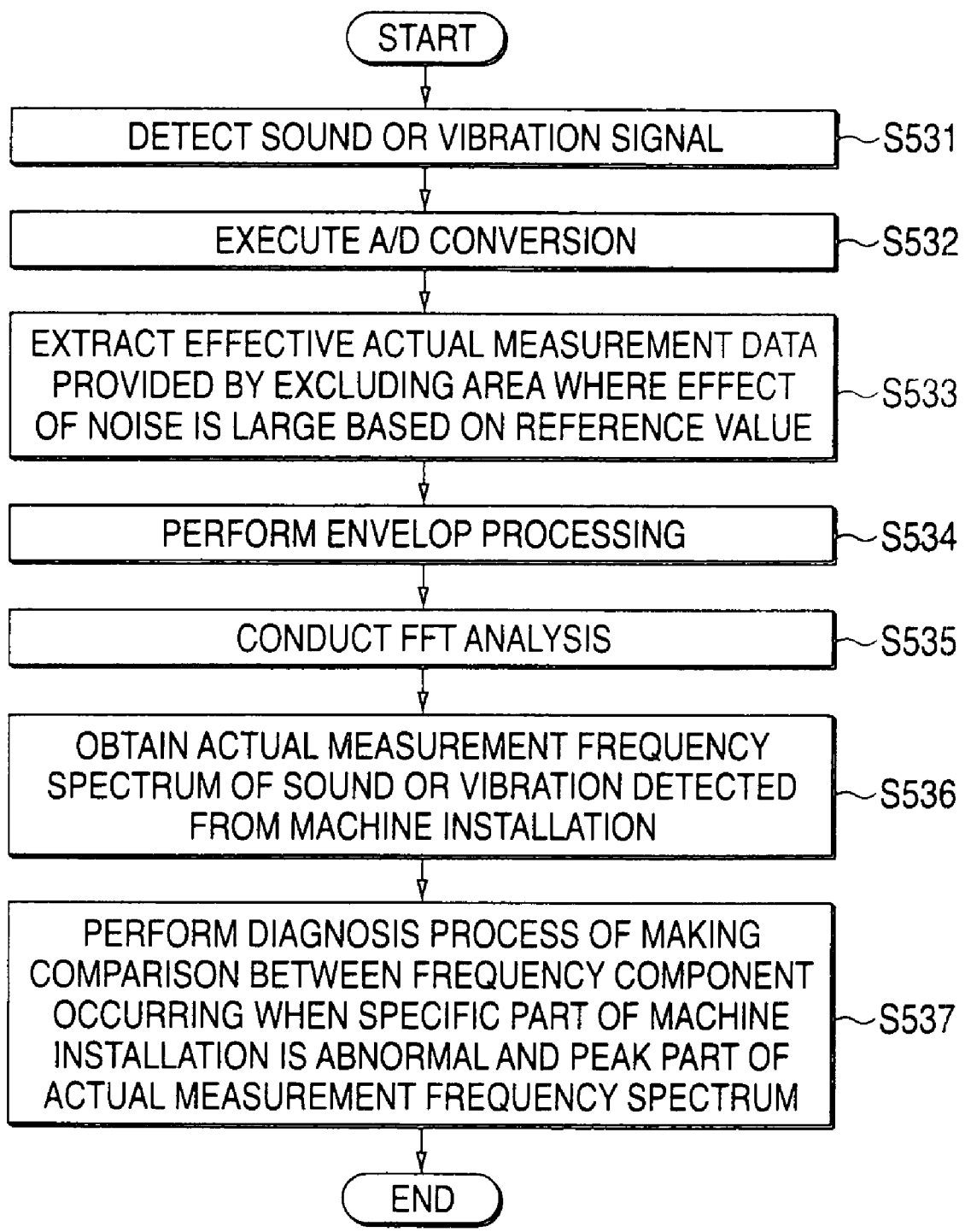
FIG. 42 is a flowchart to show a processing procedure of the anomaly diagnosis apparatus of a machine installation shown in FIG. 41.

FIG. 41 is a block diagram to show a schematic configuration of a tenth embodiment of an anomaly diagnosis apparatus of a machine installation according to the invention. FIG. 42 is a flowchart to show a diagnosis processing procedure of the anomaly diagnosis apparatus of a machine installation shown in FIG. 41.

An anomaly diagnosis apparatus 501 of a machine installation of the embodiment includes vibration detection means 505 for outputting an analog electric signal responsive to sound or vibration produced by a machine installation containing a sliding member 503 to be diagnosed, amplification member 507 for amplifying the signal output by the vibration detection means 505, AD conversion means 509 for converting the analog signal amplified by the amplification member 507 into a digital signal to generate actual measurement digital data, sampling reference setting means 511 for setting a reference value to exclude an area where the effect of noise is large from the output signal of the vibration detection means 505, input means 513 for inputting necessary information for the sampling reference setting means 511 to set the reference value, sampling means 515 for extracting effective actual measurement data with an area where the effect of noise is large excluded from the output signal of the vibration detection means 505 based on the reference value set in the sampling reference setting means 511, and computation processing means 517 for diagnosing the presence or absence of an anomaly in a specific part of the machine installation containing the sliding member 503 based on the effective actual measurement data extracted by the sampling means 515.

The embodiment assumes that the machine installation containing the sliding member 503 is a rolling bearing. Wearing of and damage to inner and outer rings, rolling element, a cage, etc., making up the rolling bearing are diagnosed based on sound or vibration when the rolling bearing is driven.

In the embodiment, the expression "sound or vibration of the machine installation containing the sliding member 503" is used to mean that AE (Acoustic Emission) when the sliding member of the machine installation is driven is contained.

Figure 43:
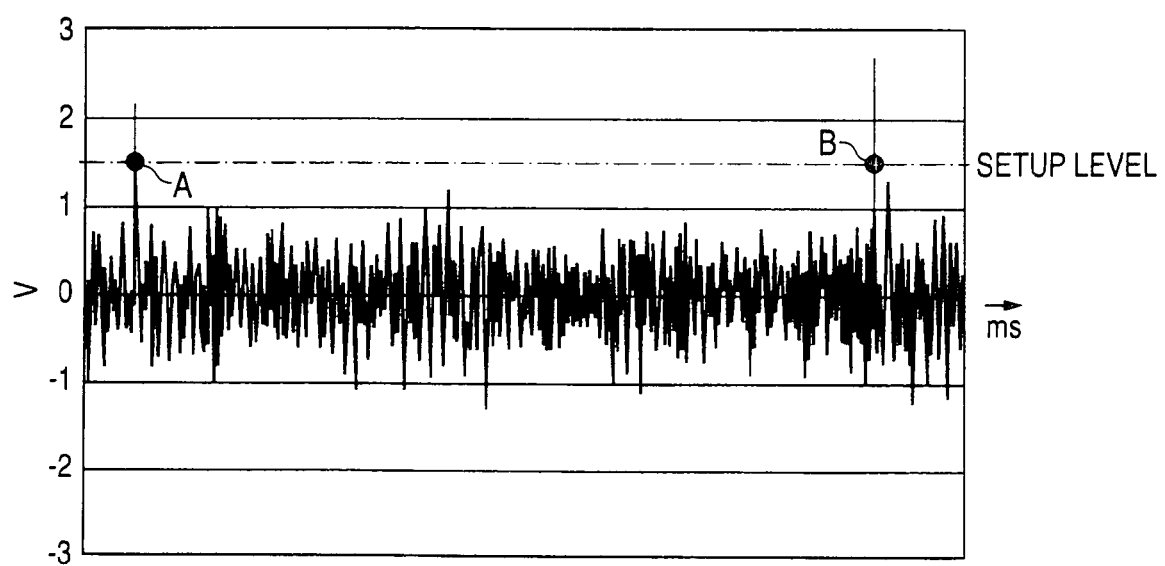
FIG. 43 is a schematic representation of a setting example of a reference value to exclude an area where the effect of noise is large from a signal detected by vibration detection means of the anomaly diagnosis apparatus of a machine installation shown in FIG. 41.

The output signal of the vibration detection means 505 is passed through the amplification member 507 and the AD conversion means 509 and becomes a waveform with voltage v changing as shown in FIG. 43. In FIG. 43, the horizontal axis represents the elapsed time and the vertical axis represents the voltage value of the magnitude proportional to the magnitude of sound or vibration of the machine installation containing the sliding member 503 (units: v).

In FIG. 43, A point and B point indicate points where the voltage value becomes excessive because of noise.

The sampling reference setting means 511 sets the reference value to exclude an area where the effect of noise is large from the output signal of the vibration detection means 505 based on information (data) previously specified by the input means 513.

In the embodiment, the reference value is the reference voltage to detect the A point and B point where the voltage value is excessive because of noise from the detection waveform in FIG. 43, and is 1.5 v.

The reference voltage generally is a larger value than the peak voltage value of the waveform produced because of an anomaly in the machine installation containing the sliding member and is set based on the reference voltage value specification (numeric input) from the input means 513.

The sampling means 515 extracts the effective actual measurement data provided by excluding an area containing an excessive value exceeding the reference value set in the sampling reference setting means 511 because of the effect of noise from the detection data shown in FIG. 43.

In FIG. 43, the data in the section from A point to B point (time domain) is extracted as the effective actual measurement data.

However, in the A point, the sampling is started on the falling edge of the peak waveform, thereby excluding the effect of noise. In the B point, the sampling is terminated on the rising edge of the peak waveform, thereby excluding the effect of noise.

The computation processing means 517 is a diagnosis computer for performing computation processing of previously stored processing data and effective actual measurement; data received from the sampling means 515 according to a diagnosis program.

The computation processing means 517 performs appropriate analysis processing of frequency analysis, envelope analysis, and the like for the effective actual measurement data output by the sampling means 515 to generate actual measurement frequency spectrum data and diagnoses the presence or absence of an anomaly in a specific part of the machine installation containing the sliding member 503 based on the presence or absence of a peak on the actual measurement frequency spectrum data for the frequency components occurring when the specific part of the machine installation containing the sliding member 503 is abnormal.

Figure 44:
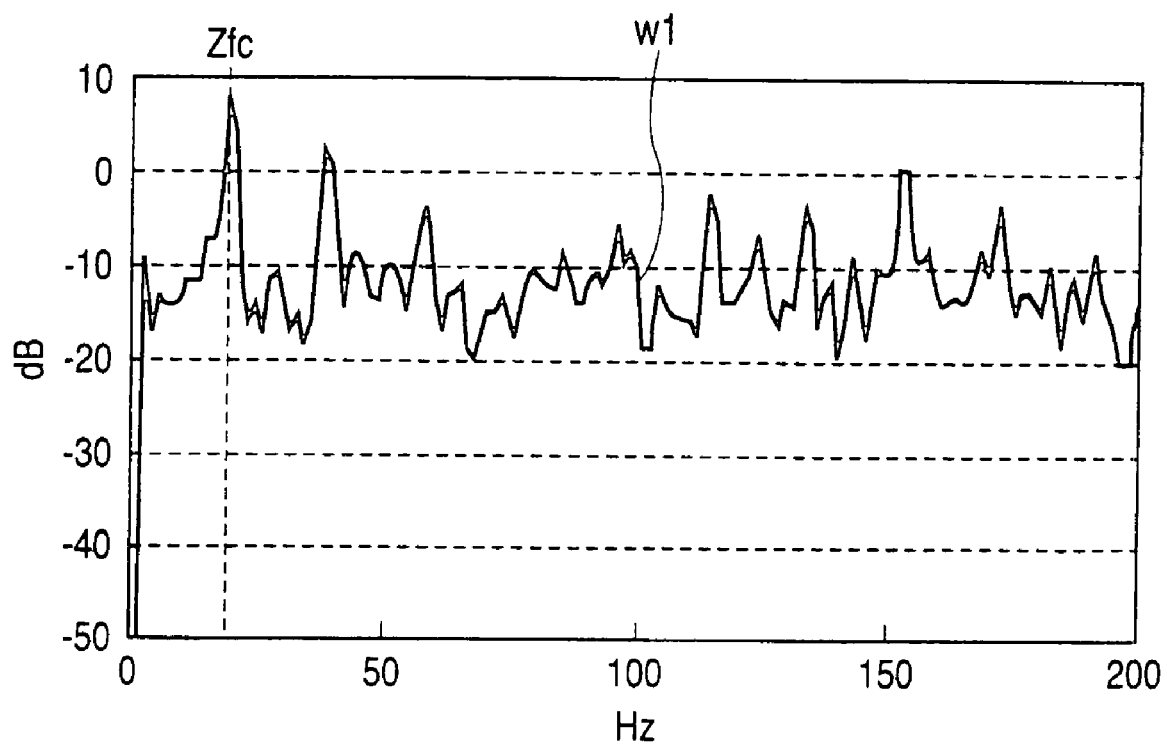
FIG. 44 is a waveform chart of an actual measurement frequency spectrum generated by computation processing means in the anomaly diagnosis apparatus of a machine installation shown in FIG. 41.

FIG. 44 is a waveform chart of the actual measurement frequency spectrum data calculated by the computation processing means 517.

The described anomaly diagnosis apparatus 501 of the machine installation performs processing according to the procedure shown in FIG. 42.

First, the vibration detection means 505 detects sound or vibration produced by the machine installation containing the sliding member 503 (step S531). Next, a signal provided by the amplification means 507 is converted into a digital signal by the AD conversion means 509 (step S532) and the digital signal is passed to the sampling means 515.

The sampling means 515 extracts effective actual measurement data with an area containing an excessive value because of the effect of noise excluded from the signal received from the AD conversion means 509 based on the reference value set in the sampling reference setting means 511, and passes the extracted effective actual measurement data to the computation processing means 517 (step S533).

The computation processing means 517 performs analysis processing of envelop analysis, FFT analysis, and the like for the effective actual measurement data input from the sampling means 515 (steps S534 and S535), and provides envelope FFT spectrum data as actual measurement frequency spectrum data representing sound or vibration detected from the machine installation containing the sliding member 503 (step S536).

The provided envelope FFT spectrum data is spectrum waveform w1 shown in FIG. 44. It is applied when an outer ring is damaged in the rolling bearing as the machine installation containing the sliding member 503.

Further, the computation processing means 517 diagnoses the presence or absence of an anomaly in a specific part of the machine installation containing the sliding member 503 based on the presence or absence of a peak on the spectrum waveform w1 for the frequency components occurring when the specific part of the machine installation containing the sliding member 503 is abnormal (step S537).

As for the bearing of the machine installation containing the sliding member, the frequency component values occurring when specific parts are abnormal are determined in response to the design specifications and use conditions of the bearing, as shown in FIG. 13.

The computation processing means 517 previously stores as diagnosis reference values the frequency components occurring when each specific part shown in FIG. 13 is abnormal for the machine installation containing the sliding member 503, and executes step S537 based on the diagnosis reference values.

At step S537, specifically, a comparison process of checking the presence or absence of a peak on the spectrum waveform w1 for the frequency components occurring when the specific part is abnormal for each specific part of the machine installation containing the sliding member 503 is executed. If the waveform has a peak in the frequency component occurring when the specific part is abnormal and the peak is a given level or higher, the sliding member is diagnosed as an anomaly in the specific part.

On the other hand, although the waveform has a peak in the frequency component occurring when the specific part is abnormal, if the peak is a given level or lower, the sliding member is diagnosed as no anomaly in the specific part.

Since the spectrum waveform w1 shown in FIG. 44 has a large peak in basic frequency component (Zfc) caused by outer ring damage of the rolling bearing, the bearing is diagnosed as an anomaly in the outer ring.

Figure 45:
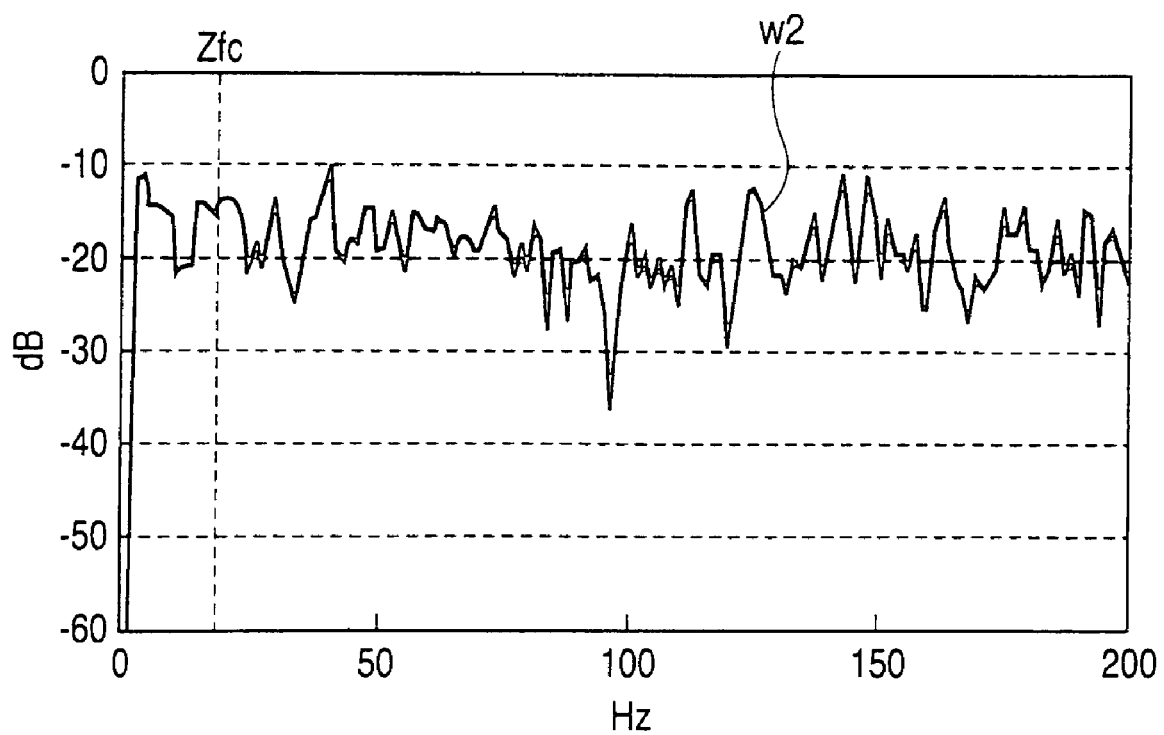
FIG. 45 is a waveform chart of actual measurement frequency spectrum data generated as a signal provided by AD conversion means is subjected to processing of envelop analysis, etc., without removing noise by sampling means in the anomaly diagnosis apparatus of a machine installation shown in FIG. 41.
Figure 46:
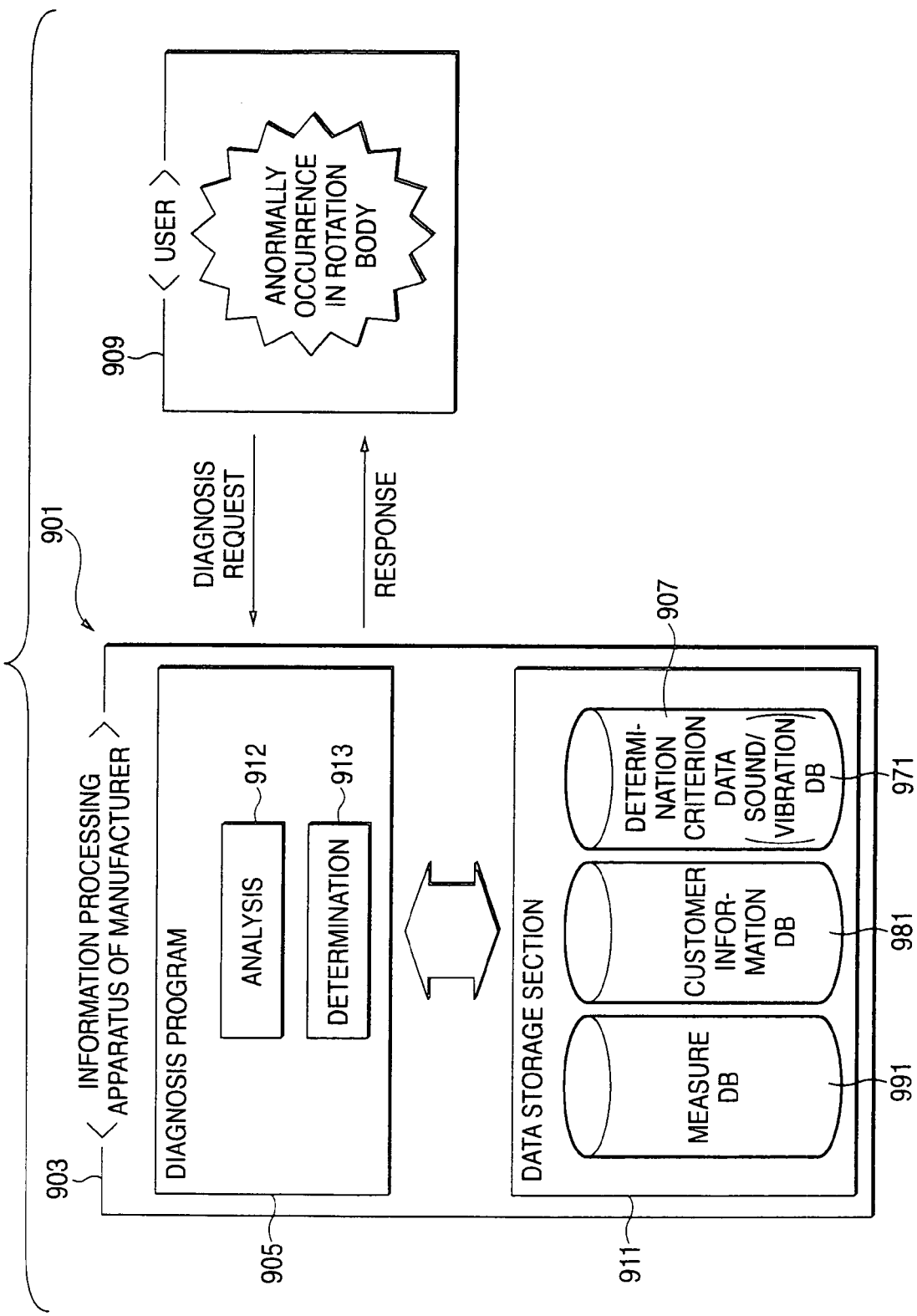
FIG. 46 is a block diagram to show the configuration of an anomaly diagnosis apparatus of a machine installation in a related art.

FIG. 45 shows spectrum waveform w2 of envelope FFT spectrum data generated as actual measurement digital data provided by the AD conversion means 509 for the same rolling bearing having the damaged outer ring is input directly to the computation processing means 517 without removing noise by the sampling means 515 and is subjected to analysis processing of envelop analysis, FFT analysis, and the like.

Thus, if the outer ring is damaged, a peak noticeable in the basic frequency component (Zfc) caused by outer ring damage does not appear in the spectrum waveform w2 where noise is not removed, and there is a fear of overlooking occurrence of the above.

As seen from the description given above, in the anomaly diagnosis apparatus 501 of the machine installation of the embodiment, the sampling means 515 automatically executes removal of the noise component from the actual measurement data detected by the vibration detection means 505 from the machine installation containing the sliding member 503 based on the reference value set in the sampling reference setting means 511.

Therefore, the person in charge of diagnosis for managing the anomaly diagnosis apparatus 501 of the machine installation need not check the actual measurement data to remove the noise component each time, and the necessity for interrupting processing of the anomaly diagnosis apparatus 501 of the machine installation to check the actual measurement data does not occur either.

That is, it is not necessary to interrupt processing of the anomaly diagnosis apparatus 501 of the machine installation to remove the noise component from the actual measurement data detected from the machine installation containing the sliding member 503, and the diagnosis processing can be speeded up.

Further, the noise component is removed uniformly by machine processing based on the reference value, so that the skill degree of the person in charge of diagnosis does not affect the noise component removal rate. Therefore, the noise component removal rate can be made constant and the reliability of the diagnosis can be stabilized.

Since the person in charge of diagnosis need not check the actual measurement data to remove the noise component, an output unit for displaying the actual measurement data detected by the vibration detection means 505 in such a manner that the person in charge of diagnosis can check the actual measurement data can be omitted. As the output unit is omitted, the configuration of the apparatus can be simplified and the apparatus cost can also be decreased.

In the anomaly diagnosis apparatus of the machine installation of the invention, the reference value set in the sampling reference setting means to exclude an area where the effect of noise is large is not limited to the voltage value shown in the embodiment. For example, if it is known that noise is carried periodically, the sampling timing may be adjusted by a delay circuit, etc., matching the noise carrying timing, thereby eliminating the effect of noise.

The reference value setting method in the sampling reference setting means is not limited to the method of directly specifying the reference value from the input means 513 as in the embodiment described above.

For example, the sampling reference setting means 511 may include a computation processing function of calculating the average level and the effective value of the electric signals detected by the vibration detection means 505 and may automatically set the reference value from the calculation results, the operation timing of the vibration detection means 505, etc., and a predetermined constant, etc.

If the sampling reference setting means 511 thus automatically sets the reference value, the data entry operation of the person in charge of diagnosis in the anomaly diagnosis apparatus 501 of the machine installation to set the reference value is decreased and the load on the person in charge of diagnosis is lightened and at the same time, the required time for the data entry operation is saved, so that speeding up of the processing can be ensured.

The machine installation containing the sliding member diagnosed by the anomaly diagnosis apparatus of the machine installation of the invention is not limited to the rolling bearings shown in the embodiment described above. Machine installations containing various sliding members other than bearings can be diagnosed. The machine installation containing the sliding member can be diagnosed without being removed from the machine or the installation if sound or vibration occurring when the machine installation containing the sliding member is rotated can be detected by predetermined vibration detection means even with the machine installation containing the sliding member built in the machine or the installation.

In the embodiment, the process of excluding an area where the effect of noise is large is executed for the vibration signal detected by the vibration detection means after the AD conversion processing performs processing, but the process of excluding an area where the effect of noise is large can also be executed before the AD conversion is performed.

While specific embodiments of the invention have been described in detail, it will be obvious to those skilled in the art that various changes and modifications may be made in the invention without departing from the spirit and scope thereof.

The application is based on Japanese patent application filed on Nov. 6, 2000 (2000-337675), Japanese patent application filed on Oct. 23, 2001 (2001-325003), Japanese patent application filed on Dec. 6, 2000 (2000-371747), Japanese patent application filed on Oct. 23, 2001 (2001-324980), Japanese patent application filed on Oct. 25, 2001 (2001-327742), and Japanese patent application filed on Oct. 23, 2001 (2001-325004), the contents of which are taken in here as references.

INDUSTRIAL APPLICABILITY

As described above, according to the anomaly diagnosis apparatus of the machine installation of the invention described in (1), when the user of the machine installation wants diagnosis of the presence or absence of an anomaly in the sliding member used with the machine installation, the user may transmit the sound or vibration data at the use point of the sliding member on the machine installation required for the anomaly diagnosis, the information identifying the sliding member, the sliding member use condition information, etc., from the user information processing terminal through the network to the diagnosis processing server. To make a diagnosis request, if the information of the use conditions of the sliding member and the like sent by the user to the diagnosis processing server is once prepared and stored in the user information processing terminal, it can be used repeatedly, similar information need not be prepared from the beginning each time an anomaly diagnosis request is made, and the burden required for preparing information required for making an anomaly diagnosis request can be lightened drastically. Further, the requested diagnosis processing is executed promptly within the scope of the information processing performance of the diagnosis processing server 1, so that the user can get the diagnosis result early.

Therefore, if the user does not have a dedicated analytical instrument or a skill required for anomaly diagnosis of the sliding member, the user can make an anomaly diagnosis request easily with a small burden and moreover can get the diagnosis result promptly and deal with occurrence of the anomaly rapidly.

According to the anomaly diagnosis apparatus of the machine installation of the invention described in (2), to diagnose the presence or absence of an anomaly in the machine installation, the diagnosis processing of the diagnosis program is performed in the information processing terminal installed in the user, so that the user is saved from having to transmit the actual measurement vibration data recording sound or vibration produced by the machine installation to be diagnosed to the manufacturer, and as labor and time required for transmitting the actual measurement vibration data to the manufacturer are saved, the diagnosis processing can be speeded up.

The diagnosis processing server to which the actual measurement data analysis program, the determination program, and the determination criterion data required for the diagnosis processing are uploaded is used to download the programs and the determination criterion data and does not execute the diagnosis processing itself and therefore concentrating of the diagnosis processing of a large number of users on one information processing apparatus can be circumvented. Further, the actual measurement data analysis program, the determination program, and the determination criterion data required for the diagnosis processing are downloaded into the information processing terminal of the user and can be introduced into any desired information processing terminal of the user if the information processing terminal has a predetermined communication function and program execution performance, and the diagnosis processing can be left to any idle information processing apparatus of the user.

Therefore, as the diagnosis processing is started promptly, it can also be speeded up.

Further, concentrating of the diagnosis processing of a large number of users on one information processing apparatus need not be considered as described early, so that it can be expected that even an information processing apparatus having a not so high computation processing capability will perform comparatively rapid processing.

Therefore, as a system configuration limiting the computation processing capability of the information processing terminal in moderation in such a manner that a popularly priced personal computer is adopted as the information processing terminal, the system construction cost can be suppressed to a low cost and at the same time, the diagnosis processing can be speeded up.

In the anomaly diagnosis apparatus of the machine installation described in (3), the Internet already constructed as a wide-area network and also promoted to broadband for realizing high-speed communications is used as the network for downloading, so that there is no extra cost for constructing, improving, etc., a dedicated network and it is made possible for a large number of users to use the diagnosis system easily and at low cost.

In the anomaly diagnosis apparatus of the machine installation described in (4), it is made possible for the diagnosis processing server to manage the versions, etc., of the diagnosis program and the determination criterion data required by the user in more detail with the authentication program and the customer data in association with each other, for example; it is made possible to realize reliable downloading of the optimum diagnosis program and the determination criterion data without placing any burden on the user accessing the diagnosis processing server, and service as the manufacturer can be enhanced.

Further, in the anomaly diagnosis apparatus of the machine installation described in (5), illegal repeated use or drain of the diagnosis processing program and the determination criterion data downloaded into the user can be prevented and erroneous use of the program and the data for anomaly diagnosis of a different type of machine installation or the like can be prevented.

Therefore, illegal drain of the technology of the manufacturer can be prevented and the reliability of the diagnosis processing can be enhanced.

In the anomaly diagnosis methods described in (6) and (7), anomaly diagnosis is made based only on the frequency component caused by the sliding member used with the machine installation, so that the calculation load is lightened and the loss of the time required for analysis can be lessened. The effect of noise and the peak of the frequency component not caused by the sliding member of the machine installation can be lessened and further if the level of the frequency component caused by the sliding member of the machine installation is small (if the peak level of all spectrum is small), the frequency component is reliably captured, so that higher-accuracy diagnosis is made possible.

In the anomaly diagnosis method described in any of (8) to (10), only the peak value of actual measurement data is extracted, whereby extracting of a valley point (value) of the spectrum simply because the spectrum level is high can be prevented, and higher-accuracy diagnosis is made possible.

Further, in the anomaly diagnosis method described in (10), the range of the time waveform after AD conversion and the spectrum waveform after frequency analysis is specified, whereby even for noisy sound, non-stationary sound, etc., precise selection of an abnormal sound portion is made possible and higher-accuracy diagnosis is made possible.

In the anomaly diagnosis method described in to (13), the basic frequency component comparison process of checking whether or not the frequency at an appearance point of a peak equal to or higher than a reference level on the actual measurement frequency spectrum data matches the basic frequency at which a peak appears because of an anomaly in a specific part of the sliding member, etc., is executed. If the frequency at the appearance point of the peak equal to or higher than the reference level on the actual measurement frequency spectrum data matches the basic frequency in the basic frequency component comparison process, subsequently the low-frequency component comparison process and the harmonic component comparison process are executed.

If the low-frequency component comparison process and the harmonic component comparison process are executed, whether or not the peak equal to or higher than the reference level in the basic frequency on the actual measurement frequency spectrum data is caused by any other factor of overlap of frequency components of rotation components, etc., of the sliding member, etc., the effect of harmonic, etc., for example, rather than an anomaly of damage, etc., in the sliding member.

Thus, when the frequency at the appearance point of the peak equal to or higher than the reference level on the actual measurement frequency spectrum data matches the basic frequency in the basic frequency component comparison process, further the low-frequency component comparison process and the harmonic component comparison process are executed, whereby erroneous diagnosis of assuming that the peak caused by any other factor of overlap of frequency components of rotation components, etc., of the sliding member, etc., the effect of harmonic, etc., is caused by an anomaly in the sliding member, etc., can be circumvented and the reliability of diagnosing the presence or absence of an anomaly in the sliding member, etc., can be improved.

According to the anomaly diagnosis method and apparatus of the machine installation described in (14) and (15), the comparison process of checking the presence or absence of a peak on the actual measurement frequency spectrum data corresponding to frequency components occurring when each specific part of the sliding member of the machine installation is abnormal is limited to three times of the first-order, second-order, and fourth-order values of the frequency components occurring when the specific part of the sliding member of the machine installation is abnormal and therefore the computation processing amount in the comparison process is drastically decreased as compared with the related art case where the comparison process is repeated for all of a large number of frequency components of first-order to high-order frequency components, for example.

Thus, the load on the computation processing means in analyzing the vibration signal detected from the sliding member of the machine installation is lightened drastically and the diagnosis work can be speeded up. Since the computation processing amount is decreased, it is made possible to use an inexpensive computer having a low computation processing capability as the computer used as the computation processing means and it is also made possible to decrease the apparatus cost.

Further, if a determination is made based only on the first-order component of frequency components occurring under abnormal condition, there is a possibility of making an erroneous diagnosis as a peak on the corresponding actual measurement frequency spectrum happens to shift or grow due to the effect of noise, etc.

However, to execute the comparison process three times of the first-order, second-order, and fourth-order values of the frequency components occurring when the specific part of the sliding member of the machine installation is abnormal as described above, there is almost no probability that the process will receive the effect of noise, etc., three times, and the reliability of the diagnosis can be improved.

In doing as described in (16) and (17), if an extraction process of extracting effective peaks based on the threshold value is performed, for example, before a computation process for comparison for the peaks on the actual measurement frequency spectrum data corresponding to the first-order value, the second-order value, and the fourth-order value of the frequency components occurring when the specific part of the sliding member of the machine installation is abnormal is executed, waste of executing the comparison process for insignificant peaks can be avoided and the load of the computation processing amount is furthermore lightened and speeding up the diagnosis process can be promoted.

Generally, growing of the peak level on the actual measurement frequency spectrum caused by damage to the sliding member of the machine installation becomes most noticeable at the peak corresponding to the first-order value of the frequency components caused by the anomaly.

Thus, as in the anomaly diagnosis method of the machine installation described in (18), the level difference between the level on the actual measurement frequency spectrum data corresponding to the first-order value of the frequency components occurring when the specific part of the sliding member of the machine installation is abnormal and the effective value or average value of the actual measurement frequency spectrum data is calculated, whereby the magnitude of the damage can be estimated efficiently by performing minimum computation processing, and the damaged part replacement time is determined from the estimated magnitude of the damage, so that excessive parts replacement and maintenance are circumvented and it is made possible to reduce the upkeep cost in the machine and the installation containing the sliding member of the machine installation.

According to the anomaly diagnosis apparatus of the machine installation of the invention described in (19), the sampling means automatically executes removal of the noise component from the actual measurement data detected by the vibration detection means from the machine installation containing the sliding member based on the reference value set in the sampling reference setting means.

Therefore, the person in charge of diagnosis for managing the anomaly diagnosis apparatus of the machine installation need not check the actual measurement data to remove the noise component each time, and the necessity for interrupting processing of the anomaly diagnosis apparatus of the machine installation to check the actual measurement data does not occur either.

That is, it is not necessary to interrupt processing of the anomaly diagnosis apparatus of the machine installation to remove the noise component from the actual measurement data detected from the machine installation containing the sliding member, and the diagnosis processing can be speeded up.

Further, the noise component is removed uniformly by machine processing based on the reference value, so that the skill degree of the person in charge of diagnosis does not affect the noise component removal rate. Therefore, the noise component removal rate can be made constant and the reliability of the diagnosis can be stabilized.

Since the person in charge of diagnosis need not check the actual measurement data to remove the noise component, an output unit for displaying the actual measurement data detected by the vibration detection means in such a manner that the person in charge of diagnosis can check the actual measurement data can be omitted. As the output unit is omitted, the configuration of the apparatus can be simplified and the apparatus cost can also be decreased.

The invention claimed is:

1. An anomaly diagnosis method of a machine installation for diagnosing the presence or absence of an anomaly in a sliding member used with the machine installation by analyzing sound or vibration produced from the machine installation, characterized by:

detecting a signal representing sound or vibration from the sliding member of the machine installation or a member relevant to the sliding member of the machine installation;

finding a frequency spectrum of the detected signal or an envelope signal thereof; and extracting only a frequency component caused by an anomaly in the sliding member of the machine installation or the member relevant to the sliding member of the machine installation from the found frequency spectrum and diagnosing the presence or absence of an anomaly in the sliding member used with the machine installation based on the magnitude of the extracted frequency component, wherein the frequency component caused by anomaly in the sliding member of the machine installation or the member relevant to the sliding member of the machine installation is a frequency component caused by an anomaly of a bearing used with the machine installation;

wherein the frequency component caused by the anomaly of the bearing comprises at least one of an inner ring flaw component, an outer ring flaw component, a rolling element flaw component, and a cage component; and wherein, before the extracting, the frequency component caused by the anomaly of the bearing is calculated based on an inner ring rotation speed, a diameter of a rolling element, a pitch circle diameter, a number of rolling elements and a contact angle.

2. The anomaly diagnosis method of the machine installation as claimed in claim 1 wherein the presence or absence of an anomaly is diagnosed by comparing the extracted frequency component with a reference value determined in response to an effective value of the detected signal or the envelope signal thereof.

3. The anomaly diagnosis method of the machine installation as claimed in claim 1 wherein the frequency component caused by anomaly in the sliding member of the machine installation or the member relevant to the sliding member of the machine installation corresponds to an abnormal part of the machine installation or a machine.

* * * * *